US012571721B2

(12) United States Patent
Holst et al.

(10) Patent No.: US 12,571,721 B2
(45) Date of Patent: Mar. 10, 2026

(54) APPARATUS AND METHOD FOR CAPTURING VIBRATION IN SYSTEM

(71) Applicant: ILLUMINA, INC., San Diego, CA (US)

(72) Inventors: Gregory Holst, San Diego, CA (US); Dustin Blair, Escondido, CA (US); John Earney, San Diego, CA (US); Geraint Evans, Cambridge (GB); Matthew Hage, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 559 days.

(21) Appl. No.: 18/113,815

(22) Filed: Feb. 24, 2023

(65) Prior Publication Data

US 2023/0272837 A1 Aug. 31, 2023

Related U.S. Application Data

(60) Provisional application No. 63/314,540, filed on Feb. 28, 2022.

(51) Int. Cl.
*G01N 21/01* (2006.01)
*F16F 15/03* (2006.01)

(52) U.S. Cl.
CPC ........... *G01N 21/01* (2013.01); *F16F 15/035* (2013.01); *F16F 2230/0047* (2013.01)

(58) Field of Classification Search
CPC . G01N 21/01; F16F 15/035; F16F 2230/0047
See application file for complete search history.

(56) References Cited

U.S. PATENT DOCUMENTS

| | | | |
|---|---|---|---|
| 5,392,881 A | 2/1995 | Cho et al. | |
| 7,722,056 B2 | 5/2010 | Inoue et al. | |
| 7,741,463 B2 | 6/2010 | Gormley et al. | |
| 8,103,408 B2 | 1/2012 | Inoue et al. | |
| 8,851,235 B2 | 10/2014 | Allington et al. | |
| 8,934,098 B2 | 1/2015 | Cox et al. | |
| 8,946,919 B2 | 2/2015 | Phillips | |
| 9,449,785 B2 | 9/2016 | Price et al. | |

(Continued)

OTHER PUBLICATIONS

International Search Report and Written Opinion dated Jun. 23, 2023, for International Application No. PCT/US2023/013783, 13 pages.

*Primary Examiner* — Georgia Y Epps
*Assistant Examiner* — Don J Williams
(74) *Attorney, Agent, or Firm* — FBT Gibbons LLP

(57) ABSTRACT

An apparatus includes a chassis, a frame, a sample support member, an imaging assembly, an actuation assembly, and a vibration capture assembly. The frame is coupled with the chassis. The sample support member is supported by the frame. The actuation assembly is supported by the frame and is operable to drive movement of the imaging assembly relative to the sample support member. The vibration capture assembly is operable to selectively transition between a plurality of modes, including a damping mode and an isolation mode. In the damping mode, the vibration capture assembly is configured to resist movement of the frame relative to the chassis in response to operation of the actuation assembly. In the isolation mode, the vibration capture assembly is configured to prevent transmission of vibrational movement in the chassis to the frame.

20 Claims, 26 Drawing Sheets

(56)  References Cited

U.S. PATENT DOCUMENTS

| 9,887,613 | B2 | 2/2018 | Vogler et al. | |
| 2003/0048603 | A1* | 3/2003 | Lee | G11B 33/08 |
| 2007/0214685 | A1 | 9/2007 | Polk et al. | |
| 2009/0296081 | A1 | 12/2009 | Plug et al. | |
| 2017/0182510 | A1 | 6/2017 | Wilkerson et al. | |

* cited by examiner

APPARATUS AND METHOD FOR CAPTURING VIBRATION IN SYSTEM

PRIORITY

This application claims priority to U.S. Provisional Pat. App. No. 63/314,540, entitled "Apparatus and Method for Capturing Vibration in System," filed Feb. 28, 2022, the disclosure of which is incorporated by reference herein, in its entirety.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Aspects of the present disclosure relate generally to biological or chemical analysis and more particularly to systems and methods using image sensors for biological or chemical analysis.

Various protocols in biological or chemical research involve performing a large number of controlled reactions on local support surfaces or within predefined reaction chambers. The designated reactions may then be observed or detected, and subsequent analysis may help identify or reveal properties of chemicals involved in the reaction. For example, in some multiplex assays, an unknown analyte having an identifiable label (e.g., fluorescent label) may be exposed to thousands of known probes under controlled conditions. Each known probe may be deposited into a corresponding well of a flow cell channel. Observing any chemical reactions that occur between the known probes and the unknown analyte within the wells may help identify or reveal properties of the analyte. Other examples of such protocols include known DNA sequencing processes, such as sequencing-by-synthesis (SBS) or cyclic-array sequencing.

In some conventional fluorescent-detection protocols, an optical system is used to direct an excitation light onto fluorescently-labeled analytes and to also detect the fluorescent signals that may be emitted from the analytes. Such optical systems may include an arrangement of lenses, filters, and light sources. It may be desirable to provide movement of one or more components of such an optical system to capture images of different regions of a flow cell or other target. It may also be desirable to capture several images of different regions of the flow cell or other target at a rapid pace. However, providing such movement of optical system components may present challenges in achieving a high throughput of appropriately focused or otherwise non-blurred images.

SUMMARY

Described herein are devices, systems, and methods for capturing or preventing vibration or other forms movement of within a system, to provide a rigidly stationary relationship between a flow cell or other target and a camera at the time each image is captured with the camera, despite movement of the camera relative to the flow cell between image captures.

An implementation relates to an apparatus that includes a chassis, a frame, a sample support member, an imaging assembly, an actuation assembly, and a vibration capture assembly. The frame is coupled with the chassis. The sample support member is supported by the frame and is configured to support a biological sample containing member. The actuation assembly is supported by the frame and is operable to drive movement of the imaging assembly relative to the sample support member to thereby capture different images from different positions relative to the biological sample containing member. The vibration capture assembly is operable to selectively transition between a plurality of modes, including a damping mode and an isolation mode. In the damping mode, the vibration capture assembly is configured to resist movement of the frame relative to the chassis in response to operation of the actuation assembly. In the isolation mode, the vibration capture assembly is configured to prevent transmission of vibrational movement in the chassis to the frame.

In some implementations of an apparatus, such as that described in the preceding paragraph of this summary, the system further includes one or more isolating members interposed between the frame and the chassis, the one or more isolating members being configured to prevent transmission of vibrational movement in the chassis to the frame.

In some implementations of an apparatus, such as any of those described in any of the preceding paragraphs of this summary, the one or more isolating members includes a gel material.

In some implementations of an apparatus, such as any of those described in any of the preceding paragraphs of this summary, at least a portion of the vibration capture assembly is positioned within the one or more isolating members.

In some implementations of an apparatus, such as any of those described in any of the preceding paragraphs of this summary, the biological sample containing member includes a flow cell.

In some implementations of an apparatus, such as any of those described in any of the preceding paragraphs of this summary, the actuation assembly is operable to drive movement of the imaging assembly along a plane.

In some implementations of an apparatus, such as any of those described in any of the preceding paragraphs of this summary, at least a portion of the vibration capture assembly is positioned along the plane.

In some implementations of an apparatus, such as any of those described in any of the preceding paragraphs of this summary, the vibration capture assembly includes at least one magnet and at least one electrically conductive member, the at least one electrically conductive member being spaced apart from the at least one magnet.

In some implementations of an apparatus, such as any of those described in any of the preceding paragraphs of this summary, the at least one magnet is configured to generate eddy currents in the at least one electrically conductive member. The at least one electrically conductive member is configured to generate a magnetic field in response to the eddy currents. The magnetic field generated by the at least one electrically conductive member is counteractive to a magnetic field of the at least one magnet such that the magnetic field generated by the at least one electrically conductive member and the magnetic field of the at least one magnet cooperate to resist movement of the frame relative to the chassis in response to operation of the actuation assembly when the vibration capture assembly is in the damping mode.

In some implementations of an apparatus, such as any of those described in any of the preceding paragraphs of this summary, the at least one electrically conductive member includes a first plate and a second plate. The first plate includes a first plurality of fingers defining a first plurality of slots. The second plate includes a second plurality of fingers defining a second plurality of slots. The first plurality of fingers is configured to fit in the in the second plurality of slots. The second plurality of fingers is configured to fit in the first plurality of slots.

In some implementations of an apparatus, such as any of those described in any of the preceding paragraphs of this summary, the first plate is operable to move relative to the second plate between a first position and a second position. The first plurality of fingers being in electrical continuity with the second plurality of fingers when the first plate is in the first position. The first plurality of fingers are not in electrical continuity with the second plurality of fingers when the first plate is in the second position.

In some implementations of an apparatus, such as any of those described in any of the preceding paragraphs of this summary, the first plate and the second plate each extend along a plane. The first plate is movable along the plane between the first position and the second position.

In some implementations of an apparatus, such as any of those described in any of the preceding paragraphs of this summary, the first plate extends along a first plane. The first plate is movable along a second plane between the first position and the second position. The second plane is transversely oriented relative to the first plane.

In some implementations of an apparatus, such as any of those described in any of the preceding paragraphs of this summary, the at least one electrically conductive member includes a first conductive member, a second conductive member, a gap defined between the first and second conductive members, and an expandable conductive assembly positioned in the gap. The expandable conductive assembly is operable to transition between an expanded state and a non-expanded state. The expandable conductive assembly is configured to provide electrical continuity between the first conductive member and the second conductive member when the expandable conductive assembly is in the expanded state. The expandable conductive assembly is configured to not provide electrical continuity between the first conductive member and the second conductive member when the expandable conductive assembly is in the non-expanded state.

In some implementations of an apparatus, such as any of those described in any of the preceding paragraphs of this summary, the at least one electrically conductive member comprising a conductive plate with a plurality of openings formed therethrough.

In some implementations of an apparatus, such as any of those described in any of the preceding paragraphs of this summary, the vibration capture assembly is operable to selectively close the plurality of openings with electrically conductive material to thereby provide the damping mode. The magnet is configured to generate stronger eddy currents in the at least one electrically conductive member when the plurality of openings are closed than when the plurality of openings are open.

In some implementations of an apparatus, such as any of those described in any of the preceding paragraphs of this summary, the plurality of openings include a plurality of slots. The vibration capture assembly further includes a plurality of electrically conductive members configured to span the slots to thereby provide a continuous conductive surface across the conductive plate.

In some implementations of an apparatus, such as any of those described in any of the preceding paragraphs of this summary, the at least one magnet and at least one electrically conductive member are operable to cooperate to generate electromotive force to thereby resist movement of the frame relative to the chassis in response to operation of the actuation assembly when the vibration capture assembly is in the damping mode.

In some implementations of an apparatus, such as any of those described in any of the preceding paragraphs of this summary, the at least one electrically conductive member includes a coil.

In some implementations of an apparatus, such as any of those described in any of the preceding paragraphs of this summary, the vibration capture assembly is configured to complete a circuit between the two terminals to thereby provide the damping mode. The vibration capture assembly is further configured to open a circuit between the two terminals to thereby provide the isolation mode.

In some implementations of an apparatus, such as any of those described in any of the preceding paragraphs of this summary, the vibration capture assembly being configured to selectively apply a voltage to the coil.

In some implementations of an apparatus, such as any of those described in any of the preceding paragraphs of this summary, the vibration capture assembly is configured to selectively apply various voltages to the coil along a voltage range.

In some implementations of an apparatus, such as any of those described in any of the preceding paragraphs of this summary, the at least one magnet is secured to the frame. The at least one electrically conductive member is secured to the chassis.

In some implementations of an apparatus, such as any of those described in any of the preceding paragraphs of this summary, the vibration capture assembly includes a mechanical braking feature including a first portion secured to the frame and a second portion secured to the chassis. The mechanical braking feature is operable to selectively provide a contacting rigid engagement between the first and second portions to thereby provided the damping mode.

In some implementations of an apparatus, such as any of those described in any of the preceding paragraphs of this summary, the mechanical braking feature is further operable to provide a selectively variable gripping engagement between the first and second portions.

In some implementations of an apparatus, such as any of those described in any of the preceding paragraphs of this summary, the apparatus further includes a control module. The control module is configured to drive operation of the vibration capture assembly.

In some implementations of an apparatus, such as any of those described in any of the preceding paragraphs of this summary, the control module is further configured to drive operation of the actuation assembly.

In some implementations of an apparatus, such as any of those described in any of the preceding paragraphs of this summary, the control module is configured to drive operation of the vibration capture assembly in synchronization with operation of the actuation assembly.

In some implementations of an apparatus, such as any of those described in any of the preceding paragraphs of this summary, the control module is configured to transition the vibration capture assembly between the damping mode and the isolation mode based on an operational state of the actuation assembly.

In some implementations of an apparatus, such as any of those described in any of the preceding paragraphs of this summary, the apparatus further includes one or more sensors. The control module is configured to transition the vibration capture assembly between the damping mode and the isolation mode based on signals from the one or more sensors.

In some implementations of an apparatus, such as any of those described in any of the preceding paragraphs of this summary, the one or more sensors include one or more sensors selected from the group consisting of position sensors and force sensors.

In some implementations of an apparatus, such as any of those described in any of the preceding paragraphs of this summary, the control module is configured to transition the vibration capture assembly between the damping mode and the isolation mode based on a predetermined activation profile.

In some implementations of an apparatus, such as any of those described in any of the preceding paragraphs of this summary, the control module is configured to transition the vibration capture assembly from the isolation mode to the damping mode based at least in part on a transition of the actuation assembly from a non-activated state to an activated state.

In some implementations of an apparatus, such as any of those described in any of the preceding paragraphs of this summary, the control module is configured to transition the vibration capture assembly from the isolation mode to the damping mode at a predetermined time before transition of the actuation assembly from the non-activated state to the activated state.

In some implementations of an apparatus, such as any of those described in any of the preceding paragraphs of this summary, the control module is configured to transition the vibration capture assembly from the isolation mode to the damping mode simultaneously with transition of the actuation assembly from the non-activated state to the activated state.

In some implementations of an apparatus, such as any of those described in any of the preceding paragraphs of this summary, the control module is configured to transition the vibration capture assembly from the damping mode to the isolation mode based at least in part on a transition of the actuation assembly from an activated state to a non-activated state.

In some implementations of an apparatus, such as any of those described in any of the preceding paragraphs of this summary, the control module is configured to transition the vibration capture assembly from the damping mode to the isolation mode at a predetermined time after transition of the actuation assembly from an activated state to a non-activated state.

In some implementations of an apparatus, such as any of those described in any of the preceding paragraphs of this summary, the control module is configured to transition the vibration capture assembly from the damping mode to the isolation mode simultaneously with transition of the actuation assembly from an activated state to a non-activated state.

In some implementations of an apparatus, such as any of those described in any of the preceding paragraphs of this summary, the control module is configured to transition the vibration capture assembly from the isolation mode to the damping mode based at least in part on a transition of the actuation assembly from a non-activated state to an activated state. The control module is further configured to transition the vibration capture assembly from the damping mode to the isolation mode while the actuation assembly is in the activated state.

In some implementations of an apparatus, such as any of those described in any of the preceding paragraphs of this summary, the control module is further configured to transition the vibration capture assembly from the isolation mode back to the damping mode when or before the actuation assembly transitions from the activated state back to the non-activated state.

In some implementations of an apparatus, such as any of those described in any of the preceding paragraphs of this summary, the control module is further configured to transition the vibration capture assembly from the damping mode back to the isolation mode after the actuation assembly transitions from the activated state back to the non-activated state.

Another implementation relates to a method of operating an apparatus that includes a chassis, a frame coupled with the chassis, a biological sample containing member supported by the frame, an imaging assembly, an actuation assembly supported by the frame, and a vibration capture assembly. The method includes activating the actuation assembly to drive movement of the imaging assembly relative to the biological sample containing member to thereby capture images with the imaging assembly from different positions relative to the biological sample containing member. The method further includes deactivating the actuation assembly to cease movement of the imaging assembly relative to the biological sample containing member. The method further includes transitioning the vibration capture assembly to a damping mode to resist movement of the frame relative to the chassis based on activation of the actuation assembly. The method further includes transitioning the vibration capture assembly from the damping mode to an isolation mode to prevent transmission of vibrational movement in the chassis to the frame after deactivation of the activation assembly.

In some implementations of a method, such as that described in the preceding paragraph of this summary, the biological sample containing member includes a flow cell.

In some implementations of a method, such as any of those described in any of the preceding paragraphs of this summary, the method further includes performing sequencing by synthesis on the flow cell.

In some implementations of a method, such as any of those described in any of the preceding paragraphs of this summary, the act of transitioning the vibration capture assembly to the damping mode is performed at a predetermined time period before the act of activating the actuation assembly.

In some implementations of a method, such as any of those described in any of the preceding paragraphs of this summary, the act of transitioning the vibration capture assembly from the damping mode to the isolation mode is performed at a predetermined time period after the act of deactivating the actuation assembly.

In some implementations of a method, such as any of those described in any of the preceding paragraphs of this summary, the method further includes transitioning the vibration capture assembly from the damping mode to the isolation mode while the actuation assembly is in an activated state between the act of activating the actuation assembly and the act of deactivating the actuation assembly.

In some implementations of a method, such as any of those described in any of the preceding paragraphs of this summary, the method further includes transitioning the vibration capture assembly from the isolation mode to the damping mode before or simultaneously with the act of deactivating the actuation assembly.

In some implementations of a method, such as any of those described in any of the preceding paragraphs of this summary, the act of transitioning the vibration capture assembly from the damping mode to the isolation mode is performed at a predetermined time period after the act of deactivating the actuation assembly.

In some implementations of a method, such as any of those described in any of the preceding paragraphs of this summary, the act of transitioning the vibration capture assembly to the damping mode includes closing openings of an electrically conductive component of the vibration capture assembly to allow generation of eddy currents in the electrically conductive component in response to movement of a magnetic component of the vibration capture assembly relative to the electrically conductive component.

In some implementations of a method, such as any of those described in any of the preceding paragraphs of this summary, the act of transitioning the vibration capture assembly to the isolation mode includes opening the openings of the electrically conductive component to prevent generation of eddy currents in the electrically conductive component in response to movement of the magnetic component relative to the electrically conductive component.

In some implementations of a method, such as any of those described in any of the preceding paragraphs of this summary the act of transitioning the vibration capture assembly to the damping mode includes completing a circuit between terminals of a coil of the vibration capture assembly to allow generation of an electromotive braking force in response to movement of a magnetic component of the vibration capture assembly relative to the coil.

In some implementations of a method, such as any of those described in any of the preceding paragraphs of this summary, the act of transitioning the vibration capture assembly to the isolation mode includes opening the circuit between the terminals of a coil of the vibration capture assembly to prevent generation of an electromotive braking force in response to movement of the magnetic component relative to the coil.

In some implementations of a method, such as any of those described in any of the preceding paragraphs of this summary, the method further includes selectively adjusting an electrical resistance of the coil to thereby adjust the electromotive braking force.

In some implementations of a method, such as any of those described in any of the preceding paragraphs of this summary, the act of transitioning the vibration capture assembly to the damping mode includes applying a voltage between terminals of a coil of the vibration capture assembly to generate an electromotive braking force in response to movement of a magnetic component of the vibration capture assembly relative to the coil.

In some implementations of a method, such as any of those described in any of the preceding paragraphs of this summary, the act of transitioning the vibration capture assembly to the isolation mode includes reducing or removing the voltage between the terminals of a coil of the vibration capture assembly to prevent generation of an electromotive braking force in response to movement of the magnetic component relative to the coil.

In some implementations of a method, such as any of those described in any of the preceding paragraphs of this summary, the method further includes selectively adjusting the voltage to thereby adjust the electromotive braking force.

Another implementation relates to a method of operating an apparatus that includes a chassis, a frame coupled with the chassis, a biological sample containing member supported by the frame, an imaging assembly, an actuation assembly supported by the frame, and a vibration capture assembly. The method includes activating the actuation assembly to drive movement of the imaging assembly relative to the biological sample containing member to thereby capture images with the imaging assembly from different positions relative to the biological sample containing member, the frame vibrating relative to the chassis in response to activating the actuation assembly. The method further includes transitioning the vibration capture assembly to a damping mode to resist vibration of the frame relative to the chassis in proportion to a velocity of the vibrational motion. The method further includes deactivating the actuation assembly to cease movement of the imaging assembly relative to the biological sample containing member. The method further includes transitioning the vibration capture assembly from the damping mode to an isolation mode to prevent transmission of vibrational movement in the chassis to the frame after deactivation of the activation assembly.

Another implementation relates to an apparatus that includes a chassis, a frame, a sample support member, an imaging assembly, an actuation assembly, and a vibration capture assembly. The frame is coupled with the chassis. The sample support member is supported by the frame. The sample support member is configured to support a biological sample containing member. The actuation assembly is supported by the frame. The actuation assembly is operable to drive movement of the imaging assembly relative to the sample support member to thereby capture different images from different positions relative to the biological sample containing member. The vibration capture assembly includes a first support assembly, a first support member, and a first vibration isolation body. The first support assembly is coupled with the frame. The first support member is coupled with the chassis. The first vibration isolation body is interposed between the first support assembly and the first support member along a first dimension. The first vibration isolation body is configured to absorb vibrations imparted by the chassis to the first vibration isolation body via the first support member. The first support assembly includes a movement restriction feature configured to permit movement of the first support member relative to the first support assembly along a second dimension within a restricted range of movement.

In some implementations of an apparatus, such as that described in the preceding paragraph of this summary, the first dimension is a vertical dimension. The second dimension is a horizontal dimension.

In some implementations of an apparatus, such as any of those described in any of the preceding paragraphs of this summary, the vibration capture assembly further includes a second support member and a second vibration isolation body. The second support member is coupled with the chassis. The second vibration isolation body is interposed between the first support assembly and the second support member along the first dimension. The second vibration isolation body is configured to absorb vibrations imparted by the chassis to the first vibration isolation body via the second support member.

In some implementations of an apparatus, such as any of those described in any of the preceding paragraphs of this summary, the first support member is configured to selectively engage the movement restriction feature. The movement restriction feature is configured to restrict the range of movement of the first support member upon engagement between the first support member and the movement restriction feature.

In some implementations of an apparatus, such as any of those described in any of the preceding paragraphs of this summary, the first support assembly includes an upper horizontal member and a vertical member. The vertical member provides the movement restriction feature.

In some implementations of an apparatus, such as any of those described in any of the preceding paragraphs of this summary, the first support member includes a lower horizontal member configured to selectively engage the vertical member during movement of the first support member relative to the first support assembly.

In some implementations of an apparatus, such as any of those described in any of the preceding paragraphs of this summary, the first support assembly further includes at least one flange on the vertical member. The flange is configured to restrict movement of the lower horizontal member along the first dimension.

In some implementations of an apparatus, such as any of those described in any of the preceding paragraphs of this summary, the movement restriction feature includes a soft material configured to absorb impact by the first support member.

In some implementations of an apparatus, such as any of those described in any of the preceding paragraphs of this summary, the first vibration isolation body includes one or more of a gel, a foam material, an air filled bladder, or a liquid-filled bladder While multiple examples are described, still other examples of the described subject matter will become apparent to those skilled in the art from the following detailed description and drawings, which show and describe illustrative examples of disclosed subject matter. As will be realized, the disclosed subject matter is capable of modifications in various aspects, all without departing from the spirit and scope of the described subject matter. Accordingly, the drawings and detailed description are to be regarded as illustrative in nature and not restrictive.

DETAILED DESCRIPTION

Figure 1:
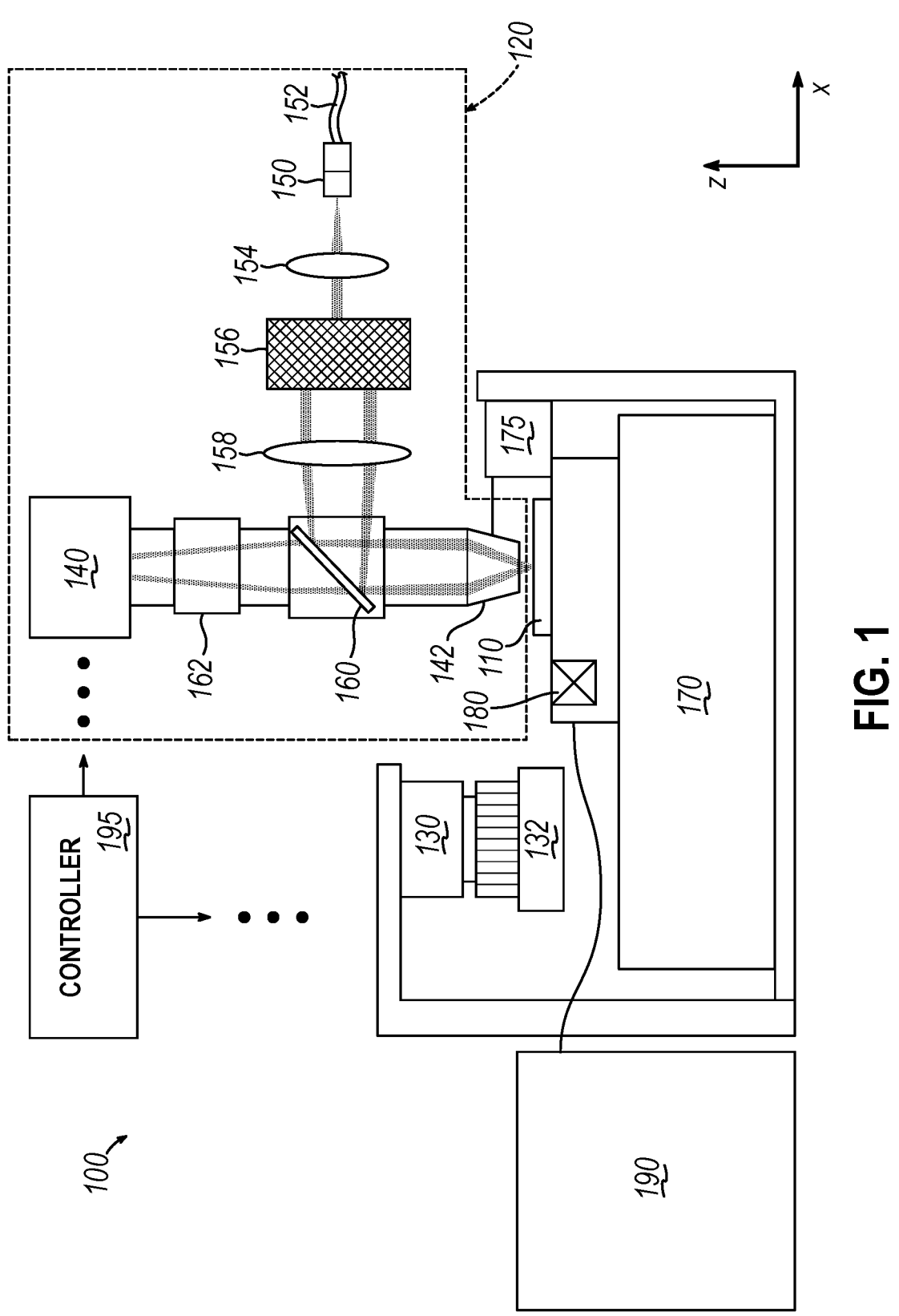
FIG. 1 depicts a schematic diagram of an example of an imaging system that may be implemented in a system for biological or chemical analysis.

I. Overview of System for Biological or Chemical Analysis

Examples described herein may be used in various biological or chemical processes and systems for academic analysis, commercial analysis, or other analysis. More specifically, examples described herein may be used in various processes and systems where it is desired to detect an event, property, quality, or characteristic that is indicative of a designated reaction.

Bioassay systems such as those described herein may be configured to perform a plurality of designated reactions that may be detected individually or collectively. The biosensors and bioassay systems may be configured to perform numerous cycles in which a plurality of designated reactions occurs in parallel. For example, the bioassay systems may be used to sequence a dense array of DNA features through iterative cycles of enzymatic manipulation and image acquisition. Cartridges and biosensors that are used in the bioassay systems may include one or more microfluidic channels that deliver reagents or other reaction components to a reaction site. The reaction sites may be randomly distributed across a substantially planar surface; or may be patterned across a substantially planar surface in a predetermined manner. In some versions, the reaction sites are located in reaction chambers that compartmentalize the designated reactions therein.

Regardless of the form taken by the reaction sites, each of the reaction sites may be imaged to detect light from the reaction site. In some examples, one or more image sensors may detect light emitted from reaction sites. The signals indicating photons emitted from the reaction sites and detected by the individual image sensors may be referred to as those sensors' illumination values. These illumination values may be combined into an image indicating photons as detected from the reaction sites. These images may be further analyzed to identify compositions, reactions, conditions, etc., at each reaction site.

The following detailed description of certain examples will be better understood when read in conjunction with the appended drawings. To the extent that the figures illustrate diagrams of the functional blocks of various examples, the functional blocks are not necessarily indicative of the division between hardware components. Thus, for example, one or more of the functional blocks (e.g., processors or memories) may be implemented in a single piece of hardware (e.g., a general purpose signal processor or random access memory, hard disk, or the like). Similarly, the programs may be stand-alone programs, may be incorporated as subroutines in an operating system, may be functions in an installed software package, and the like. It should be understood that the various examples are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one example" are not intended to be interpreted as excluding the existence of additional examples that also incorporate the recited features. Moreover, unless explicitly stated to the contrary, examples "comprising" or "having" an element or a plurality of elements having a particular property may include additional elements whether or not they have that property.

As used herein, a "designated reaction" includes a change in at least one of a chemical, electrical, physical, or optical property (or quality) of an analyte-of-interest. In some examples, the designated reaction is a positive binding event (e.g., incorporation of a fluorescently labeled biomolecule with the analyte-of-interest). More generally, the designated reaction may be a chemical transformation, chemical change, or chemical interaction. In some examples, the designated reaction includes the incorporation of a fluorescently-labeled molecule to an analyte. The analyte may be an oligonucleotide and the fluorescently-labeled molecule may be a nucleotide. The designated reaction may be detected when an excitation light is directed toward the oligonucleotide having the labeled nucleotide, and the fluorophore emits a detectable fluorescent signal. In alternative examples, the detected fluorescence is a result of chemiluminescence or bioluminescence. A designated reaction may also increase fluorescence (or Förster) resonance energy transfer (FRET), for example, by bringing a donor fluorophore in proximity to an acceptor fluorophore, decrease FRET by separating donor and acceptor fluorophores, increase fluorescence by separating a quencher from a fluorophore or decrease fluorescence by co-locating a quencher and fluorophore.

As used herein, a "reaction component" or "reactant" includes any substance that may be used to obtain a designated reaction. For example, reaction components include reagents, enzymes, samples, other biomolecules, and buffer solutions. The reaction components may be delivered to a reaction site in a solution and/or immobilized at a reaction site. The reaction components may interact directly or indirectly with another substance, such as the analyte-of-interest.

As used herein, the term "reaction site" is a localized region where a designated reaction may occur. A reaction site may include support surfaces of a substrate where a substance may be immobilized thereon. For example, a reaction site may include a substantially planar surface in a channel of a flow cell that has a colony of nucleic acids thereon. The nucleic acids in the colony may have the same sequence, being for example, clonal copies of a single stranded or double stranded template. However, in some examples a reaction site may contain only a single nucleic acid molecule, for example, in a single stranded or double stranded form. Furthermore, a plurality of reaction sites may be randomly distributed along the support surface or arranged in a predetermined manner (e.g., side-by-side in a matrix, such as in microarrays). A reaction site may also include a reaction chamber that at least partially defines a spatial region or volume configured to compartmentalize the designated reaction. As used herein, the term "reaction chamber" includes a spatial region that is in fluid communication with a flow channel. The reaction chamber may be at least partially separated from the surrounding environment or other spatial regions. For example, a plurality of reaction chambers may be separated from each other by shared walls. As a more specific example, the reaction chamber may include a cavity defined by interior surfaces of a well and have an opening or aperture so that the cavity may be in fluid communication with a flow channel. Reaction sites do not necessarily need to be provided in reaction chambers and may instead be provided on or in any other suitable kind of structure.

As used herein, the term "adjacent" when used with respect to two reaction sites means no other reaction site is located between the two reaction sites. The term "adjacent" may have a similar meaning when used with respect to adjacent detection paths and adjacent image sensors (e.g., adjacent image sensors have no other image sensor therebetween). In some cases, a reaction site may not be adjacent to another reaction site; but may still be within an immediate vicinity of the other reaction site. A first reaction site may be in the immediate vicinity of a second reaction site when fluorescent emission signals from the first reaction site are detected by the image sensor associated with the second reaction site. More specifically, a first reaction site may be in the immediate vicinity of a second reaction site when the image sensor associated with the second reaction site detects, for example, crosstalk from the first reaction site. Adjacent reaction sites may be contiguous such that they abut each other or the adjacent sites may be non-contiguous having an intervening space between.

As used herein, a "substance" includes items or solids, such as capture beads, as well as biological or chemical substances. As used herein, a "biological or chemical substance" includes biomolecules, samples-of-interest, analytes-of-interest, and other chemical compound(s). A biological or chemical substance may be used to detect, identify, or analyze other chemical compound(s), or function as intermediaries to study or analyze other chemical compound(s). In particular examples, the biological or chemical substances include a biomolecule. As used herein, a "biomolecule" includes at least one of a biopolymer, nucleoside, nucleic acid, polynucleotide, oligonucleotide, protein, enzyme, polypeptide, antibody, antigen, ligand, receptor, polysaccharide, carbohydrate, polyphosphate, cell, tissue, organism, or fragment thereof or any other biologically active chemical compound(s) such as analogs or mimetics of the aforementioned species.

Biomolecules, samples, and biological or chemical substances may be naturally occurring or synthetic and may be suspended in a solution or mixture within a spatial region. Biomolecules, samples, and biological or chemical substances may also be bound to a solid phase or gel material. Biomolecules, samples, and biological or chemical substances may also include a pharmaceutical composition. In some cases, biomolecules, samples, and biological or chemical substances of interest may be referred to as targets, probes, or analytes.

As used herein, when the terms "removably" and "coupled" (or "engaged") are used together to describe a relationship between components, the term is intended to mean that a connection between the components is readily separable without destroying or damaging the components. Components are readily separable when the components may be separated from each other without undue effort, or without a significant amount of time spent, in separating the components. For example, components may be removably coupled or engaged in an electrical manner such that the mating contacts of the components are not destroyed or damaged. Components may also be removably coupled or engaged in a mechanical manner such that the features that hold a component are not destroyed or damaged. Components may also be removably coupled or engaged in a fluidic manner such that ports of a component are not destroyed or damaged. The component is not considered to be destroyed or damaged if, for example, only a simple adjustment to the component (e.g., realignment) or a simple replacement (e.g., replacing a nozzle) is required.

As used herein, the term "fluid communication" or "fluidically coupled" refers to two spatial regions being connected together such that a liquid or gas may flow between the two spatial regions. For example, a microfluidic channel may be in fluid communication with a reaction chamber such that a fluid may flow freely into the reaction chamber from the microfluidic channel. The terms "in fluid communication" or "fluidically coupled" allow for two spatial regions being in fluid communication through one or more valves, restrictors, or other fluidic components to control or regulate a flow of fluid through a system.

As used herein, the term "immobilized," when used with respect to a biomolecule or biological or chemical substance, includes substantially attaching the biomolecule or biological or chemical substance at a molecular level to a surface. For example, a biomolecule or biological or chemical substance may be immobilized to a surface of the substrate material using adsorption techniques including non-covalent interactions (e.g., electrostatic forces, van der Waals, and dehydration of hydrophobic interfaces) and covalent binding techniques where functional groups or linkers facilitate attaching the biomolecules to the surface. Immobilizing biomolecules or biological or chemical substances to a surface of a substrate material may be based upon the properties of the substrate surface, the liquid medium carrying the biomolecule or biological or chemical substance, and the properties of the biomolecules or biological or chemical substances themselves. In some cases, a substrate surface may be functionalized (e.g., chemically or physically modified) to facilitate immobilizing the biomolecules (or biological or chemical substances) to the substrate surface. The substrate surface may be first modified to have functional groups bound to the surface. The functional groups may then bind to biomolecules or biological or chemical substances to immobilize them thereon.

As used herein, the term "magnet," includes permanent magnets and electromagnets.

In some examples, nucleic acids can be attached to a surface and amplified. Examples of such amplification are described in U.S. Pat. No. 7,741,463, entitled "Method of Preparing Libraries of Template Polynucleotides," issued Jun. 22, 2010, the disclosure of which is incorporated by reference herein, in its entirety. In some cases, repeated rounds of extension (e.g., amplification) using an immobilized primer and primer in solution may provide multiple copies of the nucleic acid.

In particular examples, the assay protocols executed by the systems and methods described herein include the use of natural nucleotides and also enzymes that are configured to interact with the natural nucleotides. Natural nucleotides include, for example, ribonucleotides or deoxyribonucleotides. Natural nucleotides can be in the mono-, di-, or tri-phosphate form and can have a base selected from adenine (A), Thymine (T), uracil (U), guanine (G) or cytosine (C). It will be understood however that non-natural nucleotides, modified nucleotides or analogs of the aforementioned nucleotides can be used.

FIG. 1 depicts an example of components of a system 100 that may be used to provide biological or chemical analysis. In some examples, system 100 is a workstation that may be similar to a bench-top device. For example, a majority (or all) of the systems and components for conducting the designated reactions may be within a common housing. In particular examples, system 100 is a nucleic acid sequencing system (or sequencer) configured for various applications, including but not limited to de novo sequencing, resequencing of whole genomes or target genomic regions, and metagenomics. The sequencer may also be used for DNA or RNA analysis. In some versions, system 100 may also be configured to generate reaction sites in a flow cell 110. For example, system 100 may be configured to receive a sample and generate surface attached clusters of clonally amplified nucleic acids derived from the sample. System 100 is further configured to utilize an imaging assembly 120 to capture images of the reaction sites on flow cell 110.

In particular examples, the system 100 is to perform a large number of parallel reactions within flow cell 110. Flow cell 110 includes one or more reaction sites where designated reactions may occur. The reaction sites may be, for example, immobilized to a solid surface of flow cell 110 or immobilized to beads (or other movable substrates) that are located within corresponding reaction chambers of flow cell 110. The reaction sites may include, for example, clusters of clonally amplified nucleic acids. Flow cell 110 may include one or more flow channels that receive a solution from the system 100 and direct the solution toward the reaction sites. Optionally, flow cell 110 may engage a thermal element for transferring thermal energy into or out of the flow channel.

System 100 may include various components, assemblies, and systems (or sub-systems) that interact with each other to perform a predetermined method or assay protocol for biological or chemical analysis. For example, system 100 includes a system controller 195 that may communicate with the various components, assemblies, and sub-systems of the system 100. Examples of such components are described in greater detail below.

In the present example, imaging assembly 120 includes a light emitter 150 that emits light that reaches reaction sites on flow cell 110. Light emitter 150 may include an incoherent light emitter (e.g., emit light beams output by one or more excitation diodes), or a coherent light emitter such as emitter of light output by one or more lasers or laser diodes. In the present example, light emitter 150 includes an optical fiber 152 for guiding an optical beam to be output via light emitter. However, other configurations of a light emitter 150 may be used. In some implementations, optical fiber 152 may optically couple to a plurality of different light sources (not shown), each light source emitting light of a different wavelength. Although system 100 is illustrated as having a single light emitter 150, multiple light emitters 150 may be included in some other implementations.

In the present example, the light that is output from light emitter 150 is collimated by collimation lens 154. The collimated light is structured (patterned) by light structuring optical assembly 156 and reaches a projection lens 158. In some versions, projection lens 158 includes a lens element that is operable to translate along an axis (i.e., the axis on which light emitter 150, collimation lens 154, and light structuring optical assembly 156 are aligned) to adjust the structured beam shape and path. For example, projection lens 156 may be translated along this axis to account for a range of sample thicknesses (e.g., different cover glass thickness) of the sample in flow cell 110. The foregoing illumination components 150, 152, 154, 156, 158 are just examples. System 100 may alternatively include any other suitable components to provide illumination, in addition to or in lieu of any of the illumination components 150, 152, 154, 156, 158 described above. For instance, some other variations may use non-structured illumination and/or any other kind of illumination and/or optical arrangements (e.g., epifluorescence microscopy, etc.).

In the present example, the light directed by dichroic mirror 160 through objective lens 142 onto a sample of a flow cell 110, which is positioned on a motion stage 170. In the case of a fluorescent sample, the sample fluoresces in response to the structured excitation light, and the resultant light is collected by objective lens 142 and directed to an image sensor of camera system 140 to detect fluorescence. In some implementations, a filter switching assembly 162 with one or more emission filters may be included, where the one or more emission filters may be used to pass through particular ranges of emission wavelengths and block (or reflect) other ranges of emission wavelengths. For example, the one or more emission filters may be used to switch between different channels of imaging assembly 120. For instance, the emission filters may be implemented as dichroic mirrors that direct emission light of different wavelengths from flow cell 110 to different image sensors of camera system 140. Filter switching assembly 162 may be omitted in some version.

In the example of system 100, fluid delivery module or device 190 may direct the flow of reagents (e.g., fluorescently labeled nucleotides, buffers, enzymes, cleavage reagents, etc.) to (and through) flow cell 110 and waste valve 180. Flow cell 110 may include one or more substrates upon which the samples are provided. For example, in the case of a system to analyze a large number of different nucleic acid sequences, flow cell 110 may include one or more substrates on which nucleic acids to be sequenced are bound, attached, or associated. The substrate may include any inert substrate or matrix to which nucleic acids may be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the flow cell 110. System 100 may also include a temperature station actuator 130 and heater/cooler 132 that may optionally regulate the temperature of conditions of the fluids within the flow cell 110.

In particular implementations, the flow cell 110 may be implemented as a patterned flow cell including a transparent cover plate, a substrate, and a liquid contained therebetween, and a biological sample may be located at an inside surface of the transparent cover plate or an inside surface of the substrate. The flow cell may include a large number (e.g., thousands, millions, or billions) of wells (also referred to as nanowells) or regions that are patterned into a defined array (e.g., a hexagonal array, rectangular array, etc.) into the substrate. Such wells may define reaction chambers providing reaction sites as described above. Each region may form a cluster (e.g., a monoclonal cluster) of a biological sample such as DNA, RNA, or another genomic material which may be sequenced, for example, using sequencing by synthesis. The flow cell may be further divided into a number of spaced apart lanes (e.g., eight lanes), each lane including a hexagonal array of clusters.

Flow cell 110 may be mounted on a sample stage 170 to provide movement and alignment of flow cell 110 relative to objective lens 142. Sample stage 170 may have one or more actuators to allow sample stage 170 to move in any of three dimensions. For example, in terms of the Cartesian coordinate system, actuators may be provided to allow sample stage 170 to move in the x, y, and z directions relative to objective lens 142, tilt relative to objective lens 142, and/or otherwise move relative to objective lens 142. Movement of sample stage 170 may allow one or more sample locations on flow cell 110 to be positioned in optical alignment with objective lens 142. Movement of sample stage 170 relative to objective lens 142 may be achieved by moving sample stage 170 itself, by moving objective lens 142, by moving some other component of imaging assembly 120, by moving some other component of system 100, or any combination of the foregoing. Further implementations may also include moving imaging assembly 120 over a stationary flow cell 110. Thus, in some versions, flow cell 110 may be fixed during imaging while one or more components of imaging assembly 120 is/are moved to capture images at different regions of flow cell 110.

In some implementations, a focus (z-axis) component 175 may be included to control positioning of the optical components relative to the flow cell 110 in the focus direction (e.g., along the z-axis or z-dimension). Focus component 175 may include one or more actuators physically coupled to the optical stage or the sample stage, or both, to move flow cell 110 on sample stage 170 relative to the optical components (e.g., the objective lens 142) to provide proper focusing for the imaging operation. For example, the actuator may be physically coupled to the respective stage such as, for example, by mechanical, magnetic, fluidic, or other attachment or contact directly or indirectly to or with the stage. The one or more actuators may be configured to move the stage in the z-direction while maintaining the sample stage in the same plane (e.g., maintaining a level or horizontal attitude, perpendicular to the optical axis). The one or more actuators may also be configured to tilt sample stage 170. This may be done, for example, so that flow cell 110 may be leveled dynamically to account for any slope in its surfaces. While focus component 175 is described as providing relative movement between flow cell 110 and imaging assembly 120 along the z-direction and/or in a tilting range of motion, other actuators may provide relative movement between flow cell 110 and imaging assembly 120 along other directions (e.g., along the x-dimension, along the y-dimension, etc.).

Camera system 140 may include one or more image sensors to monitor and track the imaging (e.g., sequencing) of flow cell 110. Camera system 140 may be implemented, for example, as a CCD or CMOS image sensor camera, but other image sensor technologies (e.g., active pixel sensor) may be used. While camera system 140 and associated optical components are shown as being positioned above flow cell 110 in FIG. 1, one or more image sensors or other camera components may be incorporated into system 100 in numerous other ways as will be apparent to those skilled in the art in view of the teachings herein. For instance, one or more image sensors may be positioned under flow cell 110 or may even be integrated into flow cell 110.

II. Examples of Features and Methods to Capture Vibration in System

Figure 2A:
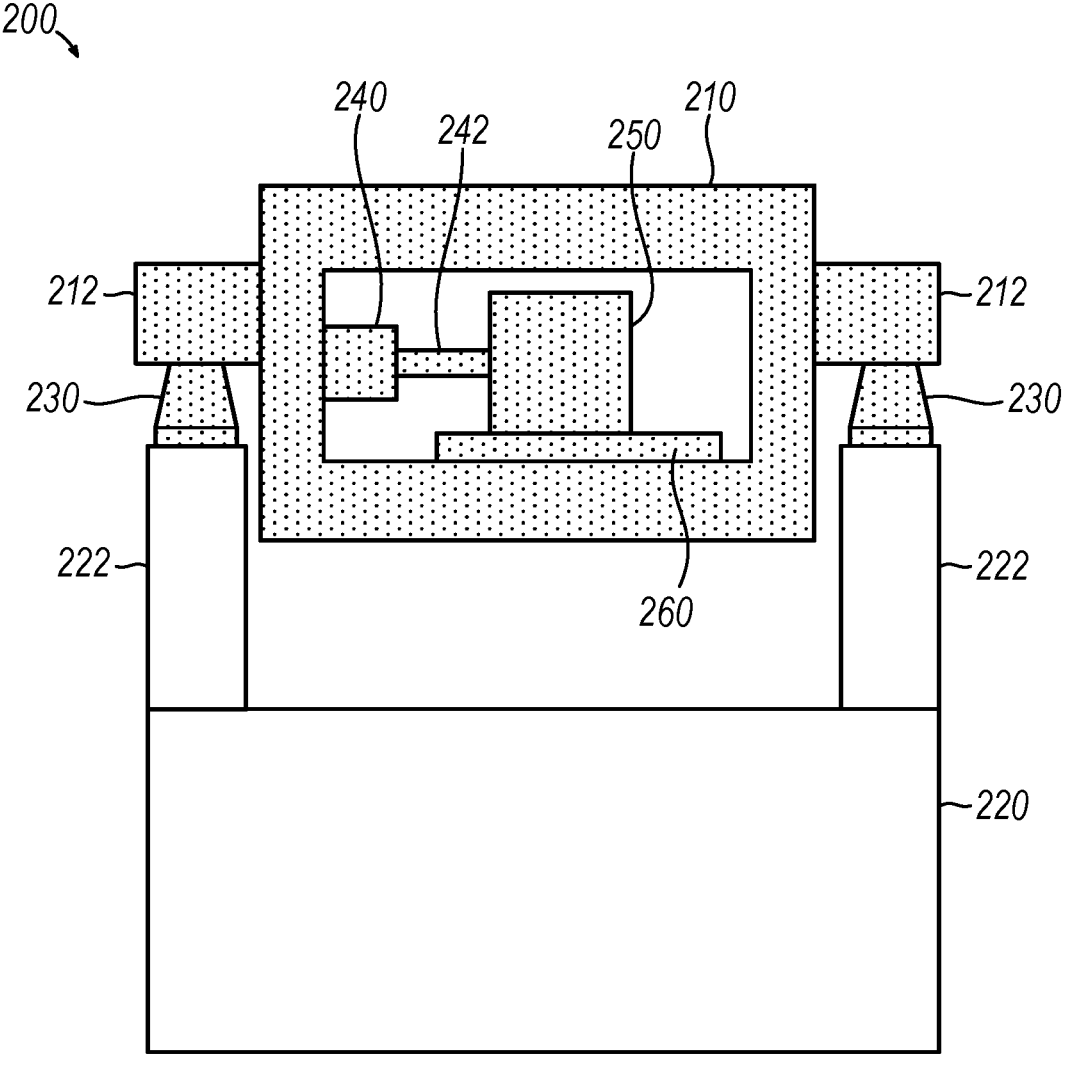
FIG. 2A depicts a schematic elevation diagram of an imaging system representing a version of the imaging system of FIG. 1, with an imaging assembly of the imaging system in a stationary state.
Figure 2B:
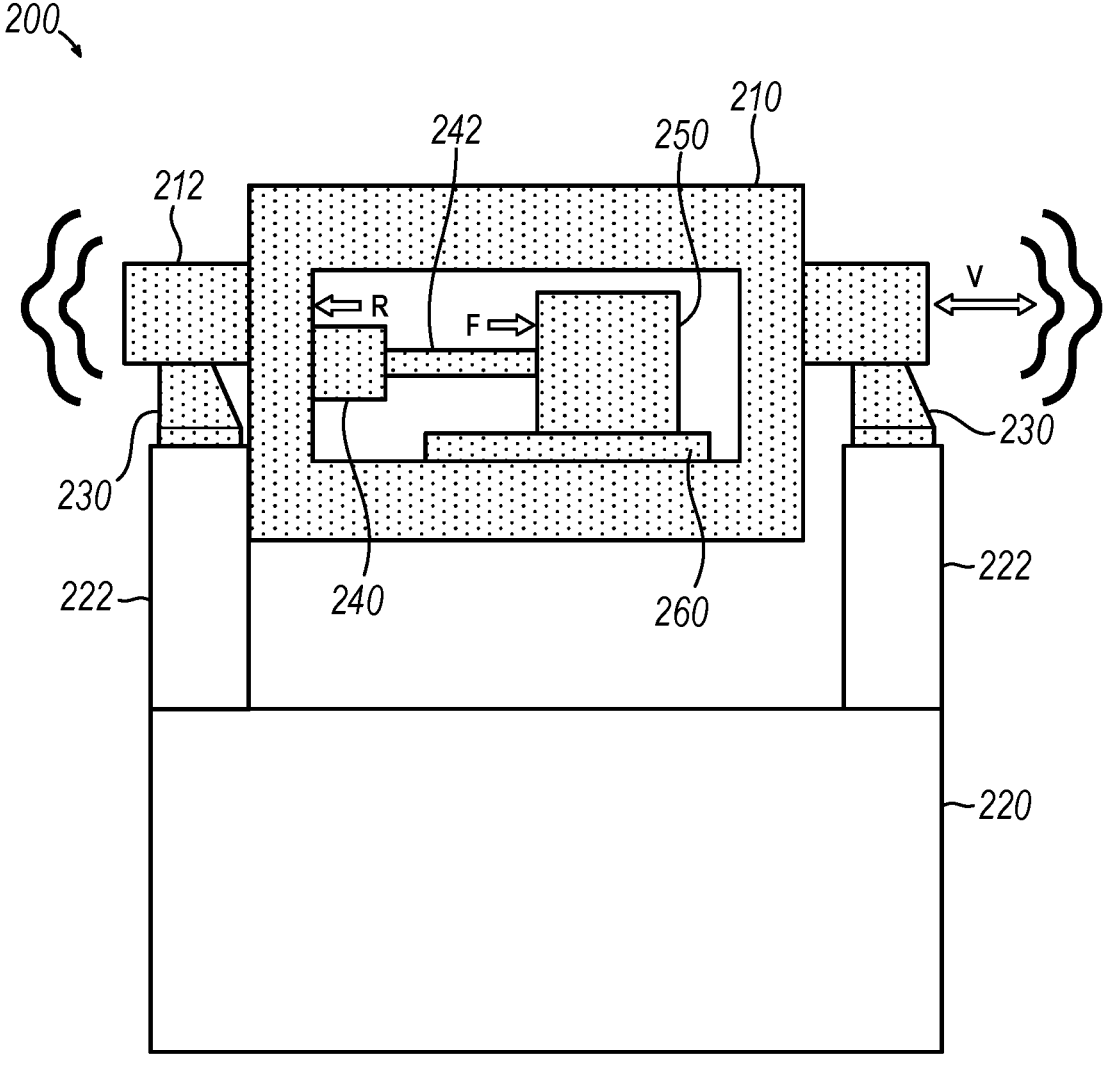
FIG. 2B depicts a schematic elevation diagram of the imaging system of FIG. 2A, with the imaging assembly in an accelerated state.

FIGS. 2A-2B show an example of how system 100 may be configured. In particular, FIGS. 2A-2B show a system 200 that is configured and operable just like system 100 described above, except as otherwise described below. System 200 of this example includes a frame 210 and a chassis 220. Chassis 220 provides support to frame 210 and is configured to be mechanically grounded to earth. For instance, chassis 220 may sit directly on a floor of a laboratory or other facility, may sit on a benchtop or other work surface that is mechanically grounded to earth, or may otherwise be mechanically grounded to earth.

As shown, a set of vibration isolators 230 are interposed between support arms 222 of chassis 220 and support arms 212 of frame 210. While two vibration isolators 230 are shown, any suitable number of vibration isolators 230 (e.g., four vibration isolators 230) may be provided. Vibration isolators 230 are configured to isolate frame 210 from movement that might otherwise be caused by external forces acting upon chassis 220. For instance, if chassis 220 is bumped or encounters vibration from the ground, etc., vibration isolators will absorb the corresponding vibration or other movement communicated via support arms 222, to thereby prevent such vibration or other movement from being transferred to frame 210. In some versions, vibration isolators 230 include a gel material. Alternatively, vibration isolators 230 may include any other kind(s) of material(s) and/or other features (e.g., air filled bladder, liquid-filled bladder, foam material, etc.) that are configured to isolate frame 210 from movement that might otherwise be caused by external forces acting upon chassis 220.

As also shown in FIGS. 2A-2B, system 200 includes an actuator 240, an imaging assembly 250, and a flow cell 260. Actuator 240 and flow cell 260 are each fixedly secured to frame 210 in this example. Imaging assembly 250 is coupled with actuator 240 via a transmission assembly 242. Actuator 240 and transmission assembly 242 together may include a motor, a lead screw, a ballscrew, a linear motor, a voice coil, a solenoid, a pneumatic piston and cylinder, direct drive, rack and pinion, belt, chain, arm, cam assembly, linkage, and/or any other suitable kind(s) of component(s). Actuator 240 and transmission assembly 242 are operable to drive movement of imaging assembly 250 to thereby reposition imaging assembly 250 relative to flow cell 260, to thereby capture images at different regions of flow cell 260. By way of example only, actuator 240 may include one or more motors, one or more solenoids, one or more pneumatic cylinder-piston assemblies, and/or any other suitable components. Furthermore, while imaging assembly 250 is coupled with actuator 240 via a transmission assembly 242 in this example, any other suitable kind(s) of structure(s) may be used to couple imaging assembly 250 with actuator 240. In some versions, actuator 240 and transmission assembly 242 are operable to move imaging assembly 250 along only one single dimension (e.g., the x-dimension). In some other versions, actuator 240 and transmission assembly 242 are operable to move imaging assembly 250 along two dimensions (e.g., along an x-y plane). In still other versions, actuator 240 and transmission assembly 242 are operable to move imaging assembly 250 along three dimensions (e.g., along the x, y, and z-dimensions).

Imaging assembly 250 may be configured and operable like imaging assembly 120 described above. Alternatively, imaging assembly 250 may have any other suitable components, features, or configurations. Similarly, flow cell 260 may be configured and operable like flow cell 110 described above. Alternatively, flow cell 260 may have any other suitable components, features, or configurations.

In the present example, flow cell 110 remains fixedly secured relative to frame 210 as actuator 240 transmission assembly 242 move imaging assembly 250 relative to flow cell 110. In some other versions, imaging assembly 250 remains fixedly secured relative to frame 210 as actuator 240 transmission assembly 242 move flow cell relative to imaging assembly 250. In still other versions, system 200 includes at least two actuators, including an actuator that is operable to drive movement of imaging assembly 250 and an actuator that is operable to drive movement of flow cell 110. It should therefore be understood that actuator 240 of this example may be configured and operable similar to focus component 175 described above.

Regardless of whether imaging assembly 250 or flow cell 110 is moved to allow imaging assembly 250 to capture images at different regions of flow cell 110, such movement may tend to induce vibration in frame 210. An example of this is shown in FIG. 2B, where actuator 240 has transitioned from a non-actuated state (FIG. 2A) to an actuated state (FIG. 2B), thereby transitioning imaging assembly 250 from a stationary state to an accelerated state. To achieve this transition, actuator 240 imparts a driving force (F) on imaging assembly 250 in a first direction; which in turn provides a reactionary force (R) on frame 210 in an opposite direction along the same dimension of the driving force (F). This reactionary force (R) causes frame to shift laterally on vibration isolators 230. In response, vibration isolators 230 urge frame 210 back to a neutral position (as shown in FIG. 2A).

The interaction between the reactionary force (R) generated by activation of actuator 240 and resilience in vibration isolators 230 may ultimately cause frame 210 to oscillate or vibrate for some period of time, such that frame 210 moves relative to chassis 220 and relative to the ground in a vibrational movement (V). This oscillation or vibration of frame 210 may cause corresponding movement of flow cell 260. To the extent that imaging assembly 250 also receives some of the vibrational movement (V) of frame 210 via actuator 240 and transmission assembly 242, this movement of imaging assembly 250 might not have 1:1 parity with the vibrational movement (V) of flow cell 260. Thus, the relative movement between imaging assembly 250 and flow cell 260 during the oscillating/vibrating state shown in FIG. 2B might prevent imaging assembly 250 from capturing non-blurred images of anything on or in flow cell 260, such that the captured images are undesirably blurry or are otherwise less than satisfactory. Moreover, the inertia of fluid (and particles contained in the fluid) in flow cell 260 might provide an out-of-synch movement of the fluid/particles relative to the supporting structure of flow cell 260, which may further exacerbate difficulties in achieving satisfactory non-blurred in images captured by imaging assembly 250 during the oscillating/vibrating state shown in FIG. 2B.

The oscillating/vibrating state shown in FIG. 2B may tend to occur right when actuator 240 is activated to drive imaging assembly 250, during the corresponding movement of imaging assembly 250, and for a period after actuator 240 ceases movement of imaging assembly 250. In versions of system 200 such as those shown in FIGS. 2A-2B, it may be desirable to wait for a certain period of settling time or "ring down" time (e.g., ranging from approximately 50 ms to approximately 500 ms) after actuator ceases movement of imaging assembly 250 before activating imaging assembly 250 to capture images of regions of flow cell 260. This ring down waiting period may tend to constrain the rate of image capture, such that more images could be captured per unit of time with imaging assembly 250 if this ring down waiting period could be eliminated. Eliminating vibration isolators 230, and thereby providing a rigid coupling between frame 210 and chassis 220, may prevent the occurrence of the oscillating/vibrating state shown in FIG. 2B; and may thereby eliminate the ring down waiting period. However, such a solution may tend to create another problem by allowing external forces on chassis 220 to be communicated to frame 210, which may in turn provide undesired relative movement between imaging assembly 250 and flow cell 260, which may in turn provide undesirable blur in images captured by imaging assembly 250.

Figure 3:
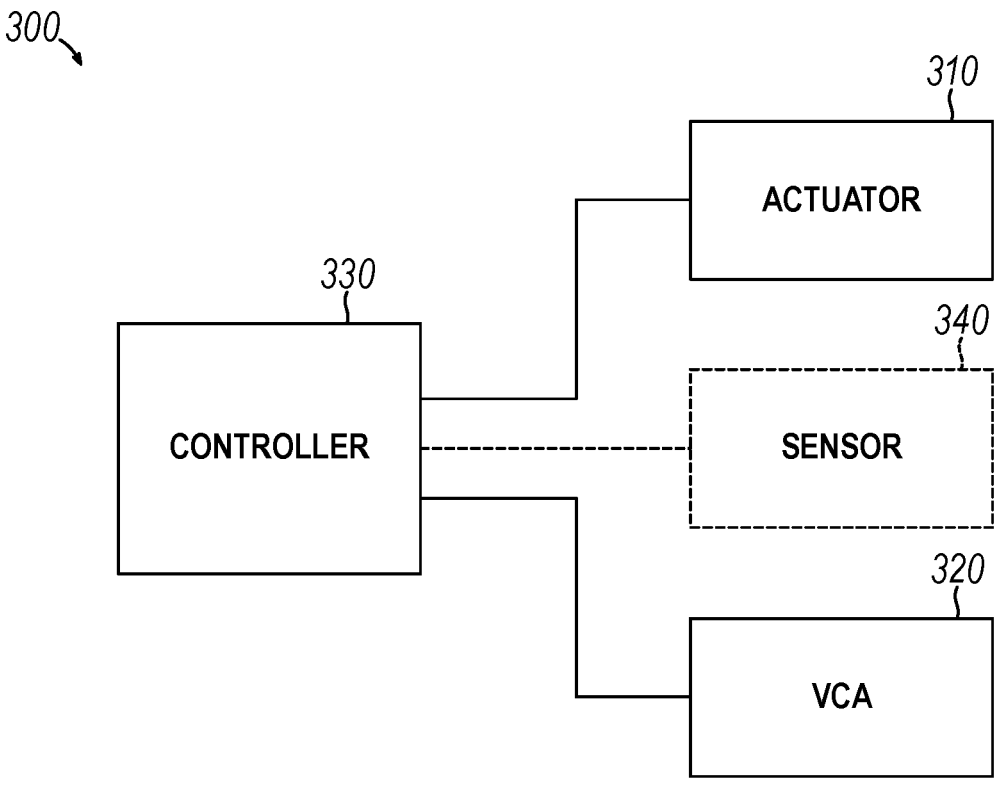
FIG. 3 depicts a block schematic of components that may be integrated into a variation of the imaging system of FIG. 2A.

In view of the foregoing, it may be desirable to provide a version of a system 100, 200 that is able to dampen, capture, or otherwise resist vibrations that might otherwise occur in frame 210 when actuator 240 is activated and deactivated; while also preventing external forces on chassis 220 from being communicated to frame 210. In other words, it may be desirable to provide a version of a system 100, 200 that provides a combination of damping (with respect to internally generated forces) and isolation (with respect to externally generated forces). Such versions may enable a succession of images to be captured rapidly, thereby enhancing throughput, without compromising image quality by making system 100, 200 unduly vulnerable to external forces acting on chassis 220. To that end, FIG. 3 shows an example of an arrangement 300 that may be integrated into system 100, 200 to provide damping and isolation. Arrangement 300 of this example includes an actuator 310, a vibration capture assembly 320, a controller 330, and, optionally, a sensor 340.

Actuator 310 of this arrangement may be viewed as being analogous to actuator 240, focus component 175, and/or any other component(s) that drive(s) movement of an imaging assembly (e.g., imaging assembly 120 or imaging assembly 250) and/or a flow cell (e.g., flow cell 110 or flow cell 260) within a frame (e.g., frame 210). Thus, actuator 310 may include one or more motors, one or more solenoids, one or more voice coils, one or more pneumatic cylinder-piston assemblies, and/or any other suitable components. In addition, one or more lead screws, ballscrews, direct drives, rack and pinion arrangements, belts, chains, arms, cam assemblies, linkages, and/or any other suitable kind(s) of component(s) may couple actuator 310 with an imaging assembly (e.g., imaging assembly 120 or imaging assembly 250) and/or a flow cell (e.g., flow cell 110 or flow cell 260) to thereby enable actuator 310 to drive movement of the imaging assembly and/or flow cell within a frame (e.g., frame 210).

Vibration capture assembly 320 is operable to transition between an activated state and a non-activated state. When vibration capture assembly 320 is in an activated state, vibration capture assembly 320 is configured to provide damping (with respect to internally generated forces). When vibration capture assembly 320 is in a non-activated state, vibration capture assembly 320 is configured to permit isolators (e.g., vibration isolators 230) to provide isolation (with respect to externally generated forces). Various examples of forms that vibration capture assembly 320 may take, including examples of components of vibration capture assembly 320 and locations for such components, will be described in greater detail below.

Controller 330 is operable to activate/deactivate actuator 310. Controller 330 is also operable to activate/deactivate vibration capture assembly 320. Examples of algorithms that may be executed by controller 330 to activate/deactivate vibration capture assembly 320 will be described in greater detail below. In some versions, controller 330 also provides the functionalities described above with respect to controller 195. Controller 330 may include one or more processors, one or more memories, and various other suitable electrical components. In some versions, one or more components of controller 330 (e.g., one or more processors, etc.) is/are embedded within system 100, 200. In addition, or in the alternative, one or more components of controller 330 (e.g., one or more processors, etc.) may be detachably attached or detachably connected with other components of system 100, 200. Thus, at least a portion of controller 330 may be removable. Moreover, at least a portion of controller 330 may be remote from frame 100 and/or chassis 200 in some versions.

Sensor 340 is operable to sense real-time conditions associated with activation of actuator 310. Sensor 340 is further operable to communicate signals to controller 330 indicating the sensed conditions. By way of example only, sensor 340 may include one or more force sensors, one or more position sensors, one or more accelerometers, limit switches or contacts, etc. Thus, all references to a "sensor" shall be read to include scenarios where a plurality of sensors are used, such that the term "sensor" shall be understood to represent both the singular and the plural form. In versions where sensor 340 includes one or more force sensors, such force sensors may include one or more strain gauges, piezoelectric force sensors, inductive force sensors, capacitive force sensors, and/or any other suitable kind(s) of force sensors. Such force sensors may sense forces at the interface between actuator 310 and a frame (e.g., frame 210) and/or elsewhere within system 100, 200. In versions where sensor 340 includes one or more position sensors, such position sensors may include one or more optical encoders, hall effect sensors, capacitive sensors, and/or any other suitable kind(s) of capacitive sensors. Such position sensors may track movement of an imaging assembly (e.g., imaging assembly 120 or imaging assembly 250) relative to a frame (e.g., frame 210), movement of a frame (e.g., frame 210) relative to a chassis (e.g., chassis 220), and/or any other kind of relative movement caused by activation/deactivation of actuator 310. In versions where actuator 310 includes a motor, sensor 340 may be configured to sense a back electromotive force (EMF) of the motor.

In any of these above-described examples where arrangement 300 includes sensor 340, sensor 340 may sense real-time conditions associated with activation of actuator 310 and transmit corresponding signals to controller 330; and controller 330 may utilize such signals in executing an algorithm to control activation/deactivation of vibration capture assembly 320. As noted above, sensor 340 is optional, such that sensor 340 may be omitted in some versions.

A. Examples of Contact-Free Vibration Capture Assemblies

As noted above, it may be desirable to provide a vibration capture assembly 320 that is operable to selectively provide damping (with respect to internally generated forces) and also permit isolation (with respect to externally generated forces). It may also be desirable to provide a version of vibration capture assembly 320 that provides damping without requiring components to contact each other when vibration capture assembly 320 is activated to provide damping. For instance, contact-free versions of vibration capture assembly 320 may avoid or otherwise reduce risks of hysteresis, components temporarily sticking together when they should be separate, and/or other phenomena that might otherwise occur in versions of vibration capture assembly 320 that require components to contact each other when vibration capture assembly 320 is activated to provide damping. Such contact-related phenomena may adversely affect the timing and/or smoothness of operation of versions of vibration capture assembly 320 that require components to contact each other when vibration capture assembly 320 is activated to provide damping. Thus, a contact-free version of vibration capture assembly 320 may provide smoother, more predictable operation than a contact-based version of vibration capture assembly 320.

Figure 4A:
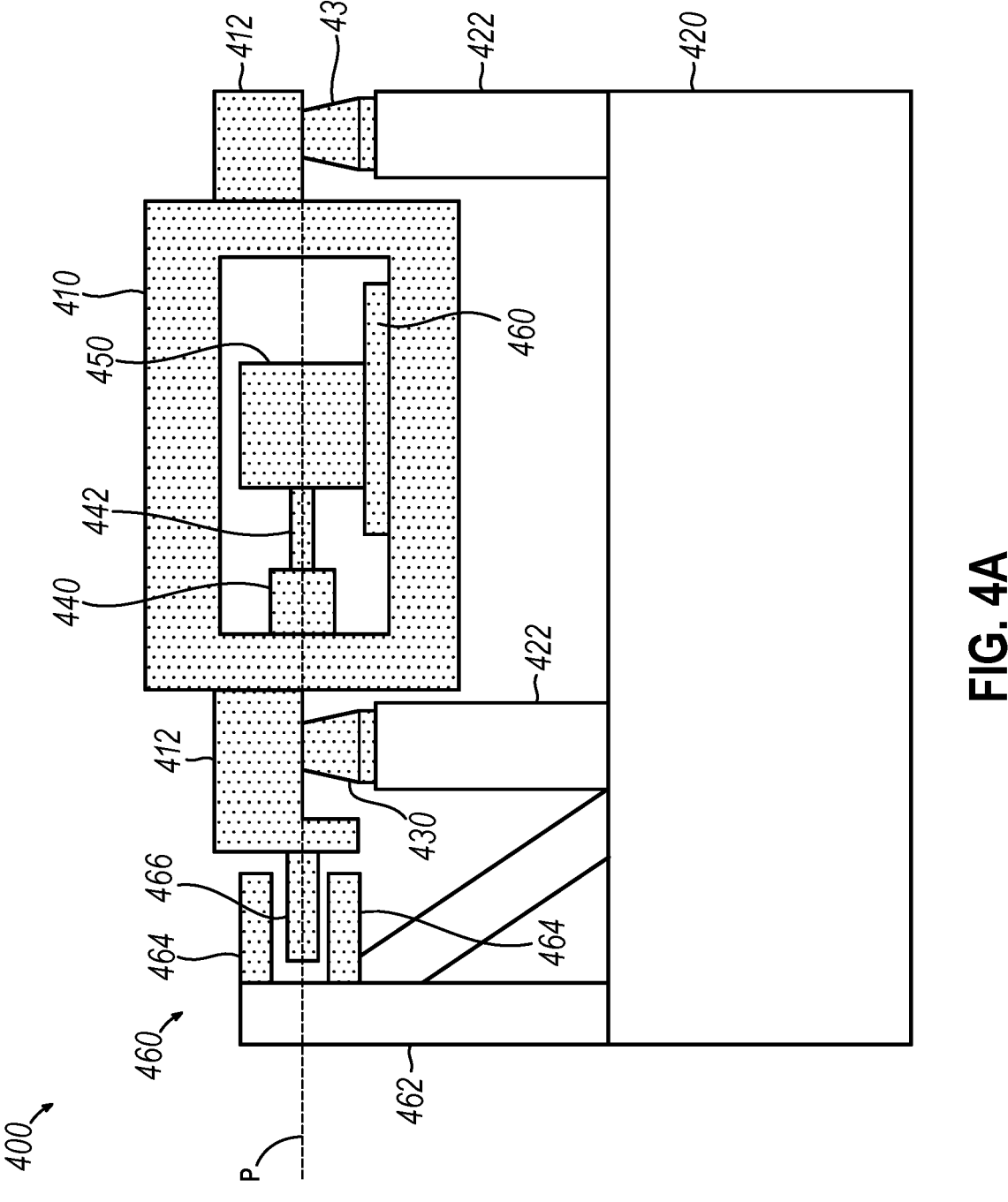
FIG. 4A depicts a schematic elevation diagram of an imaging system representing a version of the system of FIG. 2A incorporating at least some of the components of FIG. 3, with an actuator of the imaging system in a stationary state, and a vibration capture assembly in a non-damping state.
Figure 4B:
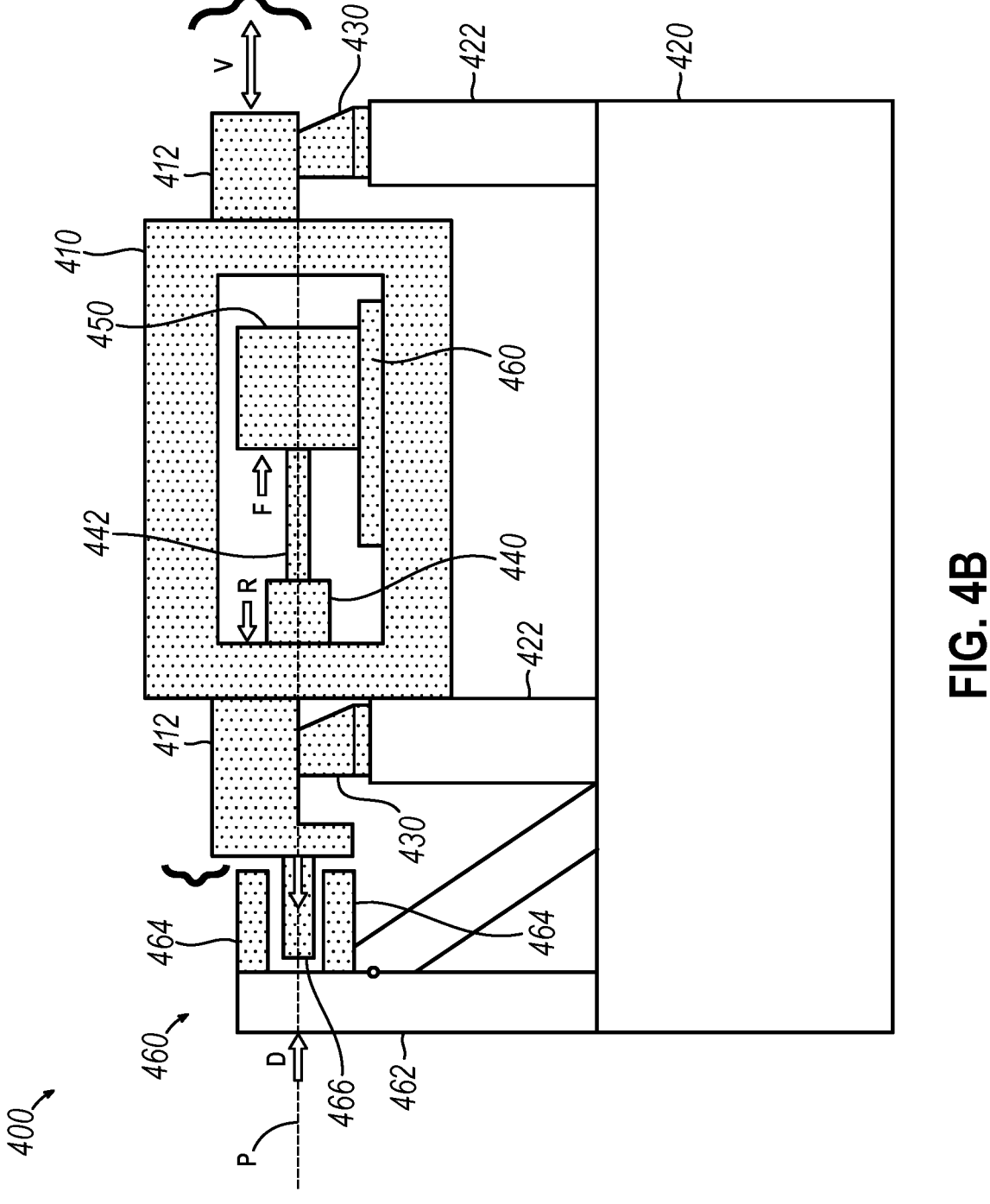
FIG. 4B depicts a schematic elevation diagram of the imaging system of FIG. 4A, with the actuator in an accelerated state, and the vibration capture assembly in a damping state.
Figure 4C:
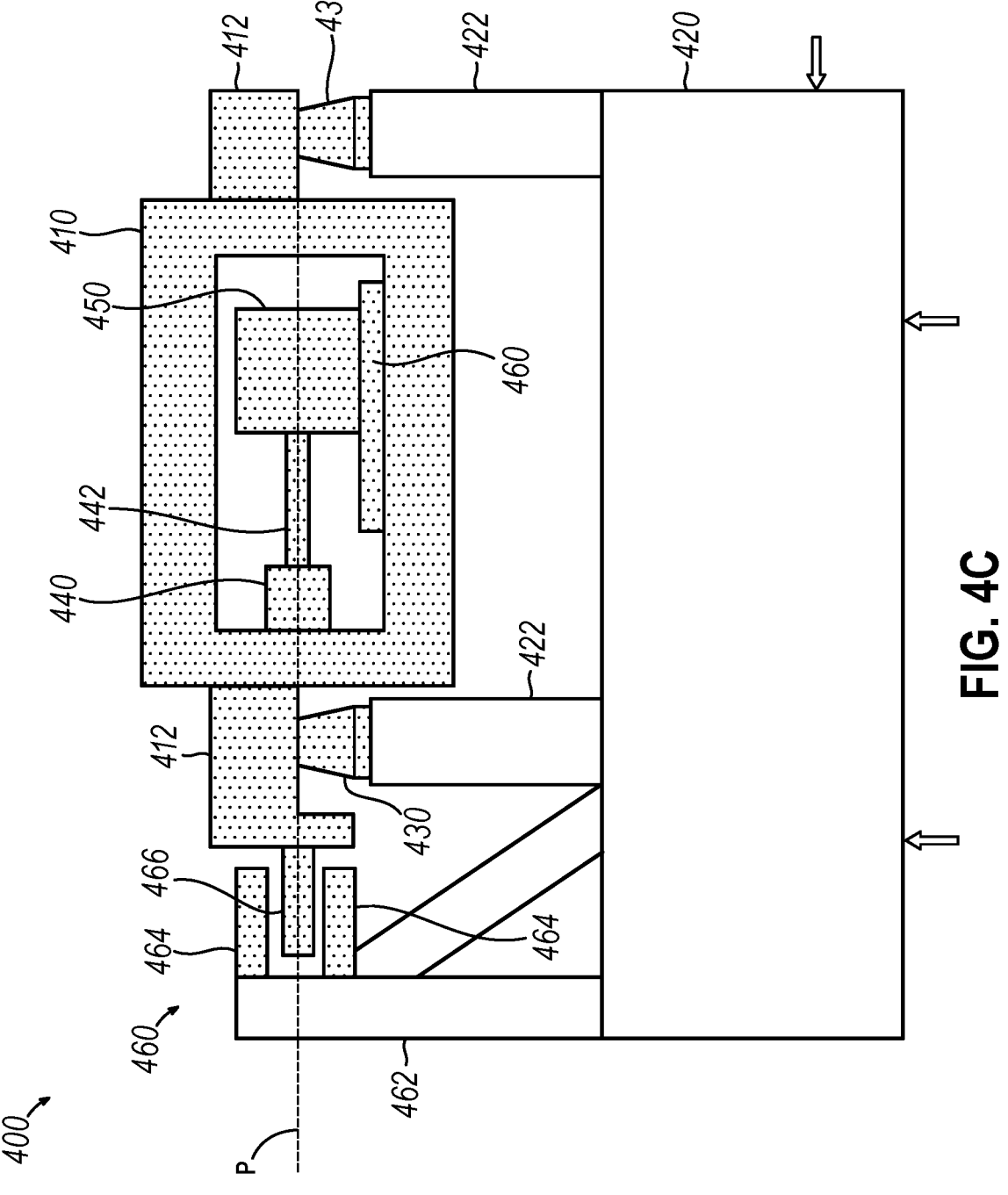
FIG. 4C depicts a schematic elevation diagram of the imaging system of FIG. 4A, with the actuator in a stationary state after being accelerated, and the vibration capture assembly in the non-damping state.

FIGS. 4A-4C show an example of a system 400 representing a version of system 200 that includes a contact-free version of vibration capture assembly 320 in the form of a vibration capture assembly 460. System 400 is configured and operable just like system 200 described above, except as otherwise described below. System 400 of this example includes a frame 410 and a chassis 420. Chassis 420 provides support to frame 410 and is configured to be mechanically grounded to earth. For instance, chassis 420 may sit directly on a floor of a laboratory or other facility, may sit on a benchtop or other work surface that is mechanically grounded to earth, or may otherwise be mechanically grounded to earth. Chassis 420 of this example is a fully rigid structure such that the structure of chassis 420 is configured to substantially resist any deflection in response to applied forces.

As shown, a set of vibration isolators 430 are interposed between support arms 422 of chassis 420 and support arms 412 of frame 410. While two vibration isolators 430 are shown, any suitable number of vibration isolators 430 (e.g., four vibration isolators 430) may be provided. Vibration isolators 430 are configured and operable just like vibration isolators 230 described above. System 400 of the present example further includes an actuator 440, a transmission assembly 442, an imaging assembly 450, and a flow cell 460. Actuator 440, transmission assembly 442, imaging assembly 450, and flow cell 460 may also be configured and operable just like actuator 240, transmission assembly 242, imaging assembly 250, and flow cell 260, respectively. Like actuator 240 and flow cell 260 are fixedly secured to frame 210, actuator 440 and flow cell 460 are fixedly secured to frame 410 in this example. However, some variations may provide controlled movement of flow cell 460 relative to frame 410, as described above with respect to flow cell 260 and frame 210.

Vibration capture assembly 460 of this example includes a pair of fixed members 464 that are rigidly secured to chassis 420 via a rigid support structure 462. Rigid support structure 462 is shown as including an upright arm, but it should be understood that rigid support structure 462 may take any other suitable form and may include any other suitable components. Vibration capture assembly 460 further includes a movable member 466 that is rigidly secured to frame 410 via support arm 412. Movable member 466 is positioned between fixed members 464 yet remains spaced apart from fixed members 464. Various examples of forms that may be taken by fixed members 464 and movable member 466 will be described in greater detail below. As will also be described in greater detail below, members 464, 466 are configured to cooperate to dampen or resist movement of frame 410 relative to chassis 420 when vibration capture assembly 460 is in the activated or damping state.

As will be described in greater detail below, actuator 440 is operable to drive movement of imaging assembly 450 along a plane (P) in the present example, with the plane (P) extending along the x and y-dimensions. In some variations, actuator 440 is only operable to drive movement of imaging assembly 450 along a single dimension (e.g., the x-dimension or the y-dimension). Also in the present example, vibration capture assembly 460 is positioned along the plane (P). In particular, movable member 466 extends along the plane (P). In some other versions, vibration capture assembly 460 may be positioned elsewhere in relation to the plane (P). In some such versions, vibration capture assembly 460 is offset from the plane (P), and a lever arm or other component/assembly is positioned at the plane (P). This lever arm or other component/assembly may transmit the vibrational movement that occurs along the plane (P) to vibration capture assembly 460. In some such versions, lever arm or other component/assembly may amplify the vibrational movement through mechanical advantage, thereby enhancing performance of vibration capture assembly 460.

The positioning of a portion of vibration capture assembly 460, or a component that is mechanically coupled with vibration capture assembly 460, along the same plane (P) or dimension of movement of imaging assembly 450 may provide the greatest efficacy of vibration capture assembly 460 in damping vibration or other movement of frame 410 that is caused by movement of imaging assembly 450. In other words, vibration capture assembly 460 may provide the greatest efficacy in damping vibration or other movement of frame 410 that is caused by movement of imaging assembly 450 when vibration capture assembly is configured to provide a damping force along the same plane (P) or dimension of movement of imaging assembly 450, regardless of whether that damping force is provided directly or indirectly via a lever arm or other component/assembly.

In some versions, actuator 440 is operable to drive movement of imaging assembly 450 along only one dimension (e.g., in the x-dimension). In such versions, at least a portion of vibration capture assembly 460 (or a lever arm or other component/assembly that is mechanically coupled with vibration capture assembly 460) may be positioned along that dimension of motion of imaging assembly 450. In some other versions, actuator 440 is operable to drive movement of imaging assembly 450 along more than two dimensions (e.g., along the x, y, and z-dimensions). In such versions, more than one vibration capture assembly 460 may be provided, with different vibration capture assemblies 460 (or lever arms or other components/assemblies that are mechanically coupled with vibration capture assemblies 460) being positioned along different planes/dimensions of motion of imaging assembly 450.

Operation of system 400 may begin in the state shown in FIG. 4A, where actuator 440 is not yet activated, where imaging assembly 450 is in an initial position, and where vibration capture assembly 460 is in a non-damping state. Thus, in the state shown in FIG. 4A, vibration isolators 430 may absorb any external forces imparted on chassis 420 and thereby isolate frame 410 (and the components contained in frame 410) from those external forces.

Next, actuator 440 may be activated to drive imaging assembly 450 along the plane (P) via transmission assembly 442, as shown in FIG. 4B. Shortly before or upon activation of actuator 440, vibration capture assembly 460 may be activated to provide a damping state, such that vibration capture assembly 460 is in the damping state when actuator 440 is activated. The activation of actuator 440 provides a driving force (F) on imaging assembly 450 via transmission assembly 442 in a first direction along the plane (P); which in turn provides a reactionary force (R) on frame 410 in an opposite direction along the plane (P). Given the flexibility of vibration isolators 430, the reactionary force (R) on frame 410 may tend to drive movement of frame 410 along the plane (P), relative to chassis 420, resulting in a vibrational movement (V). However, with vibration capture assembly 460 in the damping state, vibration capture assembly 460 may resist or at least substantially reduce this vibrational movement (V). For instance, in the damping state, vibration capture assembly 460 may "rigidize" the coupling between frame 410 and the ground under chassis 420, effectively trumping the flexible coupling provided by vibration isolators 430. In some cases, vibration capture assembly 460 converts vibration energy to heat and damps vibration by extracting the energy quickly and dissipating it. The force transmitted from frame 410 to chassis 420 may be proportional to the velocity of the vibration motions of frame 410.

In some versions, vibration capture assembly 460 completely eliminates the vibrational movement (V) when vibration capture assembly 460 is in the damping state. In some other versions, vibration capture assembly 460 reduces vibrational movement (V) to a tolerable level (e.g., to a level where vibrational movement (V) does not adversely affect images captured by imaging assembly 450) when vibration capture assembly 460 is in the damping state. As described in greater detail below, some versions of vibration capture assembly 460 may provide variable degrees of damping, which may in turn provide varying impact on vibrational movement (V) of frame 410 relative to chassis 420.

Once imaging assembly 450 has been repositioned to capture an image at a different region of flow cell 460, actuator 440 may be deactivated as shown in FIG. 4C. When actuator 440 is deactivated to cease driving imaging assembly 450, the arresting of movement of imaging assembly 450 may tend to momentarily cause more vibrational movement (V) of frame 410 relative to chassis 420. Vibration capture assembly 460 may thus remain in the damping state for at least some period of time after actuator 440 is deactivated, to resist or otherwise reduce such vibrational movement (V). Vibration capture assembly 460 may nevertheless eventually transition back to the non-damping state. After vibration capture assembly 460 transitions back to the non-damping state in the arrangement shown in FIG. 4C, vibration isolators 430 may again absorb any external forces imparted on chassis 420 and thereby isolate frame 410 (and the components contained in frame 410) from those external forces.

The foregoing sequence described with respect to FIGS. 4A-4C may be carried out each and every time actuator 440 is activated/deactivated to drive/arrest movement of imaging assembly 450 relative to flow cell 460.

While not shown in FIGS. 4A-4C, system 400 may also include versions of controller 330 and sensor 340 that provide functionality like controller 330 and sensor 340 described above. Thus, controller 330 may drive activation of actuator 440, sensor 340 may track conditions associated with activation of actuator 440, and controller 330 may drive activation of vibration capture assembly 460 based at least in part on signals from sensor 340 (and/or based on other conditions and/or based on a predetermined drive routine).

While vibration capture assembly 460 is shown as being separate from vibration isolators 430 in the present example, some versions may integrate vibration capture assembly 460 into one or all of vibration isolators 430. For instance, members 464, 466 may be encapsulated within a gel material forming vibration isolators 430. In some such versions, vibration isolators 430 may be overmolded about one or more components of vibration capture assembly 460. Alternatively, vibration capture assembly 460 may be positioned elsewhere within system 400 and/or may be integrated with any other suitable components of system 400.

1. Example of Vibration Capture Assembly with Eddy Current Plates

FIGS. 5A-7B show an example of a vibration capture assembly 500 that may be used as a version of vibration capture assembly 460 described above. Vibration capture assembly 500 of this example includes a set 502 of plates 510, 520, an actuator 530, and a magnet 540. First plate 510 includes a plurality of laterally extending fingers 512 defining a plurality of slots 514 between fingers 512. Second plate 520 includes a plurality of laterally extending fingers 522 defining a plurality of slots 524 between fingers 522. Plates 510, 520 are configured and arranged such that fingers 522 of plate 520 correspond with slots 514 of plate 510; and such that fingers 512 of plate 510 correspond with slots 524 of plate 520. Each plate 510, 520 is constructed from an electrically conductive material (e.g., copper, etc.). In the context of the arrangement of system 400 shown in FIGS. 4A-4C, a first set 502a of plates 510, 520 may serve as one of fixed members 464; while another set 502b of plates 510, 520 may serve as another one of fixed members 464. Vibration capture assembly 500 may thus ultimately include two sets 502a, 502b of plates 510, 520. Alternatively, vibration capture assembly 500 may include just one 502 set of plates 510, 520.

Figures 5A, 5B:
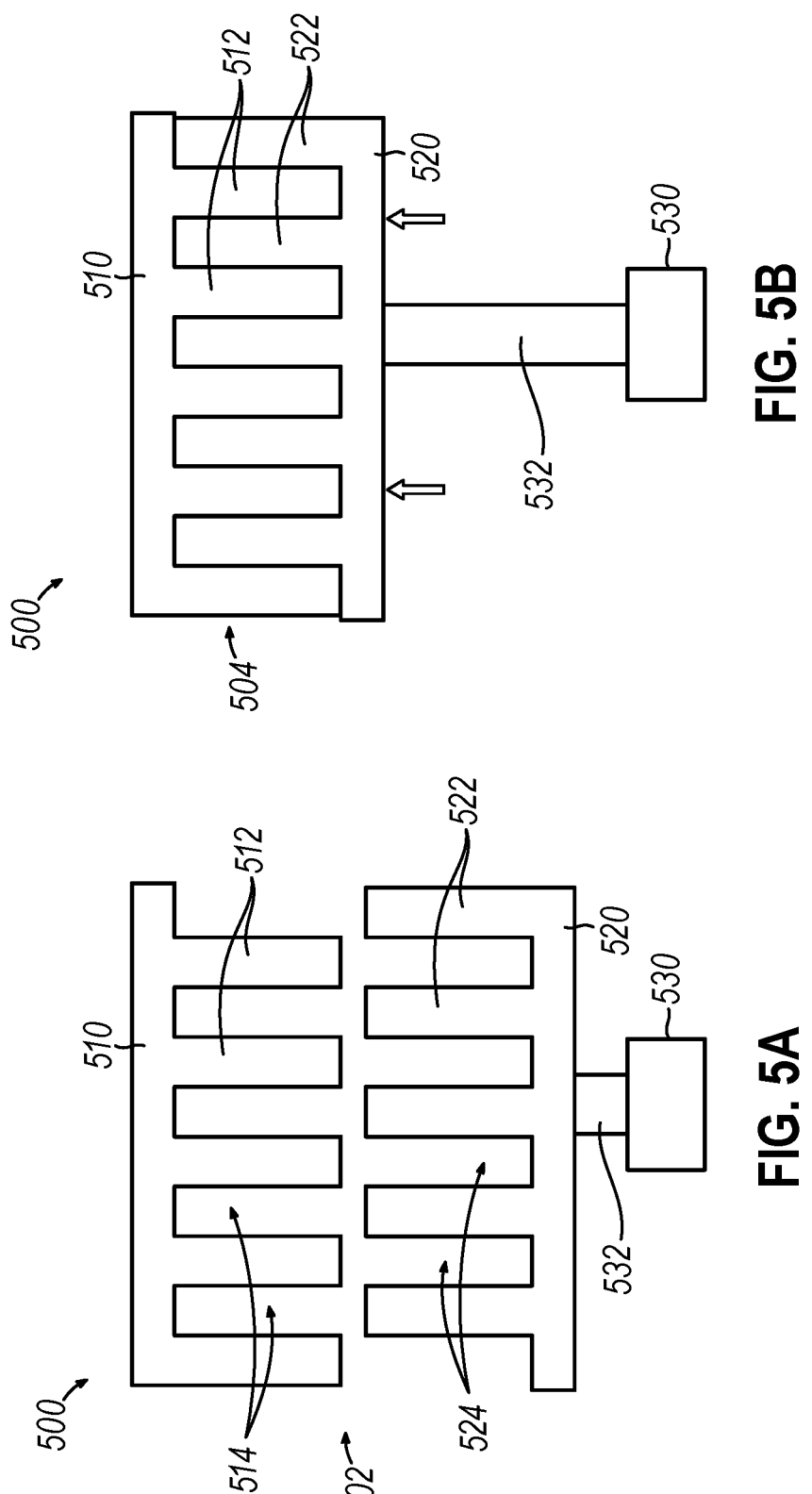
FIG. 5A depicts a schematic top plan view of eddy current plates of a vibration capture assembly in a separated state.
FIG. 5B a schematic top plan view of the eddy current plates of FIG. 5A in a contacting state.

Second plate 520 is coupled with actuator 530 via a transmission assembly 532. Actuator 530 and transmission assembly 532 together may include a motor, a lead screw, a ballscrew, a linear motor, a voice coil, a solenoid, a pneumatic piston and cylinder, direct drive, rack and pinion, belt, chain, arm, cam assembly, linkage, and/or any other suitable kind(s) of component(s). Actuator 530 and transmission assembly 532 are operable to drive second plate 520 toward and away from first plate 510. When actuator 530 is in a non-actuated state as shown in FIG. 5A, second plate 520 is spaced apart from first plate 510, such that that fingers 522 of plate 520 are not in contact with fingers 512 of plate 510; and such that fingers 522 of plate 520 are not otherwise electrically coupled with fingers 512 of plate 510. When actuator 530 is in an actuated state as shown in FIG. 5B, second plate 520 is driven toward first plate 510, such that that fingers 522 of plate 520 are disposed in slots 514 of plate 510; and such that fingers 512 of plate 510 are disposed in slots 524 of plate 520. In the state shown in FIG. 5B, fingers

520 contact fingers 522 along the regions of fingers 520, 522 defining slots 514, 524. In the present example, fingers 512, 522 and slots 514, 524 are dimensioned and configured such that plates 510, 520 cooperate to effectively form a single, unitary, electrically conductive sheet 504 when plates 510, 520 are arranged as shown in FIG. 5B. In some versions, the edges of fingers 512, 522 may include resilient conductive features (e.g., electrical spring fingers), conductive braided EMI gaskets, copper braid, metallized foam (e.g., conductive layer/tape on outside of polyurethane foam), and/or other features to effectively fill any gaps that might otherwise occur between adjacent fingers 512, 522 when fingers 512, 522 are interdigitated as shown in FIG. 5B; and thereby ensure electrical continuity across the entire single, unitary sheet 504 that is effectively formed when plates 510, 520 are arranged as shown in FIG. 5B.

In the context of the arrangement of system 400 shown in FIGS. 4A-4C, first plate 510 may be rigidly secured relative to rigid support structure 462; while actuator 530 may also be rigidly secured relative to rigid support structure 462. Actuator 530 may thus drive movement of second plate 520 relative to first plate 510 and relative to rigid support structure 462.

Figures 6A, 6B:
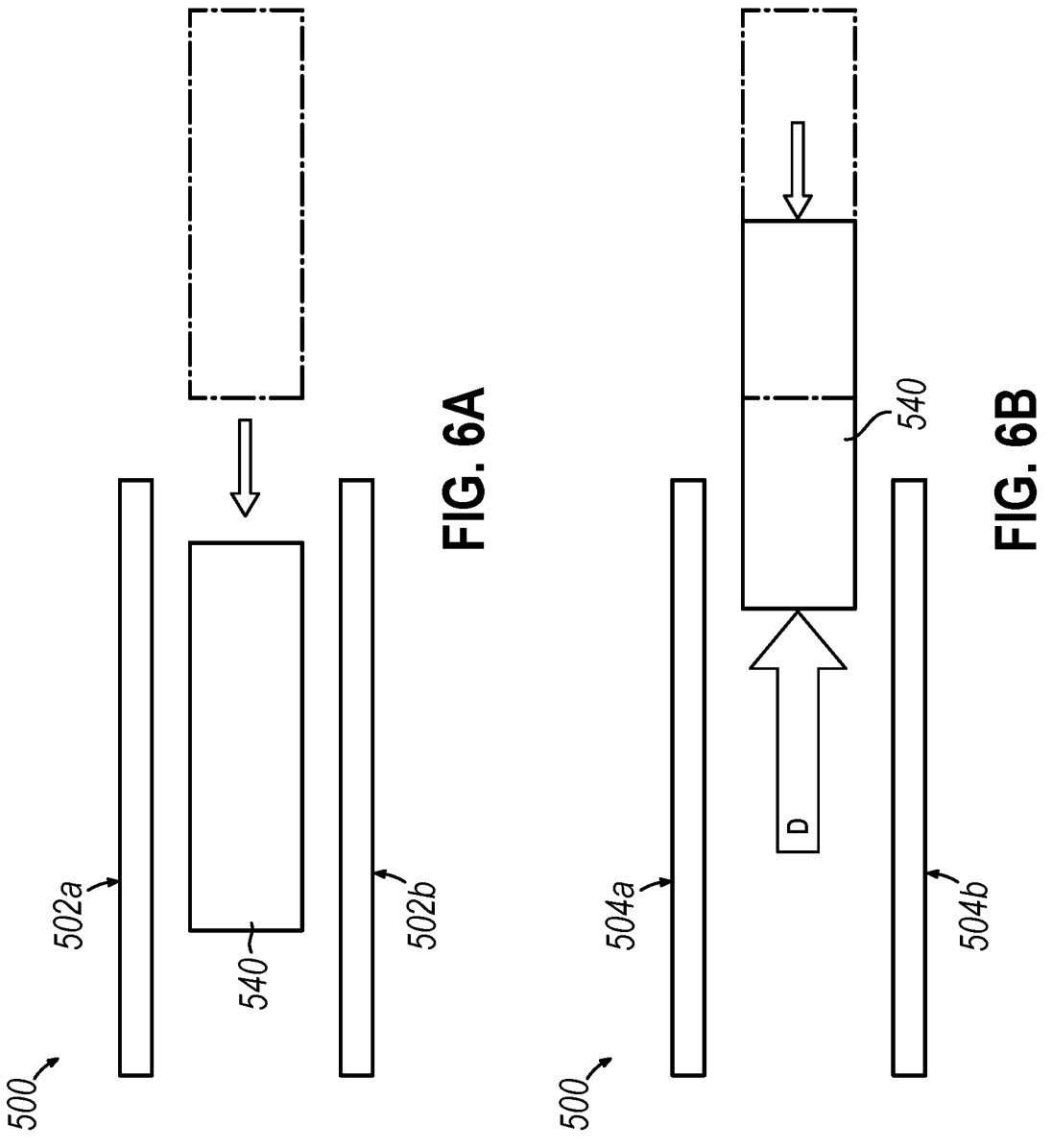
FIG. 6A depicts a schematic elevation diagram of a magnet of a vibration capture assembly entering a space between two sets of the eddy current plates of FIG. 5A while the eddy current plates are in the separated state of FIG. 5A.
FIG. 6B depicts a schematic elevation diagram of the magnet of FIG. 6A entering the space between two sets of the eddy current plates of FIG. 5A while the eddy current plates are in the contacting state of FIG. 5B.

As shown in FIGS. 6A-6B, magnet 540 is configured to fit in a space defined between a first set 502a of plates 510, 520 and a second set 502b of plates 510, 520. In the context of the arrangement of system 400 shown in FIGS. 4A-4C, magnet 540 may serve as movable member 466, such that magnet 540 is rigidly secured relative to frame 410. FIG. 6A shows a scenario where plates 510, 520 of each set 502a, 502b of plates 510, 520 are in the separated state shown in FIG. 5A. This state represents vibration capture assembly 500 in the non-damping state. Thus, the state shown in FIGS. 5A and 6A corresponds to the state shown in FIGS. 4A and 4C. With vibration capture assembly 500 in the non-damping state, magnet 540 is able to move freely within the space defined between the first set 502a of plates 510, 520 and the second set 502b of plates 510, 520. This is because plates 510, 520 do not provide a significant magnetic effect on magnet 540. To the extent that plates 510, 520 provide some magnetic effect on magnet 540 when vibration capture assembly 500 is in the non-damping state, such magnetic effect may be functionally negligible. Vibration capture assembly 500 does not affect the ability of vibration isolators (e.g., vibration isolators 430) to isolate a frame (e.g., frame 410) from external forces imparted on a chassis (e.g., chassis 420) when vibration capture assembly 500 is in the non-damping state shown in FIGS. 5A and 6A.

FIG. 6B shows vibration capture assembly 500 in a damping state, where plates 510, 520 of each set of plates 510, 520 are in the engaged state shown in FIG. 5B. Thus, the state shown in FIGS. 5B and 6B corresponds to the state shown in FIG. 4B. First set 502a of plates 510, 520 form a first single, unitary sheet 504a while second set 502b of plates 510, 520 form a second single, unitary sheet 504b. With vibration capture assembly 500 in the damping state, vibrational movement (V) of the frame (e.g., frame 410) may urge magnet 540 into the space defined between sheets 504a, 504b formed by the two sets 502a, 502b of plates 510, 512.

As magnet 540 moves into the space defined between sheets 504a, 504b, the movement of the magnetic field of magnet 540 relative to sheets 504a, 504b generates eddy currents in sheets 504a, 504b. These eddy currents generate another magnetic field, which provides a counteracting magnetic force against magnet 540. This counteracting magnetic force against magnet 540 acts as a brake and urges magnet 540 out of the space defined between sheets 504*a*, 504*b* (i.e., in a direction opposite to the direction in which magnet 540 entered the space). In other words, the eddy currents in sheets 504*a*, 504*b* effectively generate a damping force (D) that resists or restricts movement of magnet 540 into the space defined between sheets 504*a*, 504*b*. Since sheets 504*a*, 504*b* are rigidly secured relative to the chassis (e.g., chassis 420), and since magnet 540 is rigidly secured relative to the frame (e.g., frame 410), vibration capture assembly 500 damps movement of the frame relative to the chassis by resisting or restricting movement of magnet 540 relative to sheets 504*a*, 504*b*. In other words, vibration capture assembly 500 may cause the chassis to effectively absorb at least some of the reactionary force (R) and thereby resist or reduce deflection at vibration isolators (e.g., vibration isolators 430).

In view of the foregoing, vibration capture assembly 500 may be toggled between a non-damping state (FIGS. 5A and 6A) and a damping state (FIGS. 5B and 6B) by selectively actuating actuator 530 to drive second plate 520 of each set 502*a*, 502*b* toward and away from first plate 510 of the corresponding set 502*a*, 502*b*. Actuator 530 may be selectively actuated by a controller like controller 330 described above.

While FIGS. 6A-6B show magnet 540 moving from a position outside of the space defined between sheets 504*a*, 504*b* to a position at least partially inside the space defined between sheets 504*a*, 504*b*, some versions may have at least a portion of magnet 540 always disposed inside the space defined between sheets 504*a*, 504*b*. Moreover, when vibration capture assembly 500 is in the damping state, the damping force (D) created by eddy currents as described above may substantially resist movement of magnet 540 within that space. This substantial resistance of movement may apply regardless of whether a portion of magnet 540 is already within that space at the time vibration capture assembly 500 is transitioned to the damping state.

Figure 7B:
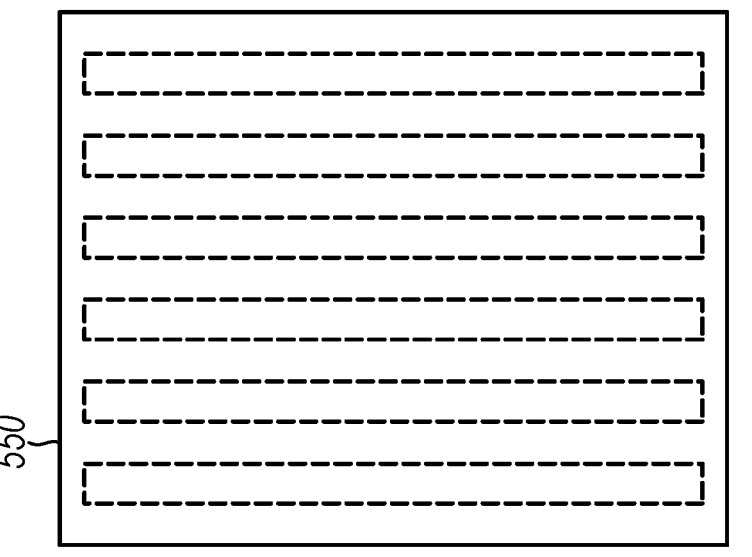
FIG. 7B depicts a schematic top plan view of the eddy current plate of FIG. 7A with the slots in a closed state.
Figure 7A:
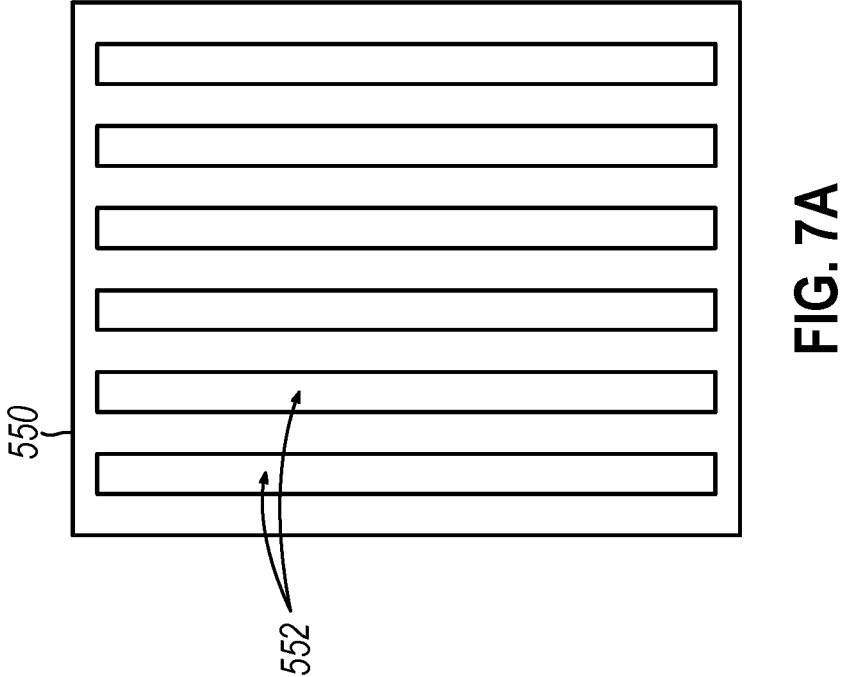
FIG. 7A depicts a schematic top plan view of an eddy current plate of a vibration capture assembly with a plurality of slots in an open state.

Some other variations of vibration capture assembly 500 may operate on a similar principle by selectively enabling or preventing the formation of eddy currents but using differently configured components. For instance, FIGS. 7A-7B show another version of a plate 550 that may be incorporated into a variation of vibration capture assembly 500. For instance, one plate 550 may be used in place of the first set 502*a* of plates 510, 520; while another plate 550 may be used in place of the second set 502*b* of plates 510, 520. Plate 500 includes a plurality of slots 552.

When slots 552 are in an open state as shown in FIG. 7A, slots 552 prevent the formation of eddy currents in plate 550. Thus, when slots 552 are in the open state as shown in FIG. 7A, a version of vibration capture assembly 500 incorporating plates may be in the non-damping state. To transition to the damping state, slots 552 may be transitioned to a closed state as shown in FIG. 7B. When slots 552 are in a closed state as shown in FIG. 7B, plate 550 may form a continuous conductive sheet that forms eddy currents when magnet 540 is moved into sufficient proximity with plate 550 with sufficient velocity. By way of example only, slots 552 may be transitioned to a closed state as shown in FIG. 7B by filling slots with an electrically conductive fluid. As another example, slots 552 may be transitioned to a closed state as shown in FIG. 7B by filling slots with a metallized foam. Alternatively, any other suitable components or techniques may be used to transition slots 552 from the open state shown in FIG. 7A to the closed state shown in FIG. 7B. To revert back to the non-damping state, the process that was used to slots 552 from the open state shown in FIG. 7A to the closed state shown in FIG. 7B may be reversed, thereby transitioning slots 552 back to the open state.

Figure 8B:
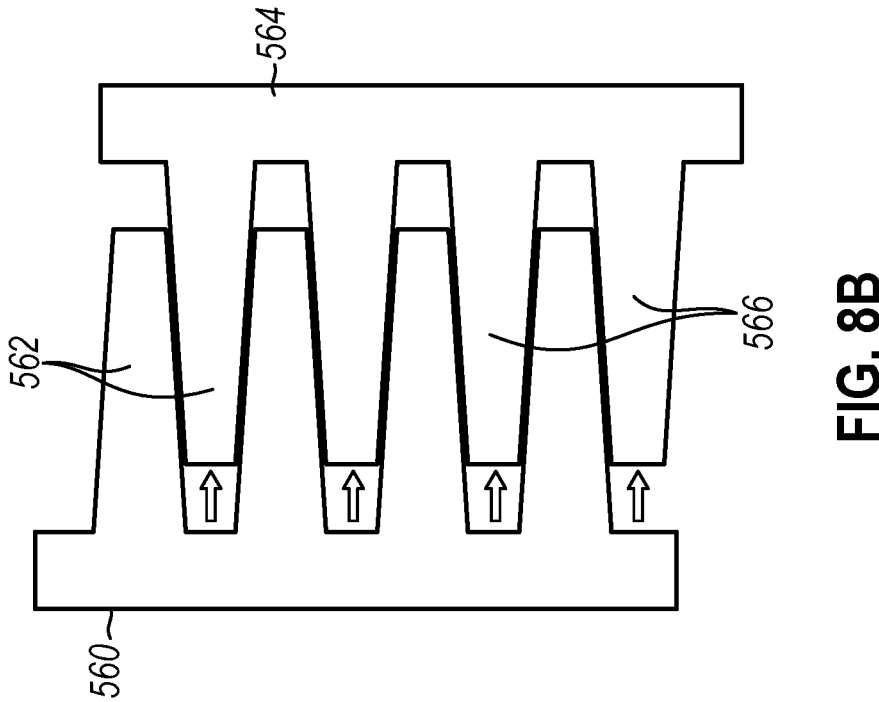
FIG. 8B depicts a schematic top plan view of the eddy current plates of FIG. 8A in a separated state.
Figure 8A:
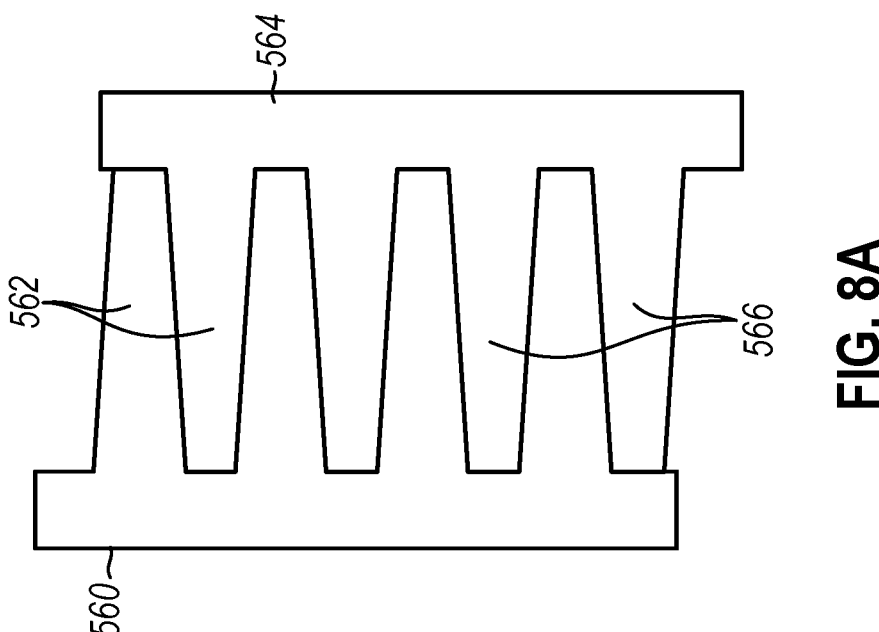
FIG. 8A depicts a schematic top plan view of another set of eddy current plates of a vibration capture assembly in a contacting state.

FIGS. 8A-8B show another example of a set of plates 560, 564 that may be incorporated into vibration capture assembly 500 in place of plates 510, 520. Like plates 510, 520 described above, plates 560, 564 of this example include respective sets of fingers 562, 566. Fingers 562, 566 are configured and arranged such that fingers 562, 566 may be interdigitated. Unlike fingers 512, 522 of plates 510, 520, which have a generally rectangular shape, fingers 562, 566 of plates 560, 564 have a trapezoidal shape, such that fingers 562, 566 taper along the plane defined by plates 560, 564. Fingers 562, 566 may otherwise be operable like fingers 512, 522.

Like plates 510, 520 described above, plates 560, 564 of this example are configured to transition between a contacting state, as shown in FIG. 8A, where fingers 562, 566 are in contact with each other; and a separated state, as shown in FIG. 8B, where fingers 562, 566 are not in contact with each other. For instance, at least one plate 560, 564 may be driven by an actuator and corresponding transmission assembly like actuator 530 and transmission assembly 532. When plates 560, 564 are in the contacting state as shown in FIG. 8A, plates 560, 564 cooperate to effectively form a single, unitary, electrically conductive sheet. In some versions, the edges of fingers 562, 566 may include resilient conductive features (e.g., electrical spring fingers), conductive braided EMI gaskets, copper braid, metallized foam (e.g., conductive layer/tape on outside of polyurethane foam), and/or other features to effectively fill any gaps that might otherwise occur between adjacent fingers 562, 566 when fingers 562, 566 are in contact with each other as shown in FIG. 8A; and thereby ensure electrical continuity across the entire single, unitary sheet that is effectively formed when plates 560, 564 are arranged as shown in FIG. 8A.

Figures 9, 10A, 10B:
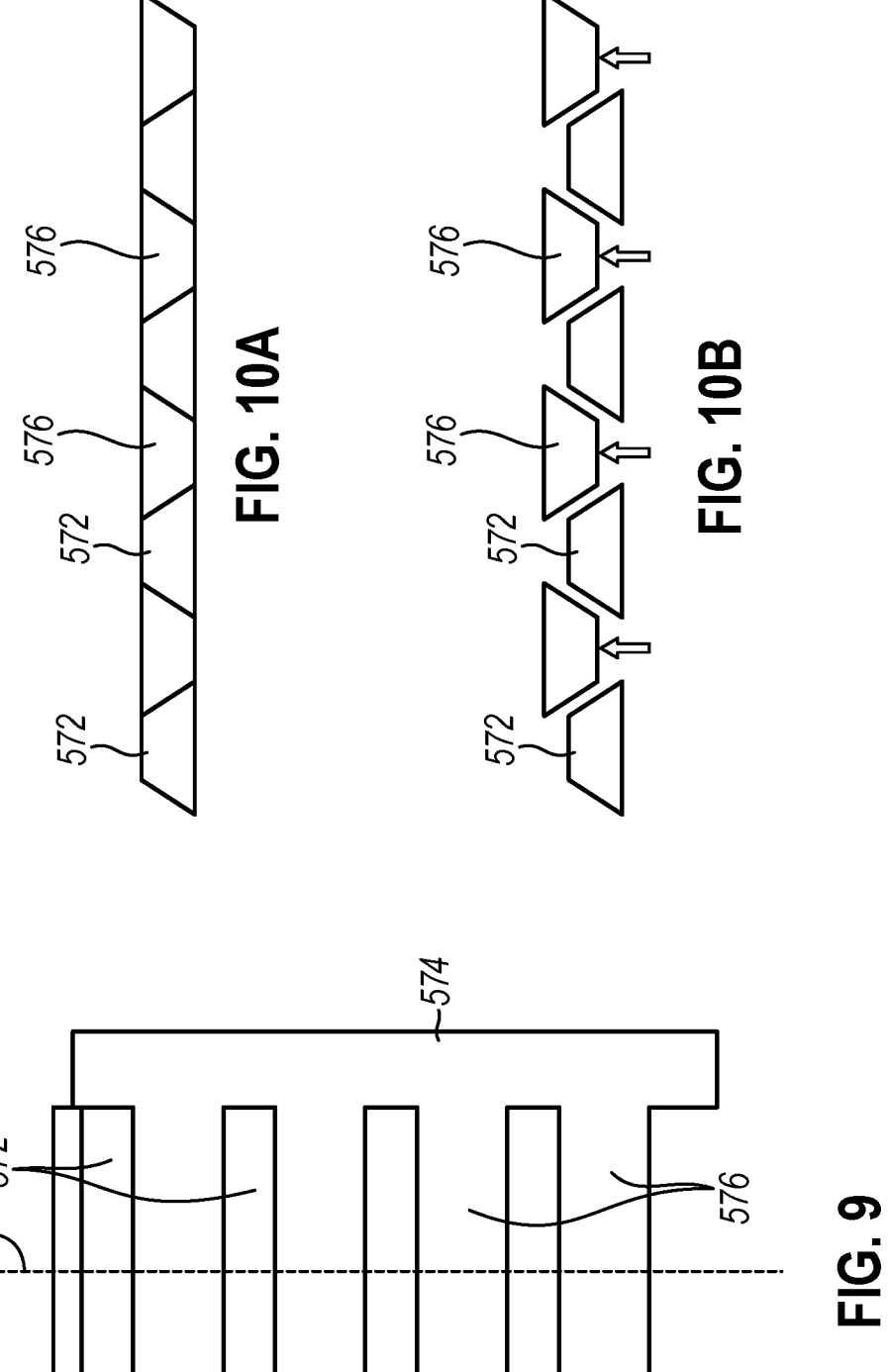
FIG. 9 depicts a schematic top plan view of another set of eddy current plates of a vibration capture assembly in a contacting state.
FIG. 10A depicts a cross-sectional view of the eddy current plates of FIG. 9 in the contacting state.
FIG. 10B depicts a cross-sectional view of the eddy current plates of FIG. 9 in a separated state.

FIGS. 9-10B show another example of a set of plates 570, 574 that may be incorporated into vibration capture assembly 500 in place of plates 510, 520. Like plates 510, 520 described above, plates 570, 574 of this example include respective sets of fingers 572, 576. Fingers 572, 576 are configured and arranged such that fingers 572, 576 may be interdigitated. While fingers 572, 576 have a rectangular shape along the plane defined by plates 570, 574, fingers 572, 276 have a trapezoidal cross-sectional profile along a plane (P), as shown in FIGS. 10A-10B. The cross-sectional profiles of fingers 572 are oriented in an opposing fashion to the cross-sectional profiles of fingers 576.

Like plates 510, 520 described above, plates 570, 574 of this example are configured to transition between a contacting state, as shown in FIG. 10A, where fingers 572, 576 are in contact with each other; and a separated state, as shown in FIG. 10B, where fingers 572, 576 are not in contact with each other. Unlike the movement of plates 520, which is along the plane defined by plates 510, 520, the movement of plate 574 is along the plane (P) that is perpendicular to the plane defined by plates 570, 574. At least one plate 570, 574 may be driven by an actuator and corresponding transmission assembly like actuator 530 and transmission assembly 532. When plates 570, 574 are in the contacting state as shown in FIG. 10A, plates 570, 574 cooperate to effectively form a single, unitary, electrically conductive sheet. In some versions, the edges of fingers 572, 576 may include resilient conductive features (e.g., electrical spring fingers), conductive braided EMI gaskets, copper braid, metallized foam (e.g., conductive layer/tape on outside of polyurethane foam), and/or other features to effectively fill any gaps that might otherwise occur between adjacent fingers 572, 576 when fingers 572, 576 are in contact with each other as shown in FIG. 10A; and thereby ensure electrical continuity across the entire single, unitary sheet that is effectively formed when plates 570, 574 are arranged as shown in FIG. 10A.

Figure 11A:
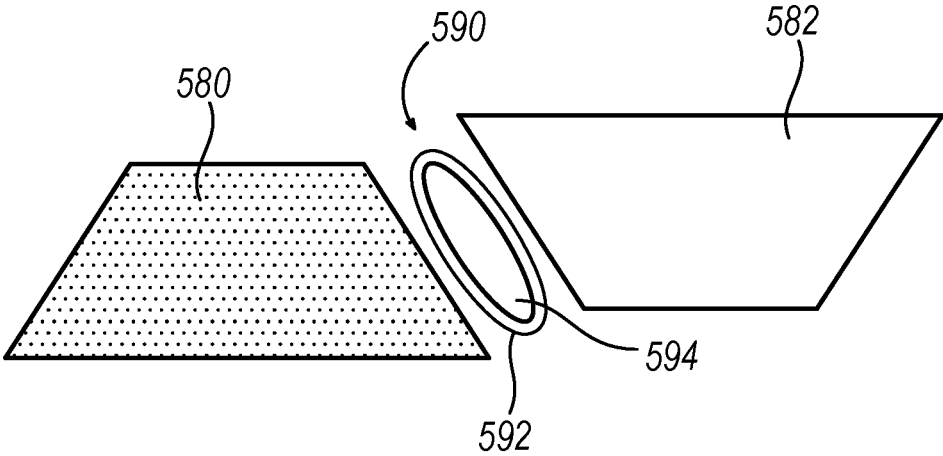
FIG. 11A depicts a cross-sectional view of fingers from another set of eddy current plates of a vibration capture assembly, with an expandable conductive assembly in a non-expanded state.
Figure 11B:
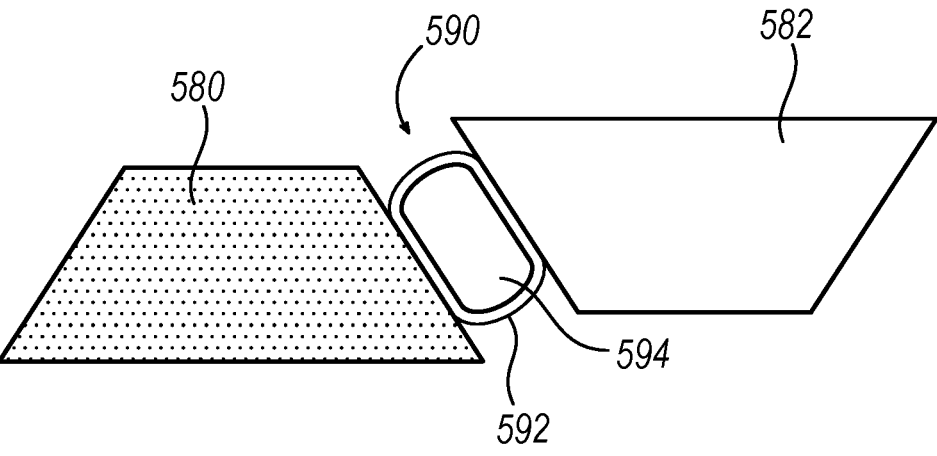
FIG. 11B depicts a cross-sectional view of the fingers and expandable conductive assembly of FIG. 11A, with the expandable conductive assembly in an expanded state.

FIGS. 11A-11B show an arrangement including a pair of fingers 580, 582 and an expandable conductive assembly 590. In some versions, fingers 580, 582 are components of respective plates that are similar to plates 570, 574, such that each of those plates has a respective plurality of fingers 580, 582. Expandable conductive assembly 590 is positioned in a gap defined between adjacent fingers 580, 582. In versions where there are two plates with respective sets of fingers 580, 582, there may be a plurality of expandable conductive assemblies 590, with each expandable conductive assembly 590 being positioned within a respective gap defined between adjacent fingers 580, 582 of the plates.

Expandable conductive assembly 590 includes a conductive member 592 and an expandable member 594 positioned within conductive member 592. Conductive member 592 is formed of an electrically conductive material and may take any suitable form, including but not limited to a braided sheath, a wire mesh, etc. Expandable member 594 may also take any suitable form, including but not limited to a liquid-filled bladder, an air-filled bladder, an electroactive polymer, a mechanically expandable assembly, etc.

Expandable conductive assembly 590 is operable to transition between a non-expanded state (FIG. 11A) and an expanded state (FIG. 11B). In versions where expandable member 594 comprises a bladder, expandable conductive assembly 590 may be transitioned from the non-expanded state to the expanded state by communicating fluid (e.g., liquid, air, etc.) to expandable member 594. Conversely, expandable conductive assembly 590 may be transitioned from the expanded state to the non-expanded state by withdrawing that fluid or relieving that fluid from expandable member 594. In some versions, conductive member 592 and/or expandable member 594 is/are resiliently biased to return expandable conductive assembly 590 to the non-expanded state. In versions where expandable member 594 comprises an electroactive polymer, expandable conductive assembly 590 may be transitioned between the non-expanded state and the expanded state by applying a voltage to, or removing a voltage from, expandable member 594. Alternatively, expandable member 594 may be driven in any other suitable fashion. For instance, expandable member 594 may include an oval cam that, when rotated, bridges the gap between fingers 580, 582 with the wide dimension of the cam; and, when rotated 90 degrees again, disengages from fingers 580, 582 by orienting the narrow dimension of the cam orthogonal to the gap.

When expandable conductive assembly 590 is the non-expanded state shown in FIG. 11A, conductive member 592 does not contact fingers 580, 582, such that conductive member 592 does not provide electrical continuity from finger 580 to finger 582. Thus, when expandable conductive assembly 590 is the non-expanded state, the plates incorporating fingers 580, 582 may be in a state similar to the separated states described above with reference to FIGS. 5A, 8B, and 10B. When expandable conductive assembly 590 is the expanded state shown in FIG. 11B, conductive member 592 contacts fingers 580, 582, such that conductive member 592 provides electrical continuity from finger 580 to finger 582. Thus, when expandable conductive assembly 590 is the expanded state, the plates incorporating fingers 580, 582 may be in a state similar to the contacting states described above with reference to FIGS. 5B, 8A, and 10A.

In some variations, vibration capture assembly 500 may include additional sets of plates 510, 520, 550, 560, 564, 570, 574 and magnets 540. Such additional sets of plates 510, 520, 550, 560, 564, 570, 574 and magnets 540 may be arranged in parallel to increase the damping ratio of vibration capture assembly 500 when vibration capture assembly 500 is in a damping state.

As another example of a variation of vibration capture assembly 500, one or two continuous-surface conductive plates (i.e., plates lacking slots 514, 524, 552) may be held at a fixed position relative to chassis 420; while a magnet like magnet 540 may be coupled with frame 410 via an actuator and corresponding transmission assembly. In such versions, the actuator and transmission assembly may drive the magnet into close proximity of the continuous-surface conductive plates to provide a damping state, such that vibrational movement imparted to the magnet from frame 410 will generate eddy currents in the continuous-surface conductive plates and thereby generate a counteracting magnetic field. The actuator and transmission assembly may drive the magnet away from the continuous-surface conductive plates to provide a non-damping state, such that vibrational movement imparted to the magnet from frame 410 will not generate eddy currents in the continuous-surface conductive plates and thereby not generate a counteracting magnetic field. Alternatively, the magnet may be held at a fixed position relative to frame 410; and the continuous-surface conductive plates coupled with chassis 420 via an actuator and corresponding transmission assembly, such that the actuator and transmission assembly may drive the plates toward or away from the magnet to thereby transition the vibration capture assembly between a damping state and a non-damping state, respectively.

2. Example of Vibration Capture Assembly with Passive Coil

FIGS. 12A-13B show an example of another vibration capture assembly 600 that may be used as a version of vibration capture assembly 460 described above. Vibration capture assembly 600 of this example includes a coil support 610, a coil 620 formed by a wire 622 wrapped around coil support 610, and a magnet 650. Coil support 610 of this example has a hollow, tubular shape such that coil support 610 defines a bore 612 that is sized to receive magnet 650. Vibration capture assembly 600 of this example also includes a switch 630 and, optionally, a variable resistor 640. Switch 630 may take any suitable form, including but not limited to a mechanical switch, a MOSFET, relay, or transistor, etc. Switch 630 is operable to toggle the circuit defined by wire 622, switch 630, and variable resistor 640 between an open state (FIG. 12A) and a closed state (FIG. 12B). In some versions, any other suitable components may be included within this circuit. Variable resistor 640 is operable to adjust the resistance of the circuit and thereby control the damping effect of vibration capture assembly 600 as will be described in greater detail below. By way of example only, variable resistor 640 may include a potentiometer, a rheostat, or any other suitable kind of variable resistor 640.

In the context of the arrangement of system 400 shown in FIGS. 4A-4C, coil support 610 and coil 620 may be rigidly secured relative to rigid support structure 462; while magnet 650 may serve as movable member 466, such that magnet 650 is rigidly secured relative to frame 410. FIG. 13A shows a scenario where switch 630 is in the open state shown in FIG. 12A. This state represents vibration capture assembly

600 in the non-damping state. Thus, the state shown in FIGS. 12A and 13A corresponds to the state shown in FIGS. 4A and 4C. With vibration capture assembly 600 in the non-damping state, magnet 650 is able to move freely within bore 612 of coil support 610. This is because coil 620 does not provide any kind of magnetic effect on magnet 650. Vibration capture assembly 600 does not affect the ability of vibration isolators (e.g., vibration isolators 430) to isolate a frame (e.g., frame 410) from external forces imparted on a chassis (e.g., chassis 420) when vibration capture assembly 600 is in the non-damping state shown in FIGS. 12A and 13A.

Figures 12A, 12B:
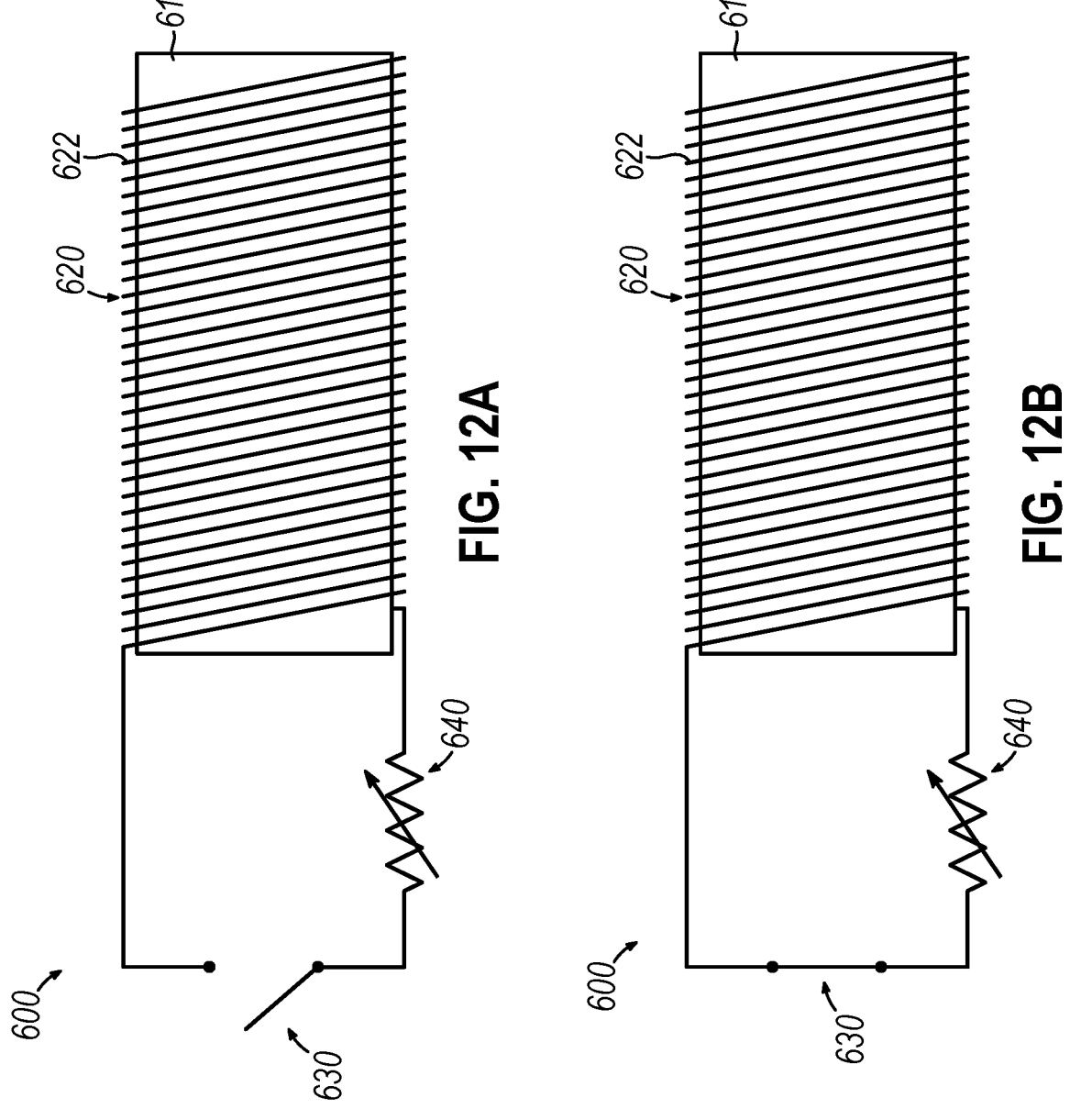
FIG. 12A depicts a schematic top plan view of a passive coil member of a vibration capture assembly, with an associated switch in an open state.
FIG. 12B depicts a schematic top plan view of the passive coil member of FIG. 12A, with the associated switch in a closed state.
Figures 13A, 13B:
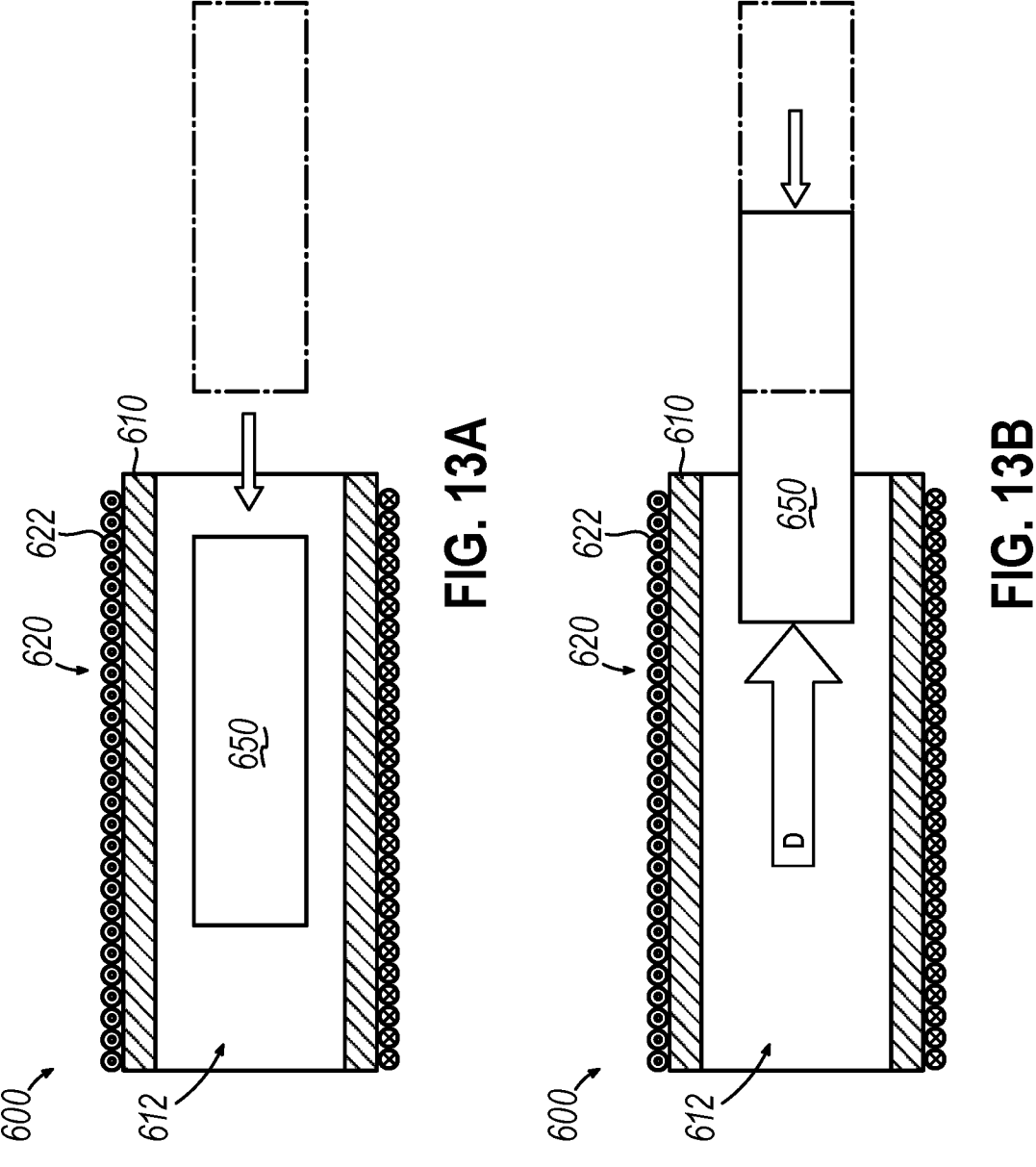
FIG. 13A depicts a schematic elevation diagram of a magnet of a vibration capture assembly entering a bore of the coil support FIG. 12A while the associated switch is in the open state of FIG. 12A.
FIG. 13B depicts a schematic elevation diagram of the magnet of FIG. 13A entering the bore of the coil support FIG. 12A while the associated switch is in the closed state of FIG. 12B.

FIG. 13B shows vibration capture assembly 600 in a damping state, where switch 630 is in the closed state shown in FIG. 12B. Thus, the state shown in FIGS. 12B and 13B corresponds to the state shown in FIG. 4B. With vibration capture assembly 600 in the damping state, vibrational movement (V) of the frame (e.g., frame 410) may urge magnet 650 to move in bore 612 of coil support 610. In some scenarios, vibrational movement (V) of the frame (e.g., frame 410) may urge magnet 650 to reciprocate bi-directionally within bore 612. As magnet 650 moves within bore 612, the movement of the magnetic field of magnet 650 relative to coil 620 induces an electric current in coil 620. This induced current generates a magnetic field that provides a first counteracting magnetic force against magnet 650. This first counteracting magnetic force against magnet 650 acts as a brake and urges magnet 650 in a direction opposite to the direction in which magnet 650 is moving within bore 612. If magnet 650 reciprocates bi-directionally within bore 612 in response to vibrational movement (V) of the frame, the counteracting magnetic force against magnet 650 also changes direction. The counteracting magnetic force is in the opposite direction to the velocity of magnet 650 and is proportional to the velocity of magnet 650.

In view of the foregoing, the induced current in coil 620 effectively generates a damping force (D) that resists or restricts movement of magnet 650 within bore 612 of coil support 610. Since coil support 610 is rigidly secured relative to the chassis (e.g., chassis 420), and since magnet 650 is rigidly secured relative to the frame (e.g., frame 410), vibration capture assembly 600 damps movement of the frame relative to the chassis by resisting or restricting movement of magnet 650 relative to coil support 610. In other words, vibration capture assembly 600 may cause the chassis to effectively absorb at least some of the reactionary force (R) and thereby resist or reduce deflection at vibration isolators (e.g., vibration isolators 430). Moreover, vibration capture assembly 600 may convert the vibration energy to heat in coil 622 and in resistor 640.

In view of the foregoing, vibration capture assembly 600 may be toggled between a non-damping state (FIGS. 12A and 13A) and a damping state (FIGS. 12B and 13B) by selectively toggling switch 630 between an open state and a closed state, respectively. To that end, switch 630 may be selectively controlled by a controller like controller 330 described above.

While FIGS. 13A-13B show magnet 650 moving from a position outside of bore 612 to a position at least partially inside bore 612, some versions may have at least a portion of magnet 650 always disposed inside bore 612. Moreover, when vibration capture assembly 600 is in the damping state, the damping force (D) created by coil 620 as described above may substantially resist movement of magnet 650 within bore 612. This substantial resistance of movement may apply regardless of whether a portion of magnet 650 is already within bore 612 at the time vibration capture assembly 600 is transitioned to the damping state.

In some scenarios, it may be desirable to fine tune the damping force (D) generated by vibration capture assembly 600. Such fine tuning may be warranted depending on the kind of system 100, 400 in which vibration capture assembly 600 in incorporated and/or depending on other factors. Such fine tuning may be achieved by varying the resistance provided by variable resistor 640. The damping force (D) generated by vibration capture assembly 600 may be proportional to (or be otherwise affected by) the resistance value provided by variable resistor. In some versions, variable resistor 640 may be automatically adjusted by a controller like controller 330 described above. In some other versions, variable resistor 640 is controlled manually (e.g., via a dial, slider, or other manual control). In still other variations, variable resistor 640 is omitted. Thus, some versions of vibration capture assembly 600 may lack the fine tuning adjustability provided by variable resistor 640. Alternatively, other components may be incorporated into the circuit to provide fine tuning of the damping force (D) generated by vibration capture assembly 600, including but not limited to a variable voltage source as described in greater detail below.

3. Example of Vibration Capture Assembly with Active Coil

Figures 14, 15A:
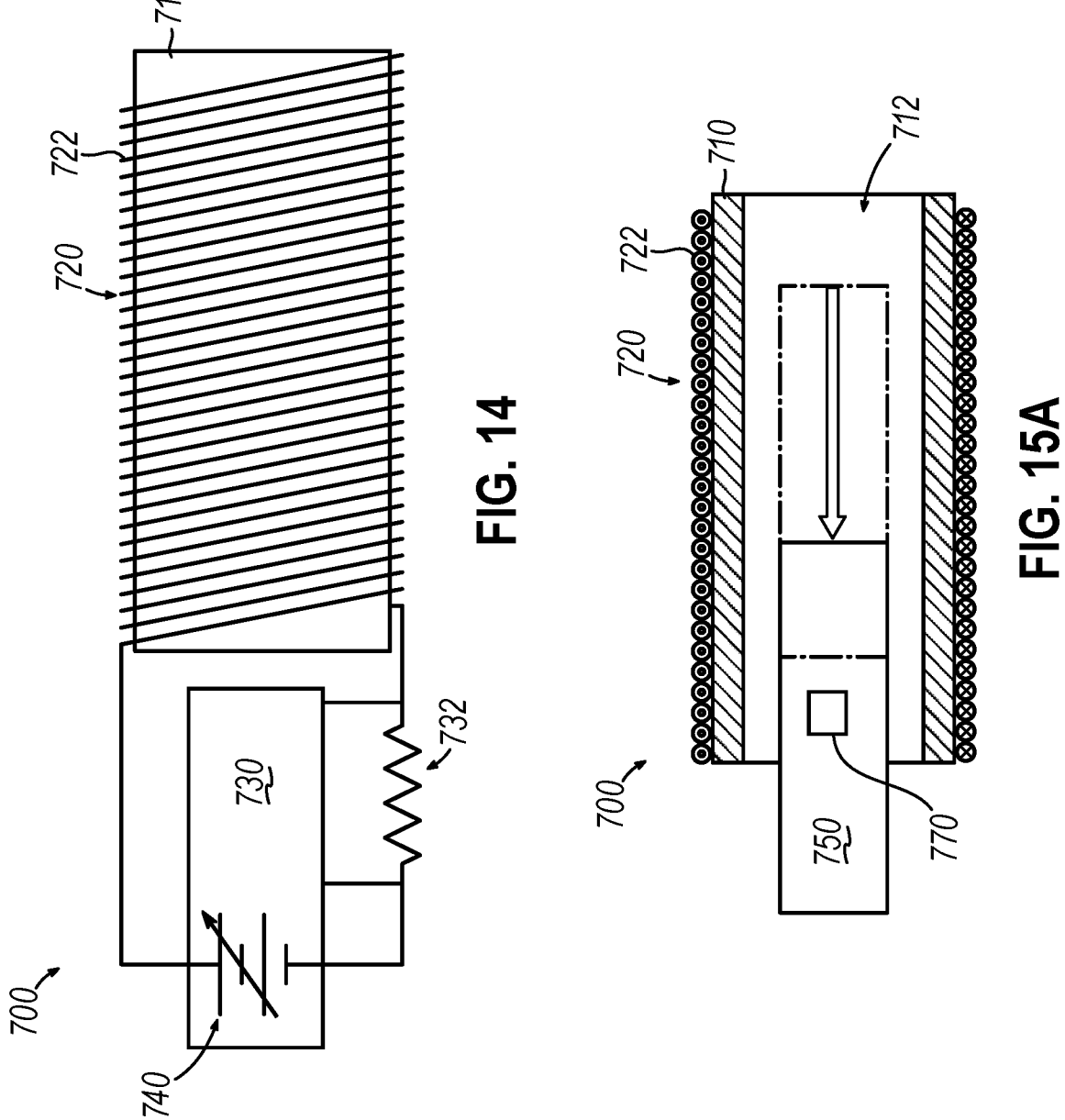
FIG. 14 depicts a schematic top plan view of an active coil member of a vibration capture assembly.
FIG. 15A depicts a schematic elevation diagram of a magnet of a vibration capture assembly entering a bore of the coil member FIG. 14 while the associated switch is in an open state.
Figures 15B, 15C:
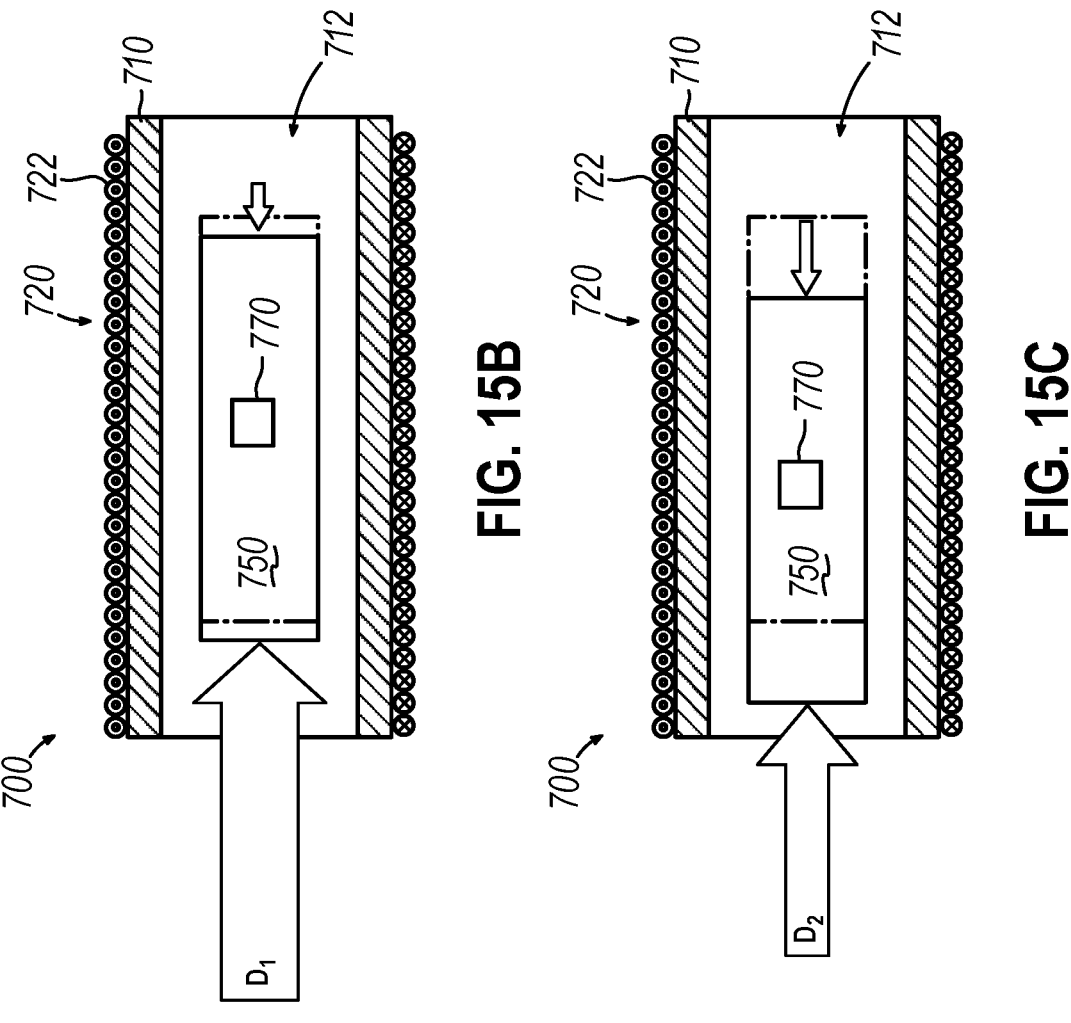
FIG. 15B depicts a schematic elevation diagram of the magnet of FIG. 15A entering the bore of the coil member FIG. 14 while the associated switch is in a closed state, and while a first voltage is applied to the coil member.
FIG. 15C depicts a schematic elevation diagram of the magnet of FIG. 15A entering the bore of the coil member FIG. 14 while the associated switch is in a closed state, and while a second voltage is applied to the coil member.

FIGS. 14-15C show an example of another vibration capture assembly 700 that may be used as a version of vibration capture assembly 460 described above. Vibration capture assembly 700 of this example includes a coil support 710, a coil 720 formed by a wire 722 wrapped around coil support 710, and a magnet 750. Coil support 710 of this example has a hollow, tubular shape such that coil support 710 defines a bore 712 that is sized to receive magnet 750. Vibration capture assembly 700 of this example also includes a controller 730, a resistor 732, and a variable voltage source 740. Controller 730 is configured to measure current flowing through coil 720, using resistor 732 as a sense resistor. Controller 730 is further configured to selectively control the voltage provided by variable voltage source 740. In some versions, any other suitable components may be included within this circuit. Also in some versions, controller 730 may be viewed as being analogous to controller 330 described above with reference to FIG. 3.

Variable voltage source 740 is operable to adjust the voltage of the circuit and thereby control the damping effect of vibration capture assembly 700 as will be described in greater detail below. By way of example only, variable voltage source 740 may include a battery combined with a potentiometer; a combination of an AC power input, a rectifier, and a potentiometer; and/or any other suitable kinds of components. Controller 730 may be configured to selectively control the voltage provided by variable voltage source 740 based on the current flowing through coil 720, as measured using resistor 732 as a sense resistor. In particular, controller 730 may drive variable voltage source 740 to provide a desired current; and may utilize feedback from the current sensing at resistor 732 to determine when there are discrepancies between the actual current and the desired, target current.

The desired, target current may be a function of the relative velocity of magnet 750 and coil 720 and/or the relative position of magnet 750 and coil 720. In the present example, a position sensor 770 is used to determine the relative position of magnet 750 and coil 720. Such position data may further be used to determine the relative velocity of magnet 750 and coil 720. While position sensor 770 is shown as being incorporated directly with magnet 750, position sensor 770 may instead be positioned on coil support 710 or elsewhere. In some versions, more than one position sensor 770 is used. Position sensor 770 may take any suitable form, including but not limited to an encoder, a back EMF sensor, a hall effect sensor, a capacitive sensor, inductive sensor, and/or any other suitable kind(s) of sensor (s). In the context of the arrangement shown in FIG. 3, position sensor 770 may represent an example of sensor 340.

In versions or scenarios where controller 730 tracks of the relative velocity of magnet 750 and coil 720, based on data from position sensor 770, controller 730 may serve as a derivative controller. In versions or scenarios where controller 730 tracks of the relative position of magnet 750 and coil 720, based on data from position sensor 770, controller 730 may serve as a PID controller. In some such versions or scenarios, controller 730 may drive variable voltage source 740 to provide current through coil 720 that prevents (or at least resists) relative movement between magnet 750 and coil 720 by generating an electromotive force that is equal and opposite to the direction of the reactionary force (R) imparted to frame 410 (where the reactionary force (R) imparted to frame 410 would tend to drive movement of magnet 750 relative to coil 720).

In the context of the arrangement of system 400 shown in FIGS. 4A-4C, coil support 710 and coil 720 may be rigidly secured relative to rigid support structure 462, such that coil support 710 and coil 720 are rigidly secured relative to chassis 420; while magnet 750 may serve as movable member 466, such that magnet 750 is rigidly secured relative to frame 410. In some other versions, coil support 710 and coil 720 may be rigidly secured relative to frame 410; while magnet 750 is rigidly secured relative to support structure 462.

FIG. 15A shows a scenario where variable voltage source 740 is applying no voltage to coil 720. This state represents vibration capture assembly 700 in a non-damping mode. Thus, the state shown in FIGS. 14 and 15A corresponds to the state shown in FIGS. 4A and 4C. With vibration capture assembly 700 in the non-damping mode, magnet 750 is able to move freely within bore 712 of coil support 710. This is because coil 720 does not provide any kind of magnetic effect on magnet 750. Vibration capture assembly 700 does not affect the ability of vibration isolators (e.g., vibration isolators 430) to isolate a frame (e.g., frame 410) from external forces imparted on a chassis (e.g., chassis 420) when vibration capture assembly 700 is in the non-damping mode shown in FIG. 15A.

FIG. 15B shows vibration capture assembly 700 in a first damping mode, where controller 730 serves as a PID controller and activates variable voltage source 740 to provide current through coil 720 based on a change in magnet 750 position (i.e., displacement) as detected via position sensor 770. The corresponding current in coil 720 generates an electromagnetic field that provides a counteractive electromotive force against magnet 750. The state shown in FIG. 15B corresponds to a first version of the state shown in FIG. 4B. With vibration capture assembly 700 in the first damping mode, vibrational movement (V) of the frame (e.g., frame 410) may urge magnet 750 to move in bore 712 of coil support 710. As magnet 750 begins to move within bore 712, controller 730 may detect such movement via a signal from position sensor 770. In response to this detected movement, controller 730 may activate variable voltage source 740 to apply a voltage to coil 720. The corresponding current flowing through coil 720 generates a counteracting electromagnetic field to quickly arrest motion of magnet 750 through an electromotive force that is oriented opposite to the direction of magnet 750 movement. Thus, controller 730, variable voltage source 740, and coil 720 may be used to effectively hold magnet 750 stationary relative to coil 720. In other words, the counteracting magnetic force against magnet 750, applied via coil 720, acts as a brake against movement of magnet 750. The counteracting magnetic force is in the opposite direction to the reactionary force (R) on the frame (e.g., frame 410); and has a magnitude that is equal to or substantially equal to the magnitude of the reactionary force (R) on the frame.

In view of the foregoing, the current generated in coil 720 by variable voltage source 740 effectively generates a first damping force ($D_1$) that resists or restricts movement of magnet 750 within bore 712 of coil support 710. Since coil support 710 is rigidly secured relative to the chassis (e.g., chassis 420), and since magnet 750 is rigidly secured relative to the frame (e.g., frame 410), vibration capture assembly 700 damps movement of the frame relative to the chassis by resisting or restricting movement of magnet 750 relative to coil support 710. In other words, vibration capture assembly 700 may cause the chassis to effectively absorb at a majority of the reactionary force (R) and thereby resist or reduce deflection at vibration isolators (e.g., vibration isolators 430). Moreover, vibration capture assembly 700 may convert the vibration energy to heat in coil 722.

FIG. 15C shows vibration capture assembly 700 in a second damping mode, where controller 730 serves as a derivative controller and activates variable voltage source 740 to provide current through coil 720 based on a velocity of magnet 750 as detected via position sensor 770. The corresponding current in coil 720 generates an electromagnetic field that provides a counteractive electromotive force against magnet 750. The state shown in FIG. 15C corresponds to a second version of the state shown in FIG. 4B. With vibration capture assembly 700 in the second damping mode, as magnet 750 moves within bore 712, the magnetic field of magnet 750 interacts with the magnetic field generated by coil 720, such that the magnetic field generated by coil 720 provides a counteracting magnetic force against magnet 750. This counteracting magnetic force against magnet 750 urges magnet 750 in a direction opposite to the direction in which magnet 750 is moving within bore 712. As noted above, if magnet 750 reciprocates bi-directionally (i.e., oscillates) within bore 712 in response to vibrational movement (V) of the frame, the counteracting magnetic force against magnet 750 also changes direction accordingly. The counteracting magnetic force is in the opposite direction to the velocity of magnet 750 oscillations and is proportional to the velocity of magnet 750 oscillations.

Thus, the current generated in coil 720 by variable voltage source 740 effectively generates a second damping force ($D_2$) that opposes movement of magnet 750 within bore 712 of coil support 710. Since coil support 710 is rigidly secured relative to the chassis (e.g., chassis 420), and since magnet 750 is rigidly secured relative to the frame (e.g., frame 410), vibration capture assembly 700 damps movement of the frame relative to the chassis by opposing movement of magnet 750 relative to coil support 710. In other words, vibration capture assembly 700 may cause the chassis to effectively absorb at least some of the reactionary force (R) and thereby resist or reduce deflection at vibration isolators (e.g., vibration isolators 430). Moreover, vibration capture assembly 700 may convert the vibration energy to heat in coil 722.

In the present example, the magnitude of first damping force ($D_1$) is greater than the magnitude of second damping force ($D_2$). This variation in magnitude of damping force (D)

is due to variation in the voltage provided by variable voltage source 740. In the first damping mode (e.g., where controller 730 serves as a PID controller), the first damping force ($D_1$) may effectively hold the position of magnet 750 relative to coil 720; while in the second damping mode (e.g., where controller 730 serves as a derivative controller), the second damping force ($D_2$) may tolerate some degree of reciprocal or oscillatory movement of magnet 750 yet still reduce the magnitude of such reciprocal or oscillatory movement of magnet 750. The selection of damping modes may be based on the operational state of an actuator like actuator 310, 440, based on the operational state of other components of system 100, 400, based on signals from position sensor 770, and/or based on other conditions. Examples of how different damping modes may be applied at different stages of operation of system 100, 400 will be described in greater detail below. While only two damping modes and corresponding damping forces ($D_1$, $D_2$) are described above, vibration capture assembly 700 may provide any other suitable number of damping modes and corresponding damping forces.

Vibration capture assembly 700 of this example forms a voice coil arrangement. It should be understood that voice coils may take a variety of other forms. For instance, while magnet 750 is positioned or positionable in coil 720 in this example, such that magnet 750 is interior and coil 720 is exterior, some other arrangements may provide a coil within a magnet, such that the coil is interior and the magnet is exterior. Similarly, some versions may form a voice coil arrangement using a plurality of coils and/or a plurality of magnets. Some versions may define a planar voice coil arrangement. Any of these alternative arrangements, among others, may be used in lieu of the arrangement described above.

B. Example of Vibration Capture Assembly with Mechanical Brake

Figure 16A:
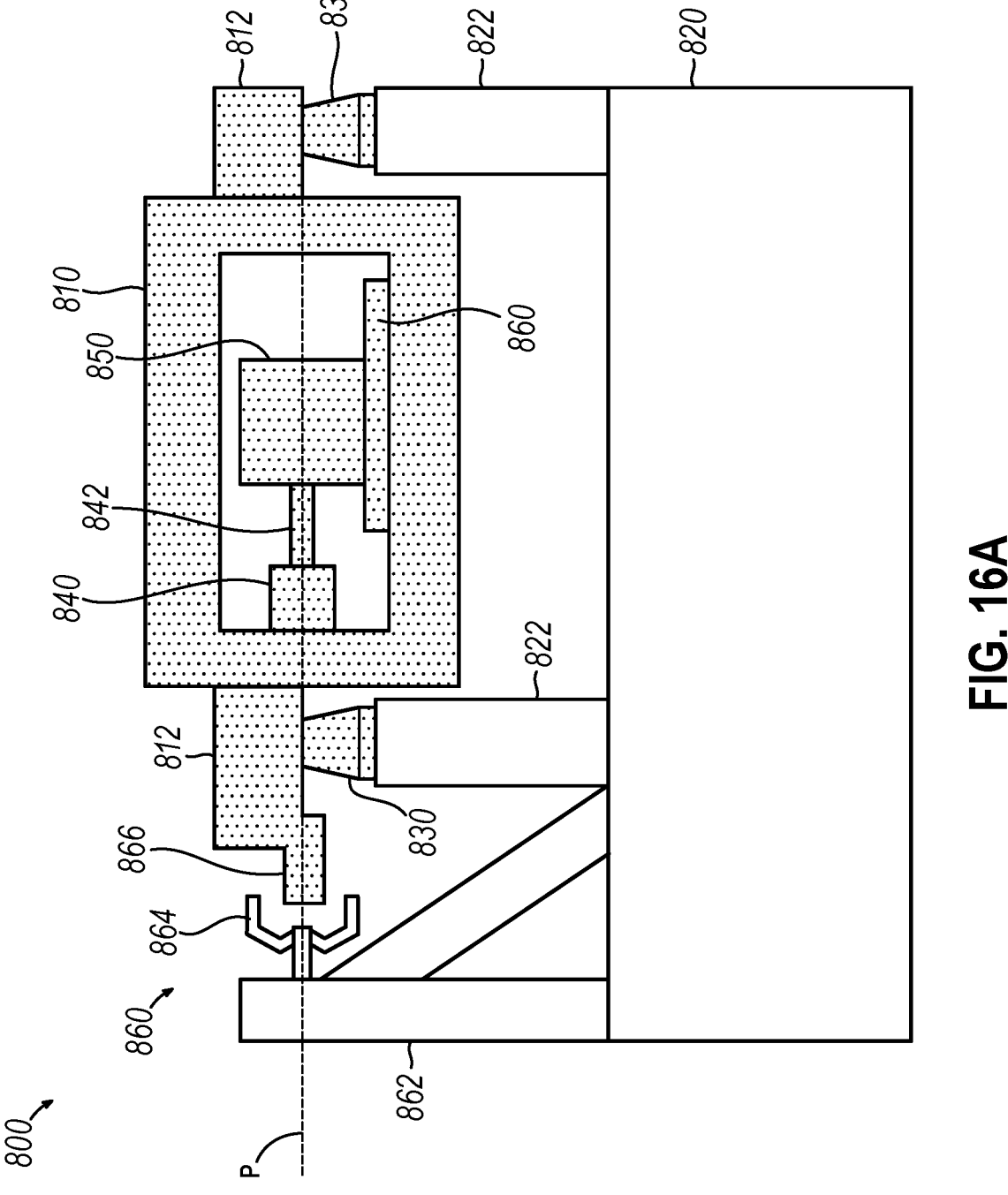
FIG. 16A depicts a schematic elevation diagram of an imaging system representing another version of the system of FIG. 2A incorporating at least some of the components of FIG. 3, with an actuator of the imaging system in a stationary state, and a vibration capture assembly in a non-braking state.
Figure 16B:
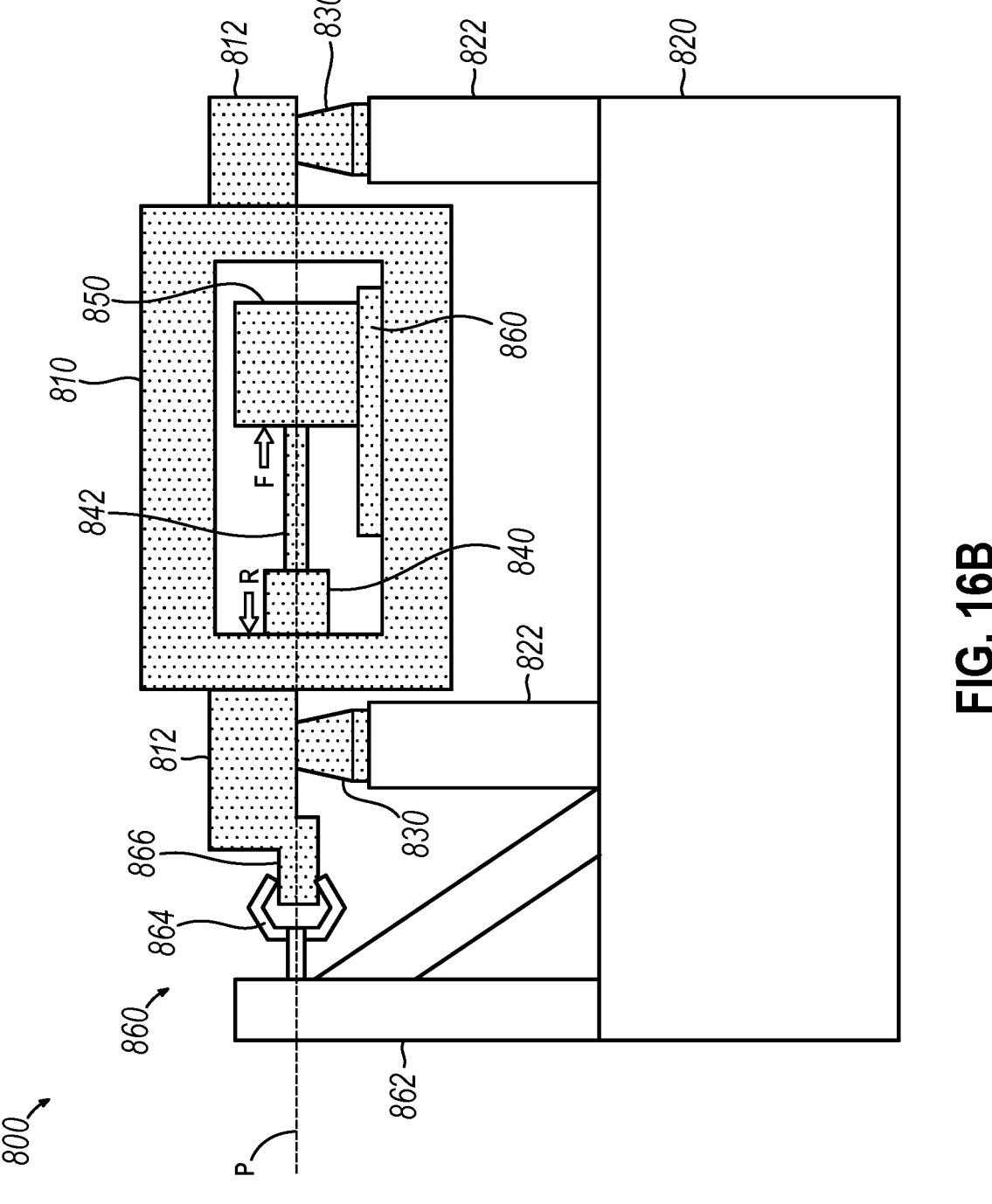
FIG. 16B depicts a schematic elevation diagram of the imaging system of FIG. 16A, with the actuator in an accelerated state, and the vibration capture assembly in a braking state.
Figure 16C:
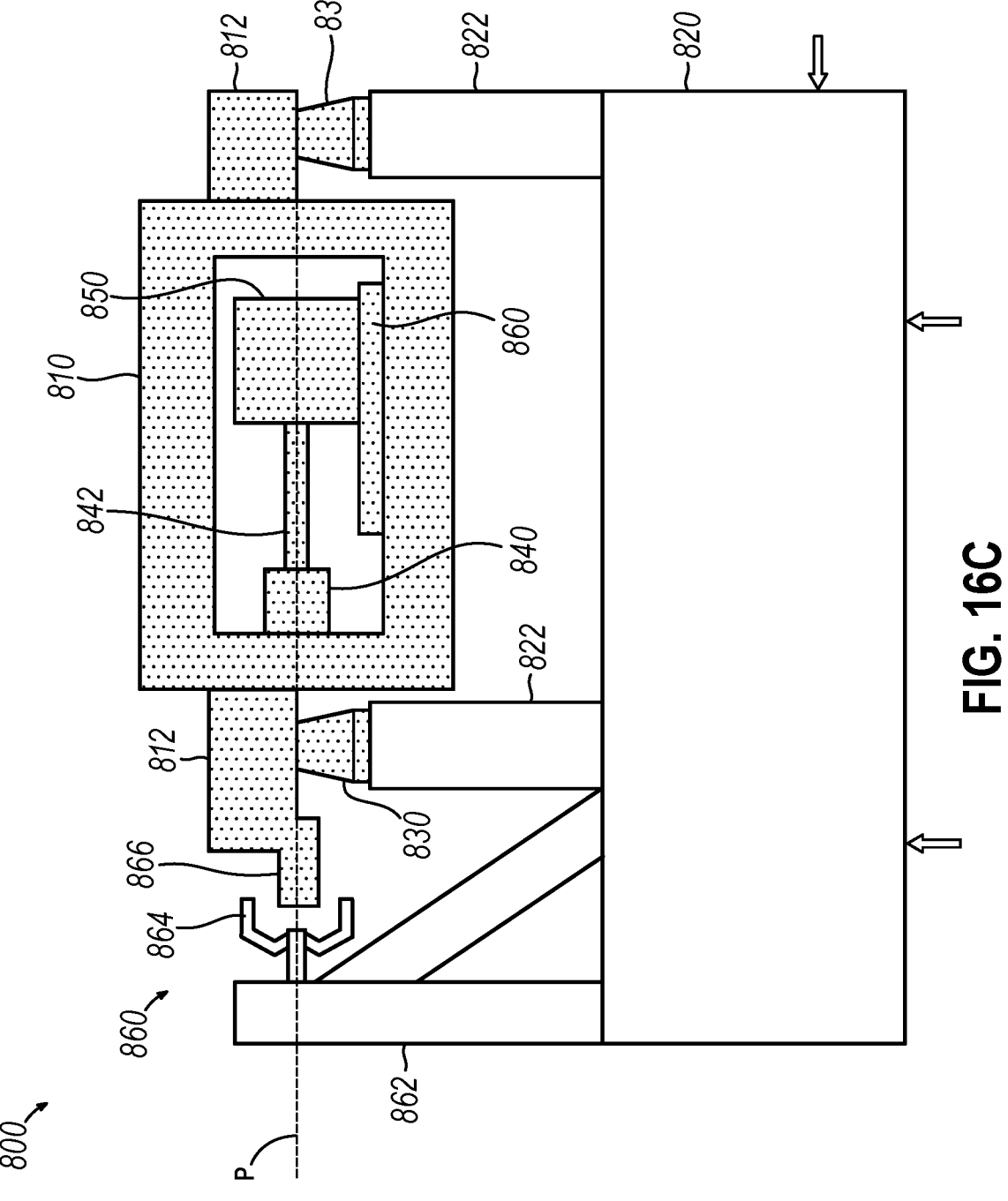
FIG. 16C depicts a schematic elevation diagram of the imaging system of FIG. 16A, with the actuator in a stationary state after being accelerated, and the vibration capture assembly in the non-braking state.

As described above, there may be scenarios where it is desirable to provide contact-free versions of vibration capture assembly 320. Alternatively, there may be scenarios where it is desirable to provide versions of vibration capture assembly 320 that rely on contact between a mechanically grounded component (e.g., chassis 220) and a non-mechanically-grounded component (e.g., frame 210) to substantially prevent motion caused by accelerations of an imaging assembly. To that end, FIGS. 16A-16C show an example of a system 800 representing a version of system 200 that includes a contact-based version of vibration capture assembly 320 in the form of a vibration capture assembly 860. System 800 is configured and operable just like systems 200, 400 described above, except as otherwise described below. System 800 of this example includes a frame 810 and a chassis 820. Chassis 820 provides support to frame 810 and is configured to be mechanically grounded to earth. For instance, chassis 820 may sit directly on a floor of a laboratory or other facility, may sit on a benchtop or other work surface that is mechanically grounded to earth, or may otherwise be mechanically grounded to earth. Chassis 820 of this example is a fully rigid structure such that the structure of chassis 820 is configured to substantially resist any deflection in response to applied forces.

As shown, a set of vibration isolators 830 are interposed between support arms 822 of chassis 820 and support arms 812 of frame 810. While two vibration isolators 830 are shown, any suitable number of vibration isolators 830 (e.g., four vibration isolators 830) may be provided. Vibration isolators 830 are configured and operable just like vibration isolators 230 described above. System 800 of the present example further includes an actuator 840, a transmission assembly 842, an imaging assembly 850, and a flow cell 860. Actuator 840, transmission assembly 842, imaging assembly 850, and flow cell 860 may also be configured and operable just like actuator 240, transmission assembly 242, imaging assembly 250, and flow cell 260, respectively. Like actuator 240 and flow cell 260 are fixedly secured to frame 210, actuator 840 and flow cell 860 are fixedly secured to frame 810 in this example. However, some variations may provide controlled movement of flow cell 860 relative to frame 810, as described above with respect to flow cell 260 and frame 210.

Vibration capture assembly 860 of this example includes a braking member 464 that is rigidly secured to chassis 820 via a rigid support structure 862. Rigid support structure 862 is shown as including an upright arm, but it should be understood that rigid support structure 862 may take any other suitable form and may include any other suitable components. Like chassis 820, the entirety of rigid support structure 862 is rigid; and the coupling between rigid support structure 862 and chassis 820 is fully rigid. Thus, the combination of chassis 820 and rigid support structure 862 is configured to substantially resist any deflection in response to applied forces.

Vibration capture assembly 860 further includes a movable member 866 that is rigidly secured to frame 810 via support arm 812. Movable member 866 is positioned adjacent to a braking member 464. Various examples of forms that may be taken by braking member 464 and movable member 866 will be described in greater detail below. As will also be described in greater detail below, members 864, 866 are configured to cooperate to resist movement of frame 810 relative to chassis 820 when vibration capture assembly 860 is in the activated state.

As will be described in greater detail below, actuator 840 is operable to drive movement of imaging assembly 850 along a plane (P) in the present example, with the plane (P) extending along the x and y-dimensions. In some variations, actuator 840 is only operable to drive movement of imaging assembly 850 along a single dimension (e.g., the x-dimension or the y-dimension). Also in the present example, vibration capture assembly 860 is positioned along this plane (P). In particular, movable member 866 extends along the plane (P). In some other versions, vibration capture assembly 860 may be positioned elsewhere in relation to the plane (P). In some such versions, vibration capture assembly 860 is offset from the plane (P), and a lever arm or other component/assembly is positioned at the plane (P). This lever arm or other component/assembly may transmit the vibrational movement that occurs along the plane (P) to vibration capture assembly 860. In some such versions, lever arm or other component/assembly may amplify the vibrational movement through mechanical advantage, thereby enhancing performance of vibration capture assembly 860.

The positioning of a portion of vibration capture assembly 860, or a component that is mechanically coupled with vibration capture assembly 860, along the same plane (P) or dimension of movement of imaging assembly 850 may provide the greatest efficacy of vibration capture assembly 860 in preventing vibration or other movement of frame 810 that is caused by movement of imaging assembly 850. In other words, vibration capture assembly 860 may provide the greatest efficacy in preventing vibration or other movement of frame 810 that is caused by movement of imaging assembly 850 when vibration capture assembly is configured to provide a braking force along the same plane (P) or dimension of movement of imaging assembly 850, regardless of whether that braking force is provided directly or indirectly via a lever arm or other component/assembly.

In some versions, actuator 840 is operable to drive movement of imaging assembly 850 along only one dimension (e.g., in the x-dimension). In such versions, at least a portion of vibration capture assembly 860 (or a lever arm or other component/assembly that is mechanically coupled with vibration capture assembly 860) may be positioned along that dimension of motion of imaging assembly 850. In some other versions, actuator 440 is operable to drive movement of imaging assembly 850 along more than two dimensions (e.g., along the x, y, and z-dimensions). In such versions, more than one vibration capture assembly 860 may be provided, with different vibration capture assemblies 860 (or lever arms or other components/assemblies that are mechanically coupled with vibration capture assemblies 860) being positioned along different planes/dimensions of motion of imaging assembly 850.

Operation of system 800 may begin in the state shown in FIG. 16A, where actuator 840 is not yet activated, where imaging assembly 850 is in an initial position, and where vibration capture assembly 860 is in a non-braking state. Thus, in the state shown in FIG. 16A, vibration isolators 830 may absorb any external forces imparted on chassis 820 and thereby isolate frame 810 (and the components contained in frame 810) from those external forces.

Next, actuator 840 may be activated to drive imaging assembly 850 along the plane (P) via transmission assembly 842, as shown in FIG. 16B. Shortly before or upon activation of actuator 840, vibration capture assembly 860 may be activated to provide a braking state, such that vibration capture assembly 860 is in the braking state when actuator 840 is activated. The activation of actuator 840 provides a driving force (F) on imaging assembly 850 via transmission assembly 842 in a first direction along the plane (P); which in turn provides a reactionary force (R) on frame 810 in an opposite direction along the plane (P). Given the flexibility of vibration isolators 830, the reactionary force (R) on frame 810 may tend to drive movement of frame 810 along the plane (P), relative to chassis 820, resulting in a vibrational movement (V). However, with vibration capture assembly 860 in the braking state, vibration capture assembly 860 may resist or at least substantially reduce this vibrational movement (V). For instance, in the braking state, vibration capture assembly 860 may "rigidize" the coupling between frame 810 and the ground under chassis 820, effectively trumping the flexible coupling provided by vibration isolators 830. In other words, vibration capture assembly 860 may cause chassis 820 to effectively absorb at least some of the reactionary force (R) and thereby resist or reduce deflection at vibration isolators 830. The force transmitted from frame 810 to chassis 820 may be proportional to the velocity of the vibration motions of frame 810.

In some versions, vibration capture assembly 860 completely eliminates the vibrational movement (V) when vibration capture assembly 860 is in the braking state. In some other versions, vibration capture assembly 860 reduces vibrational movement (V) to a tolerable level (e.g., to a level where vibrational movement (V) does not adversely affect images captured by imaging assembly 850) when vibration capture assembly 860 is in the braking state. As described in greater detail below, some versions of vibration capture assembly 860 may provide variable degrees of braking, which may in turn provide varying impact on vibrational movement (V) of frame 810 relative to chassis 820. Thus, while vibration capture assembly 860 is described herein as toggling between a braking mode and a non-braking mode, vibration capture assembly 860 may also be operable to provide variable damping by providing a variable braking force on movable member 866 via braking member 864. In other words, vibration capture assembly 860 is not necessarily limited to only two states that include a non-braking state and a fully-rigid braking state.

Once imaging assembly 850 has been repositioned to capture an image at a different region of flow cell 860, actuator 840 may be deactivated as shown in FIG. 16C. When actuator 840 is deactivated to cease driving imaging assembly 850, the arresting of movement of imaging assembly 850 may tend to momentarily cause more vibrational movement (V) of frame 810 relative to chassis 820. Vibration capture assembly 860 may thus remain in the braking state for at least some period of time after actuator 840 is deactivated, to resist or otherwise reduce such vibrational movement (V). Vibration capture assembly 860 may nevertheless eventually transition back to the non-braking state. After vibration capture assembly 860 transitions back to the non-braking state in the arrangement shown in FIG. 16C, vibration isolators 830 may again absorb any external forces imparted on chassis 820 and thereby isolate frame 810 (and the components contained in frame 810) from those external forces. The foregoing sequence described with respect to FIGS. 16A-16C may be carried out each and every time actuator 840 is activated/deactivated to drive/arrest movement of imaging assembly 850 relative to flow cell 860.

While not shown in FIGS. 16A-16C, system 800 may also include versions of controller 330 and sensor 340 that provide functionality like controller 330 and sensor 340 described above. Thus, controller 330 may drive activation of actuator 840, sensor 340 may track conditions associated with activation of actuator 840, and controller 330 may drive activation of vibration capture assembly 860 based at least in part on signals from sensor 340 (and/or based on other conditions and/or based on a predetermined drive routine).

While vibration capture assembly 860 is shown as being separate from vibration isolators 830 in the present example, some versions may integrate vibration capture assembly 860 into one or all of vibration isolators 830. For instance, members 864, 866 may be encapsulated within a gel material forming vibration isolators 830. In some such versions, vibration isolators 430 may be overmolded about one or more components of vibration capture assembly 860. Alternatively, vibration capture assembly 860 may be positioned elsewhere within system 800 and/or may be integrated with any other suitable components of system 800.

In some versions, movable member 866 is in the form of a rigid plate or other rigid structure, and braking member 864 is operable to selectively engage (FIG. 16B) and disengage (FIGS. 16A and 16C) movable member 866. In some such versions, the engagement between braking member 864 and movable member 866 provides a positive mechanical lock, such that the coupling between braking member 864 and movable member 866 is fully rigid when braking member 864 is engaged with movable member 866. For instance, braking member 864 may include a pin or other component that is received in an opening of movable member 866. A clutching mechanism, linkage, or other mechanism may selectively drive the pin or other component into and out of the opening. As another example of a positive mechanical lock, braking member 864 may include a set of teeth that is received in a corresponding set of teeth of movable member 866. In some other versions, braking member 864 and movable member 866 are engaged in a frictional relationship. In some such versions, the pressure or gripping force applied by braking member 864 to movable member 866 may be varied to thereby vary the braking force provided by vibration capture assembly 860. As noted above with respect to vibration capture assembly 700, the braking force applied by vibration capture assembly 860 may be varied based on the operational state of actuator 840, based on the operational state of other components of system 800, and/or based on other conditions. In addition to or in lieu of the foregoing, any other suitable components, features, or functionalities may be incorporated into vibration capture assembly 860.

C. Examples of Vibration Capture Algorithms

1. Example of Process with Single Damping Mode

Figure 17:
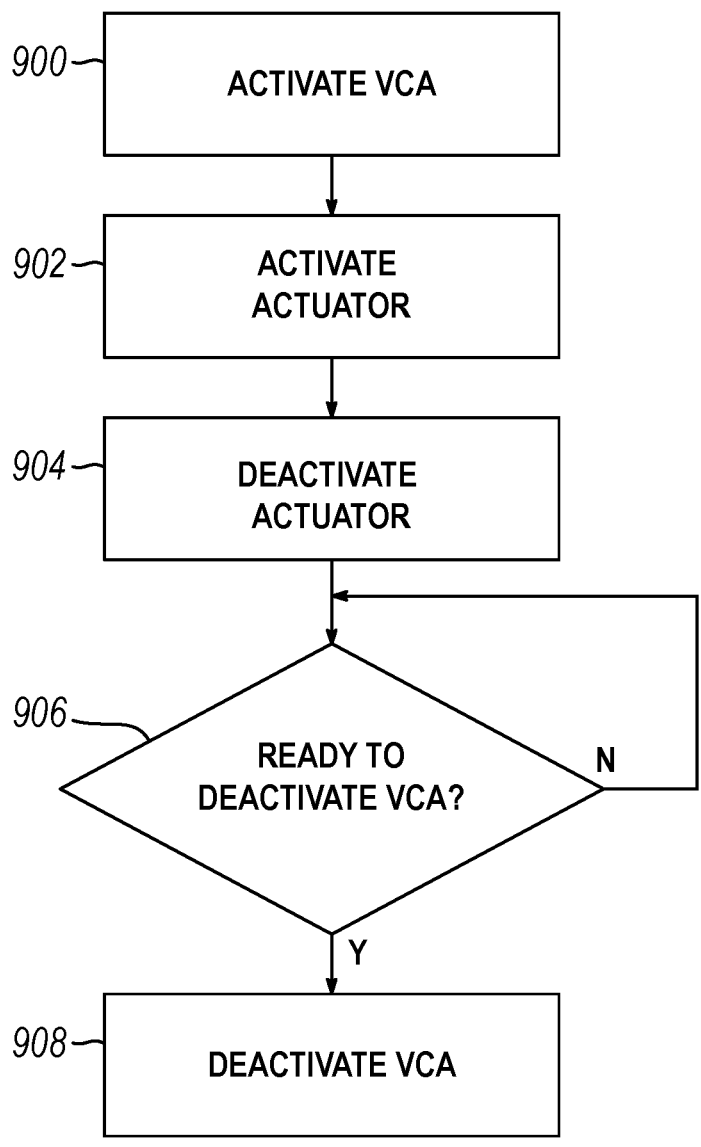
FIG. 17 depicts a flow chart showing steps of a process that may be performed using a vibration capture assembly.

FIG. 17 shows an example of a process that may be carried out using any of the vibration capture assemblies 320, 460, 500, 600, 700, 860 described herein. By way of example only, this process of FIG. 17 may be executed under the control of controller 195, 330. The process begins with activation of vibration capture assembly 320, 460, 500, 600, 700, 860, by transitioning vibration capture assembly 320, 460, 500, 600, 700, 860 from a non-damping state to a damping state, as shown in block 900. Next, actuator 310, 440, 840 is actuated, to drive movement of imaging assembly 450, 850 relative to flow cell 460, 860, as shown in block 902. As described above, some variations my provide movement of flow cell 460, 860 in addition to, or in lieu of, movement of imaging assembly 450, 850. While FIG. 17 shows block 900 occurring before block 902 in a sequence, some variations may provide execution of both blocks 900, 902 simultaneously. In either case, the activated vibration capture assembly 320, 460, 500, 600, 700, 860 may provide damping, and thereby effectively stabilize frame 410, 810 and flow cell 460, 860 to prevent (or otherwise reduce) movement of flow cell 460, 860 that might otherwise occur from vibrational movement (V) associated with actuation of actuator 310, 440, 840.

Once imaging assembly 450, 850 reaches the desired position relative to flow cell 460, 860, actuator 310, 440, 840 is de-actuated to thereby arrest motion of imaging assembly 450, 850, as shown in block 904. As noted above, the arresting of motion of imaging assembly 450, 850 might still tend to induce vibrational movement (V) of frame 410, 810. Thus, at this stage, a decision is made as to whether vibration capture assembly 320, 460, 500, 600, 700, 860 may be deactivated, as shown in block 906. This decision (block 906) may be based on a variety of factors. In some versions, a decision (block 906) is made that vibration capture assembly 320, 460, 500, 600, 700, 860 may be deactivated after a certain predetermined period of time has elapsed since actuator 310, 440, 840 was de-actuated (block 904). In some versions that include one or more sensors like sensor 340, a decision (block 906) is made that vibration capture assembly 320, 460, 500, 600, 700, 860 may be deactivated after data from sensor 340 indicates that one or more certain conditions have been met (e.g., a sensed force has fallen below a threshold, a certain component has reached a certain position, etc.). By way of further example, signals from one or more sensors 340 may be processed to analyze the amplitudes or other aspects of the signals against corresponding threshold values or other predetermined criteria (e.g., peak-to-peak, standard deviation, percentiles, various derivatives, regression analyses, etc.). Activation and deactivation of vibration capture assembly 320, 460, 500, 600, 700, 860 may also be based at least in part on any other events in system 100, 200, 400, 800 (e.g., fluidic steps, imaging steps, motion, etc.).

Some versions may also base a decision (block 906) on whether vibration capture assembly 320, 460, 500, 600, 700, 860 may be deactivated on a combination of elapsed time and data from sensor 340. For instance, controller 330 may check data from sensor 340 after a period of time has elapsed since actuator 310, 440, 840 was de-actuated (block 904), to then determine whether it is appropriate to deactivate vibration capture assembly 320, 460, 500, 600, 700, 860. As another example, actuator 310, 440, 840 may be expected to exert reactionary forces (R) on frame 410, 810 along a predetermined force profile (e.g., a force profile corresponding to predetermined movements of imaging assembly 450, 850), and vibration capture assembly 320, 460, 500, 600, 700, 860 may be selectively deactivated in accordance with this predetermined force profile. As a variation of this example, force data from sensor 340 may be compared against the predetermined force profile, such that a corresponding predetermined activation/deactivation profile for vibration capture assembly 320, 460, 500, 600, 700, 860 may be adjusted in real-time to account for any real-world deviations from the predetermined force profile. Alternatively, any other suitable criteria may be used to execute the decision (block 906) on whether vibration capture assembly 320, 460, 500, 600, 700, 860 may be deactivated.

In any event, the decision (block 906) on when vibration capture assembly 320, 460, 500, 600, 700, 860 may be deactivated may represent a point at which frame 410, 810 is no longer subject to vibrational movement (V). Once the decision (block 906) has been made that vibration capture assembly 320, 460, 500, 600, 700, 860 may be deactivated, vibration capture assembly 320, 460, 500, 600, 700, 860 is deactivated as shown in block 908. At this point, vibration capture assembly 320, 460, 500, 600, 700, 860 is in a non-damping state. The above-described process may be carried out each time imaging assembly 450, 850 is repositioned relative to flow cell 460, 860.

In some versions of the process shown in FIG. 17, imaging assembly 450, 850 is activated to capture one or more images of a corresponding region of flow cell 460, 860 upon deactivation of actuator (block 904). In some other versions, imaging assembly 450, 850 is activated to capture one or more images of a corresponding region of flow cell 460, 860 upon deactivation vibration capture assembly 320, 460, 500, 600, 700, 860 (block 908). In still other versions, imaging assembly 450, 850 is activated to capture one or more images of a corresponding region of flow cell 460, 860 sometime between deactivation of actuator (block 904) and deactivation of vibration capture assembly 320, 460, 500, 600, 700, 860 (block 908). In such versions, imaging assembly 450, 850 is activated based on lapse of a predetermined time period after deactivation of actuator (block 904), based on data from sensor 304, based on a combination of these two criteria, and/or based on any other suitable criteria.

2. Example of Process with Multiple Damping Modes

Figure 18:
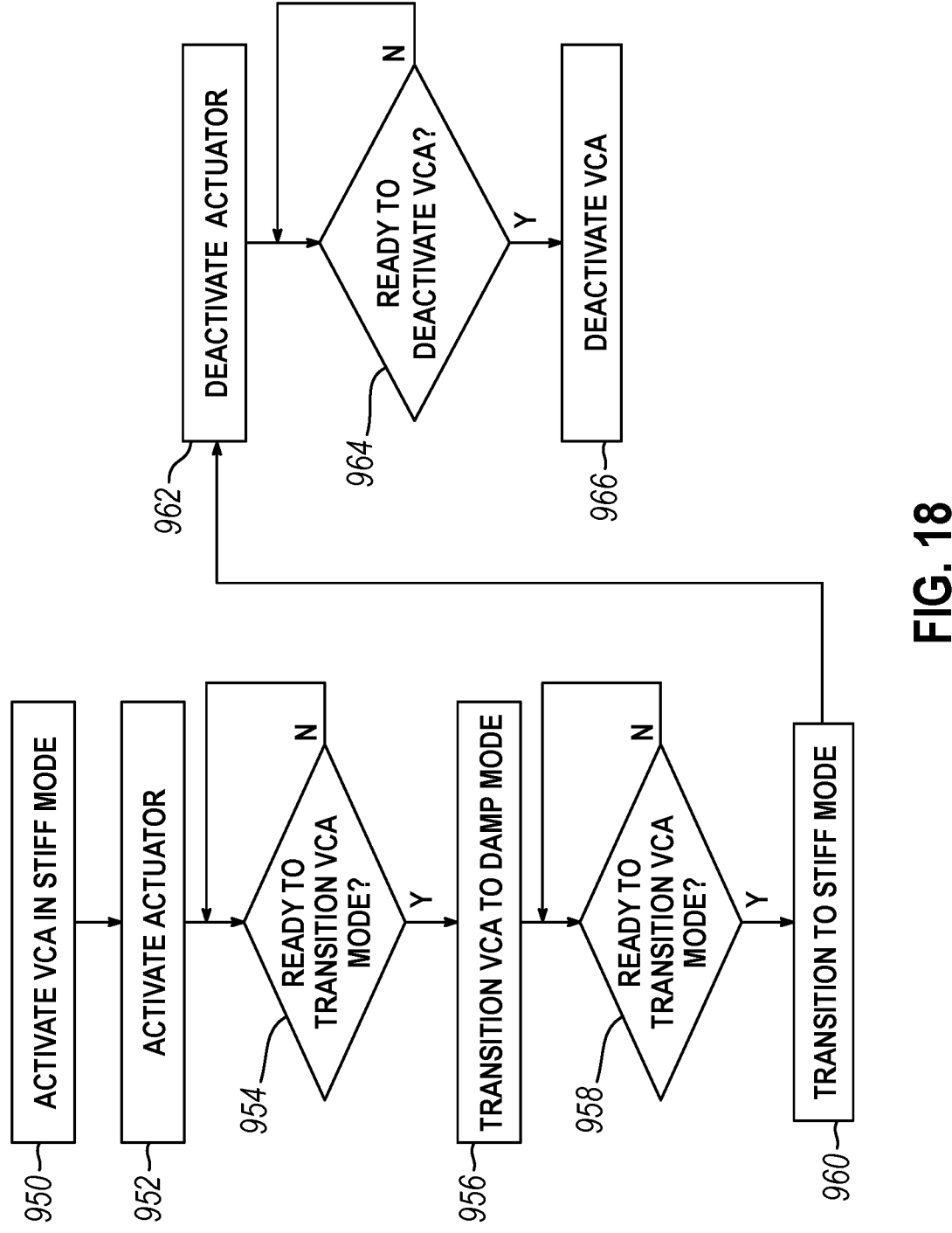
FIG. 18 depicts a flow chart showing steps of another process that may be performed using a vibration capture assembly.

The process shown in FIG. 17 contemplates only two modes for vibration capture assembly 320, 460, 500, 600, 700, 860—a single damping mode ("activated") and a non-damping mode ("deactivated"). As described above with reference to vibration capture assemblies 700, 860, it may be possible to provide varying degrees of damping. FIG. 18 shows an example of a process that may be carried out using versions of vibration capture assemblies 320, 700, 860 that are operable to provide varying degrees of damping. The process begins with activation of vibration capture assembly 320, 700, 860, by transitioning vibration capture assembly 320, 700, 860 from a non-damping state to a first damping state, as shown in block 950 as a "stiff mode." In this first "stiff mode" damping state, vibration capture assembly 320, 700, 860 may serve as a functional equivalent to a stiff spring. This "stiff mode" may correspond to the state shown in FIG. 15B, where vibration capture assembly 700 is shown providing a relatively high first damping force $(D_1)$, where the counteracting magnetic force generated via coil 720 is in the opposite direction to the reactionary force (R) on the frame (e.g., frame 410); and has a magnitude that is equal to or substantially equal to the magnitude of the reactionary force (R) on the frame. This "stiff mode" may be used when actuator 310, 440, 840 is expected to generate the greatest reactionary forces (F) against frame and thereby generate the most vibrational movement (V) in frame 410, 840. Such relatively high reactionary forces (F) may tend to occur at the beginning of actuation of actuator 310, 440, 840 and at the de-actuation of actuator 310, 440, 840.

Next, actuator 310, 440, 840 is actuated, to drive movement of imaging assembly 450, 850 relative to flow cell 460, 860, as shown in block 952. As described above, some variations my provide movement of flow cell 460, 860 in addition to, or in lieu of, movement of imaging assembly 450, 850. While FIG. 18 shows block 950 occurring before block 952 in a sequence, some variations may provide execution of both blocks 950, 952 simultaneously. In either case, the activated vibration capture assembly 320, 700, 860 may provide damping, and thereby effectively stabilize frame 410, 810 and flow cell 460, 860 to prevent (or otherwise reduce) movement of flow cell 460, 860 that might otherwise occur from vibrational movement (V) associated with actuation of actuator 310, 440, 840.

Once actuator 310, 440, 840 has been initially actuated, and as actuator 310, 440, 840 continues to drive movement of imaging assembly 450, 850 relative to flow cell 460, 860, a decision is made as to whether to change the damping mode of vibration capture assembly 320, 700, 860, as shown in block 954. As described above with respect to decision (block 906) in the process of FIG. 17, this decision (block 954) in the process of FIG. 18 may be made based on lapse of a predetermined time period after activation of actuator (block 952), based on data from sensor 304, based on a combination of these two criteria, and/or based on any other suitable criteria.

Once the decision (block 954) has been made that vibration capture assembly 320, 700, 860 may be transitioned to a second damping mode, vibration capture assembly 320, 700, 860 is transitioned to the second damping mode, as shown in block 956 as a "damp mode." This "damp mode" may correspond to the state shown in FIG. 15C, where vibration capture assembly 700 is shown providing a second damping force $(D_2)$ that has a lower magnitude than the first damping force $(D_1)$. This "damp mode" may be used when actuator 310, 440, 840 is expected to generate lower reactionary forces (F) against frame and thereby generate less vibrational movement (V) in frame 410, 840. Such relatively low reactionary forces (F) may tend to occur after actuator 310, 440, 840 has been initially actuated and before actuator 310, 440, 840 is de-actuated, such that imaging assembly 450, 850 is in motion along an intermediate portion of its expected range of travel. Since imaging assembly 450, 850 is still in motion at this stage of operation, imaging assembly 450, 850 is not yet capturing any images. Referring back to the context of FIG. 15C, controller 730 may serve as a derivative controller in this "damp mode" and activate variable voltage source 740 to provide current through coil

720 based on a velocity of magnet 750 as detected via position sensor 770, such that the counteracting magnetic force generated via coil 720 is in the opposite direction to the velocity of magnet 750 oscillations and is proportional to the velocity of magnet 750 oscillations.

By reducing the damping force at this stage of operation, vibration capture assembly 320, 700, 860 may allow more tolerance for external forces that might act upon chassis 420, 820 during this stage of operation. In other words, vibration capture assembly 320, 700, 860 may allow vibration isolators 430, 830 to serve more of a role in isolating frame 410, 810 from external forces against chassis 420, 820 as compared to the isolation that may be achieved when vibration capture assembly 320, 700, 860 is in the first, "stiff mode" damping state.

In some variations, vibration capture assembly 320, 700, 860 is deactivated during at least a portion of the time period when imaging assembly 450, 850 is in motion along an intermediate portion of its expected range of travel. In other words, vibration capture assembly 320, 700, 860 may be in a non-damping state, such that vibration capture assembly 320, 460, 860 in neither the "stiff mode" nor the "damp mode," while actuator 310, 440, 840 is driving imaging assembly 450, 850 along a range of travel; after the initial acceleration of imaging assembly 450, 850 by actuator 310, 440, 840 and before the deceleration of imaging assembly 450, 850 by actuator 310, 440, 840.

Returning to the present example, after vibration capture assembly 320, 700, 860 has been transitioned to the second damping mode, a decision is made as to whether to transition back to the first damping mode of vibration capture assembly 320, 700, 860, as shown in block 958. As described above, this decision (block 958) may be made based on lapse of a predetermined time period after activation of actuator (block 952), based on lapse of a predetermined period after the transition of vibration capture assembly 320, 700, 860 to the second damping mode (block 956), based on data from sensor 304, based on a combination of these criteria, and/or based on any other suitable criteria.

Once the decision (block 958) has been made that vibration capture assembly 320, 700, 860 may be transitioned back to the first damping mode, vibration capture assembly 320, 700, 860 is transitioned back to the first damping mode, as shown in block 960. Once imaging assembly 450, 850 reaches the desired position relative to flow cell 460, 860, actuator 310, 440, 840 is de-actuated to thereby arrest motion of imaging assembly 450, 850, as shown in block 962. As noted above, this arresting of motion of imaging assembly 450, 850 may tend to suddenly increase the reactionary force (R) on frame 410, 850. In the first damping mode, vibration capture assembly 320, 700, 860 may be configured to resist corresponding vibrational movement (V) of frame 410, 850 more strongly (i.e., to a greater degree than the resistance that would otherwise be provided when vibration capture assembly 320, 700, 860 is in the second damping mode).

At this stage, a decision is made as to whether vibration capture assembly 320, 460, 860 may be deactivated, as shown in block 964. As described above, this decision (block 964) may be made based on lapse of a predetermined time period after activation of actuator (block 952), based on lapse of a predetermined period after the transition of vibration capture assembly 320, 700, 860 to the second damping mode (block 956), based on lapse of a predetermined timer period after the transition of vibration capture assembly 320, 700, 860 back to the first damping mode (block 960), based on lapse of a predetermined timer period after deactivation of actuator 310, 440, 840 (block 962), based on data from sensor 304, based on a combination of these criteria, and/or based on any other suitable criteria. Once the decision (block 964) has been made that vibration capture assembly 320, 460, 860 may be deactivated, vibration capture assembly 320, 460, 860 is deactivated as shown in block 966. At this point, vibration capture assembly 320, 460, 860 is in a non-damping state. The above-described process may be carried out each time imaging assembly 450, 850 is repositioned relative to flow cell 460, 860.

In some versions of the process shown in FIG. 18, imaging assembly 450, 850 is activated to capture one or more images of a corresponding region of flow cell 460, 860 upon deactivation of actuator (block 962). In some other versions, imaging assembly 450, 850 is activated to capture one or more images of a corresponding region of flow cell 460, 860 upon deactivation vibration capture assembly 320, 460, 860 (block 966). In still other versions, imaging assembly 450, 850 is activated to capture one or more images of a corresponding region of flow cell 460, 860 sometime between deactivation of actuator (block 962) and deactivation of vibration capture assembly 320, 460, 860 (block 966). In such versions, imaging assembly 450, 850 is activated based on lapse of a predetermined time period after deactivation of actuator (block 962), based on data from sensor 304, based on a combination of these two criteria, and/or based on any other suitable criteria.

While the foregoing example of FIG. 18 provides two discrete damping modes—a first "stiff mode" damping state and a second "damp mode" damping state—some variations may provide more than two discrete damping modes. Moreover, some variations may provide a damping force that varies along a curve based on the operation state of actuator 310, 440, 840 and/or based on other conditions. Thus, some versions of vibration capture assembly 320, 700, 860 may provide a variable damping state without necessarily toggling between certain predetermined damping modes.

D. Examples of Alternative Vibration Isolators

Figures 19, 20:
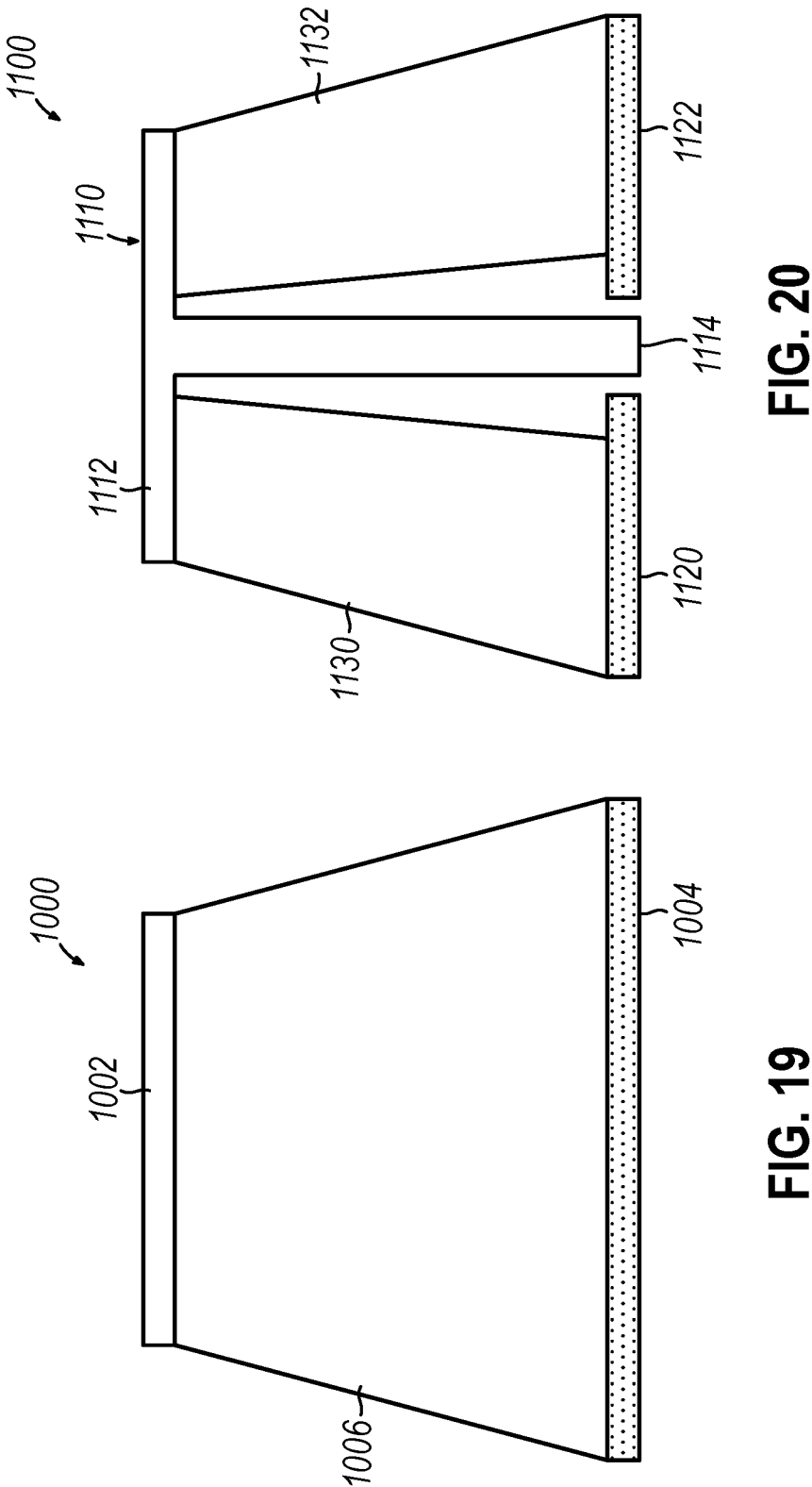
FIG. 19 depicts a schematic side elevation view of a vibration isolator of an imaging system.
FIG. 20 depicts a schematic side elevation view of another vibration isolator of an imaging system.

In addition to, or in lieu of, providing one or more of the various vibration capture assemblies 320, 460, 500, 600, 700, 860 described above, system 100, 200, 400, 800 may include a variation of vibration isolator 230, 430, 830 described above. FIG. 19 shows one example of a form that vibration isolator 230, 430, 830 may take. In particular, FIG. 19 shows a vibration isolator 1000 that includes an upper support member 1002, a lower support member 1004, and a vibration isolation body 1006 interposed between support members 1002, 1004. Upper support member 1002 may be integral with, or fixedly secured to, support arm 212, 412, 812 of frame 210, 410, 810. Lower support member 1004 may be integral with, or fixedly secured to, support arm 222, 422, 822 of chassis 220, 420, 820.

Vibration isolation body 1006 may include a gel, a foam material, an air filled bladder, a liquid-filled bladder, a wire braid, buckling beams, and/or any other suitable kinds of material(s) and/or other features. Vibration isolation body 1006 is configured to support the weight of frame 210, 410, 810 (and the components that are supported by frame 210, 410, 810); and is also configured to isolate frame 210, 410, 810 (and the components that are supported by frame 210, 410, 810) from movement that might otherwise be caused by external forces acting upon chassis 220, 420, 820.

In the present example, vibration isolator 1000 has a trapezoidal cross-sectional profile. For instance, vibration isolator 1000 may have a trapezoidal prism or conical shape.

Alternatively, vibration isolator 1000 may have any other suitable shape. In some versions, four vibration isolators 1000 may be interposed between frame 210, 410, 810 and chassis 220, 420, 820 to support frame 210, 410, 810. Alternatively, any other suitable number of vibration isolators 1000 may be used.

FIG. 20 shows another example of a form that vibration isolator 230, 430, 830 may take. In particular, FIG. 20 shows a vibration isolator 1100 that includes an upper support assembly 1110, a first lower support member 1120, a second lower support member 1122, a first vibration isolation body 1130, and a second vibration isolation body 1132. Upper support assembly 1110 includes a horizontal member 1112 and a vertical member 1114. Horizontal member 1112 is rigidly fixed at the top of vertical member 1114. First vibration isolation body 1130 is interposed between horizontal member 1112 and first lower support member 1120. Second vibration isolation body 1132 is interposed between horizontal member 1112 and second lower support member 1122. Upper support assembly 1110 may be integral with, or fixedly secured to, support arm 212, 412, 812 of frame 210, 410, 810. Each lower support member 1120, 1122 may be integral with, or fixedly secured to, support arm 222, 422, 822 of chassis 220, 420, 820.

Each vibration isolation body 1130, 1132 may include a gel, a foam material, an air filled bladder, a liquid-filled bladder, and/or any other suitable kinds of material(s) and/or other features. Vibration isolation bodies 1130, 1132 are configured to support the weight of frame 210, 410, 810 (and the components that are supported by frame 210, 410, 810); and are also configured to isolate frame 210, 410, 810 (and the components that are supported by frame 210, 410, 810) from movement that might otherwise be caused by external forces acting upon chassis 220, 420, 820.

Vertical member 1114 is positioned in a space that is defined between vibration isolation bodies 1130, 1132; and between lower support members 1120, 1122. As shown in FIG. 20, each lower support member 1120, 1122 has an edge that is spaced apart from, yet positioned to engage, vertical member 1114. Thus, when chassis 220, 420, 820 is not encountering external forces, these edges of lower support members 1120, 1122 may remain spaced apart from vertical member 1114. However, when chassis 220, 420, 820 encounters external forces, and such forces tend to cause movement of frame 210, 410, 810, vibration isolation bodies 1130, 1132 may allow some movement of frame 210, 410, 810 relative to chassis 220, 420, 820 (e.g., along a plane that is transverse to vertical member 1114). In scenarios where the forces are substantial, and the corresponding horizontal movement of frame 210, 410, 810 would be substantial, the edges of lower support members 1120, 1122 may engage vertical member 1114 to restrict such horizontal movement. Thus, vibration isolator 1100 may allow some degree of relative horizontal movement between frame 210, 410, 810 and chassis 220, 420, 820 while also imposing a hard restriction on such freedom of horizontal movement.

In the present example, vibration isolator 1100 has a trapezoidal cross-sectional profile. For instance, vibration isolator 1100 may have a trapezoidal prism shape. Alternatively, vibration isolator 1110 may have any other suitable shape. In some versions, four vibration isolators 1100 may be interposed between frame 210, 410, 810 and chassis 220, 420, 820 to support frame 210, 410, 810. Alternatively, any other suitable number of vibration isolators 1100 may be used.

Figure 21:
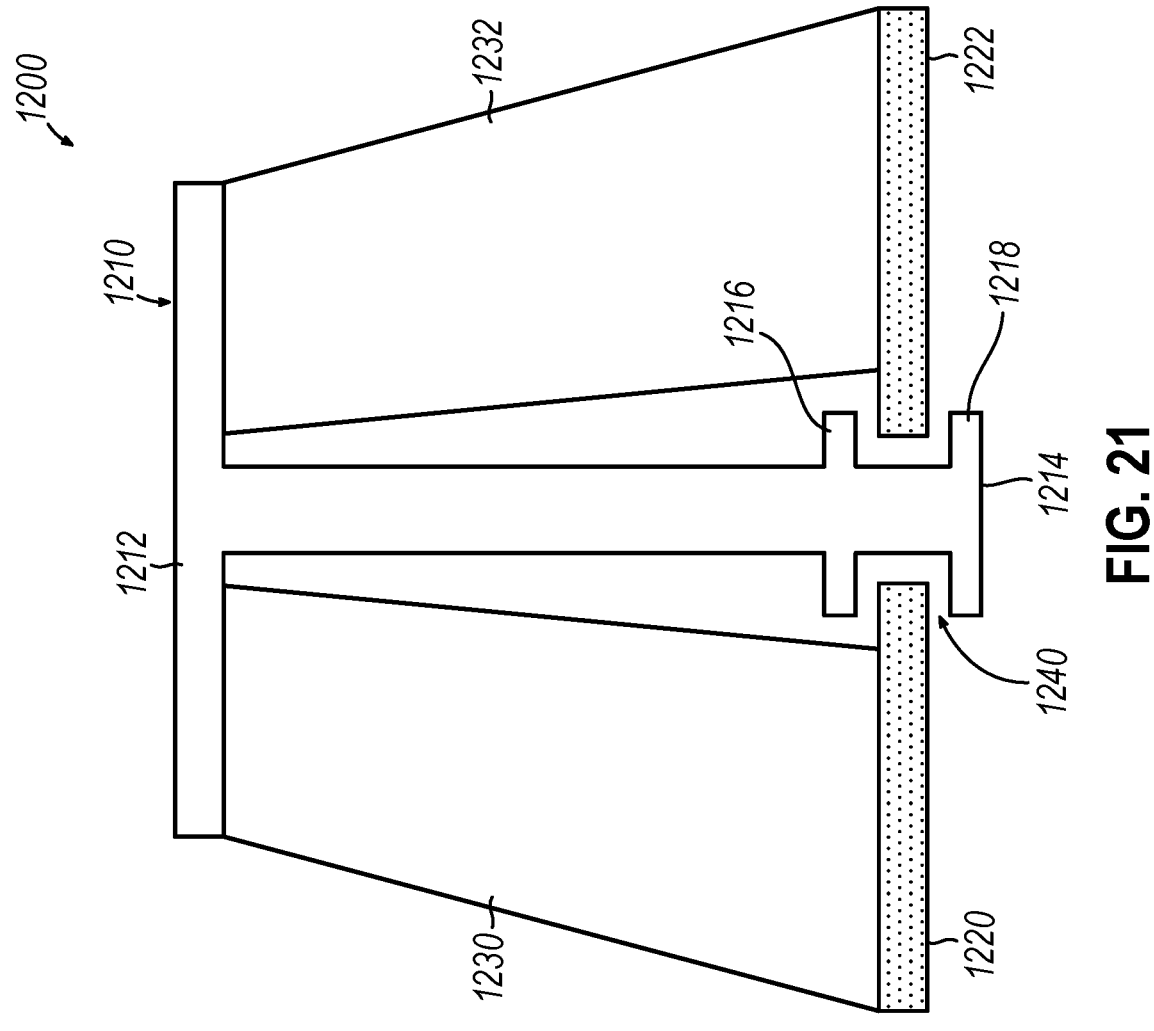
FIG. 21 depicts a schematic side elevation view of another vibration isolator of an imaging system.

FIG. 21 shows another example of a form that vibration isolator 230, 430, 830 may take. In particular, FIG. 21 shows a vibration isolator 1200 that includes an upper support assembly 1210, a first lower support member 1220, a second lower support member 1222, a first vibration isolation body 1230, and a second vibration isolation body 1232. Upper support assembly 1210 includes a horizontal member 1212, a vertical member 1214, an upper flange 1216, and a lower flange 1218. Vertical member 1214 and flanges 1216, 1218 cooperate to define a recess 1240. Horizontal member 1212 is rigidly fixed at the top of vertical member 1214. Flanges 1216, 1218 are rigidly fixed at the bottom of vertical member 1214. First vibration isolation body 1230 is interposed between horizontal member 1212 and first lower support member 1220. Second vibration isolation body 1232 is interposed between horizontal member 1212 and second lower support member 1222. Upper support assembly 1210 may be integral with, or fixedly secured to, support arm 212, 412, 812 of frame 210, 410, 810. Each lower support member 1220, 1222 may be integral with, or fixedly secured to, support arm 222, 422, 822 of chassis 220, 420, 820.

Each vibration isolation body 1230, 1232 may include a gel, a foam material, an air filled bladder, a liquid-filled bladder, and/or any other suitable kinds of material(s) and/or other features. Vibration isolation bodies 1230, 1232 are configured to support the weight of frame 210, 410, 810 (and the components that are supported by frame 210, 410, 810); and are also configured to isolate frame 210, 410, 810 (and the components that are supported by frame 210, 410, 810) from movement that might otherwise be caused by external forces acting upon chassis 220, 420, 820.

Vertical member 1214 is positioned in a space that is defined between vibration isolation bodies 1230, 1232; and between lower support members 1220, 1222. As shown in FIG. 21, each lower support member 1220, 1222 has an edge that is spaced apart from, yet positioned to engage, vertical member 1214. In particular, these edges are positioned in recess 1240. When chassis 220, 420, 820 is not encountering external forces, these edges of lower support members 1220, 1222 may remain spaced apart from vertical member 1214. However, when chassis 220, 420, 820 encounters external forces, and such forces tend to cause movement of frame 210, 410, 810, vibration isolation bodies 1230, 1232 may allow some movement of frame 210, 410, 810 relative to chassis 220, 420, 820 (e.g., along a plane that is transverse to vertical member 1214). In scenarios where the forces are substantial, and the corresponding horizontal movement of frame 210, 410, 810 would be substantial, the edges of lower support members 1220, 1222 may engage vertical member 1214 to restrict such horizontal movement. Thus, vibration isolator 1200 may allow some degree of relative horizontal movement between frame 210, 410, 810 and chassis 220, 420, 820 while also imposing a hard restriction on such freedom of horizontal movement.

There may also be instances where chassis 220, 420, 820 encounters external forces that tend to cause vertical movement of frame 210, 410, 810. In such scenarios, vibration isolation bodies 1230, 1232 may allow some vertical movement of frame 210, 410, 810 relative to chassis 220, 420, 820. In scenarios where the forces are substantial, and the corresponding vertical movement of frame 210, 410, 810 would be substantial, the edges of lower support members 1220, 1222 may engage flanges 1216, 1218 to restrict such vertical movement. Thus, vibration isolator 1200 may allow some degree of relative vertical movement between frame 210, 410, 810 and chassis 220, 420, 820 while also imposing a hard restriction on such freedom of vertical movement.

In the present example, vibration isolator 1200 has a trapezoidal cross-sectional profile. For instance, vibration isolator 1200 may have a trapezoidal prism shape. Alternatively, vibration isolator 1210 may have any other suitable shape. In some versions, four vibration isolators 1200 may be interposed between frame 210, 410, 810 and chassis 220, 420, 820 to support frame 210, 410, 810. Alternatively, any other suitable number of vibration isolators 1200 may be used.

Figure 22:
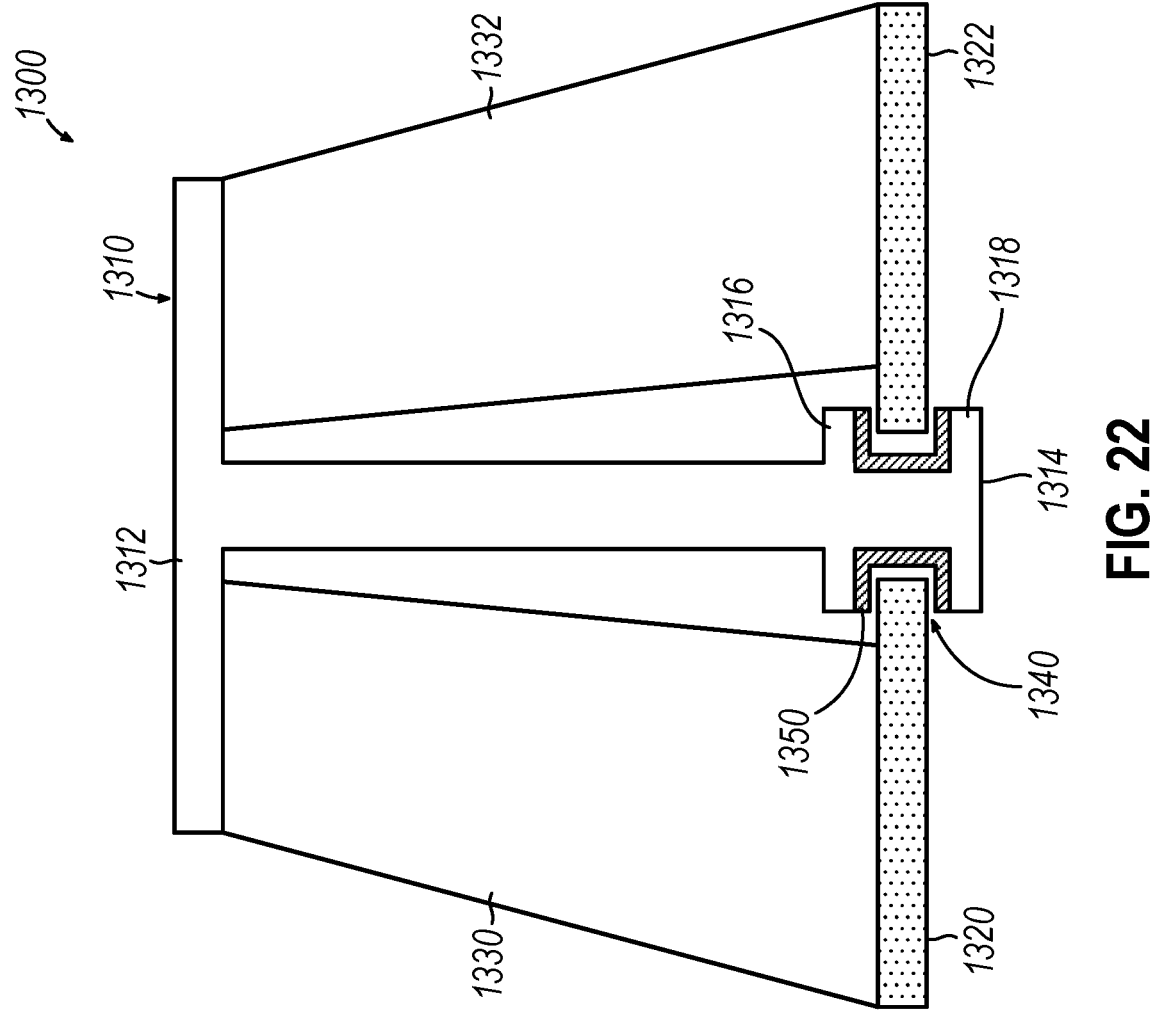
FIG. 22 depicts a schematic side elevation view of another vibration isolator of an imaging system.

FIG. 22 shows another example of a form that vibration isolator 230, 430, 830 may take. In particular, FIG. 22 shows a vibration isolator 1300 that includes an upper support assembly 1310, a first lower support member 1320, a second lower support member 1322, a first vibration isolation body 1330, and a second vibration isolation body 1332. Upper support assembly 1310 includes a horizontal member 1312, a vertical member 1314, an upper flange 1316, and a lower flange 1318. Vertical member 1314 and flanges 1316, 1318 cooperate to define a recess 1340. Horizontal member 1312 is rigidly fixed at the top of vertical member 1314. Flanges 1316, 1318 are rigidly fixed at the bottom of vertical member 1314. A soft interface material 1350 is positioned within recess 1340, along the regions of vertical member 1314 and flanges 1316, 1318 defining recess 1340. Soft interface material 1350 may include a foam, a gel, an elastomeric material (e.g., rubber, etc.), a bladder, and/or any other suitable kind(s) of material(s) and/or structure(s). As described below, soft interface material 1350 is configured to reduce impact forces in scenarios where lower support members 1320, 1322 would otherwise directly engage vertical member 1314 and/or flanges 1316, 1318.

First vibration isolation body 1330 is interposed between horizontal member 1312 and first lower support member 1320. Second vibration isolation body 1332 is interposed between horizontal member 1312 and second lower support member 1322. Upper support assembly 1210 may be integral with, or fixedly secured to, support arm 212, 412, 812 of frame 210, 410, 810. Each lower support member 1320, 1322 may be integral with, or fixedly secured to, support arm 222, 422, 822 of chassis 220, 420, 820.

Each vibration isolation body 1330, 1332 may include a gel, a foam material, an air filled bladder, a liquid-filled bladder, and/or any other suitable kinds of material(s) and/or other features. Vibration isolation bodies 1330, 1332 are configured to support the weight of frame 210, 410, 810 (and the components that are supported by frame 210, 410, 810); and are also configured to isolate frame 210, 410, 810 (and the components that are supported by frame 210, 410, 810) from movement that might otherwise be caused by external forces acting upon chassis 220, 420, 820.

Vertical member 1314 is positioned in a space that is defined between vibration isolation bodies 1330, 1332; and between lower support members 1320, 1322. As shown in FIG. 22, each lower support member 1320, 1322 has an edge that is spaced apart from, yet positioned to engage, vertical member 1314. In particular, these edges are positioned in recess 1340. When chassis 220, 420, 820 is not encountering external forces, these edges of lower support members 1320, 1322 may remain spaced apart from vertical member 1314. However, when chassis 220, 420, 820 encounters external forces, and such forces tend to cause movement of frame 210, 410, 810, vibration isolation bodies 1330, 1332 may allow some movement of frame 210, 410, 810 relative to chassis 220, 420, 820 (e.g., along a plane that is transverse to vertical member 1314). In scenarios where the forces are substantial, and the corresponding horizontal movement of frame 210, 410, 810 would be substantial, the edges of lower support members 1320, 1322 may engage soft interface material 1350 to restrict such horizontal movement. Thus, vibration isolator 1300 may allow some degree of relative horizontal movement between frame 210, 410, 810 and chassis 220, 420, 820 while also imposing a hard restriction on such freedom of horizontal movement. Moreover, by having lower support members 1320, 1322 engage soft interface material 1350 instead of directly engaging vertical member 1314, vibration isolator 1300 may provide a more gradual lateral deflection reduction curve (in comparison to vibration isolator 1200) as described below with reference to FIG. 23.

There may also be instances where chassis 220, 420, 820 encounters external forces that tend to cause vertical movement of frame 210, 410, 810. In such scenarios, vibration isolation bodies 1330, 1332 may allow some vertical movement of frame 210, 410, 810 relative to chassis 220, 420, 820. In scenarios where the forces are substantial, and the corresponding vertical movement of frame 210, 410, 810 would be substantial, the edges of lower support members 1320, 1322 may engage soft interface material 1350 to restrict such vertical movement. Thus, vibration isolator 1300 may allow some degree of relative vertical movement between frame 210, 410, 810 and chassis 220, 420, 820 while also imposing a hard restriction on such freedom of vertical movement. Moreover, by having lower support members 1320, 1322 engage soft interface material 1350 instead of directly engaging flanges 1316, 1318, vibration isolator 1300 may provide a more gradual vertical deflection reduction curve (in comparison to vibration isolator 1200).

In the present example, vibration isolator 1300 has a trapezoidal cross-sectional profile. For instance, vibration isolator 1300 may have a trapezoidal prism shape. Alternatively, vibration isolator 1310 may have any other suitable shape. In some versions, four vibration isolators 1300 may be interposed between frame 210, 410, 810 and chassis 220, 420, 820 to support frame 210, 410, 810. Alternatively, any other suitable number of vibration isolators 1300 may be used.

Figure 23:
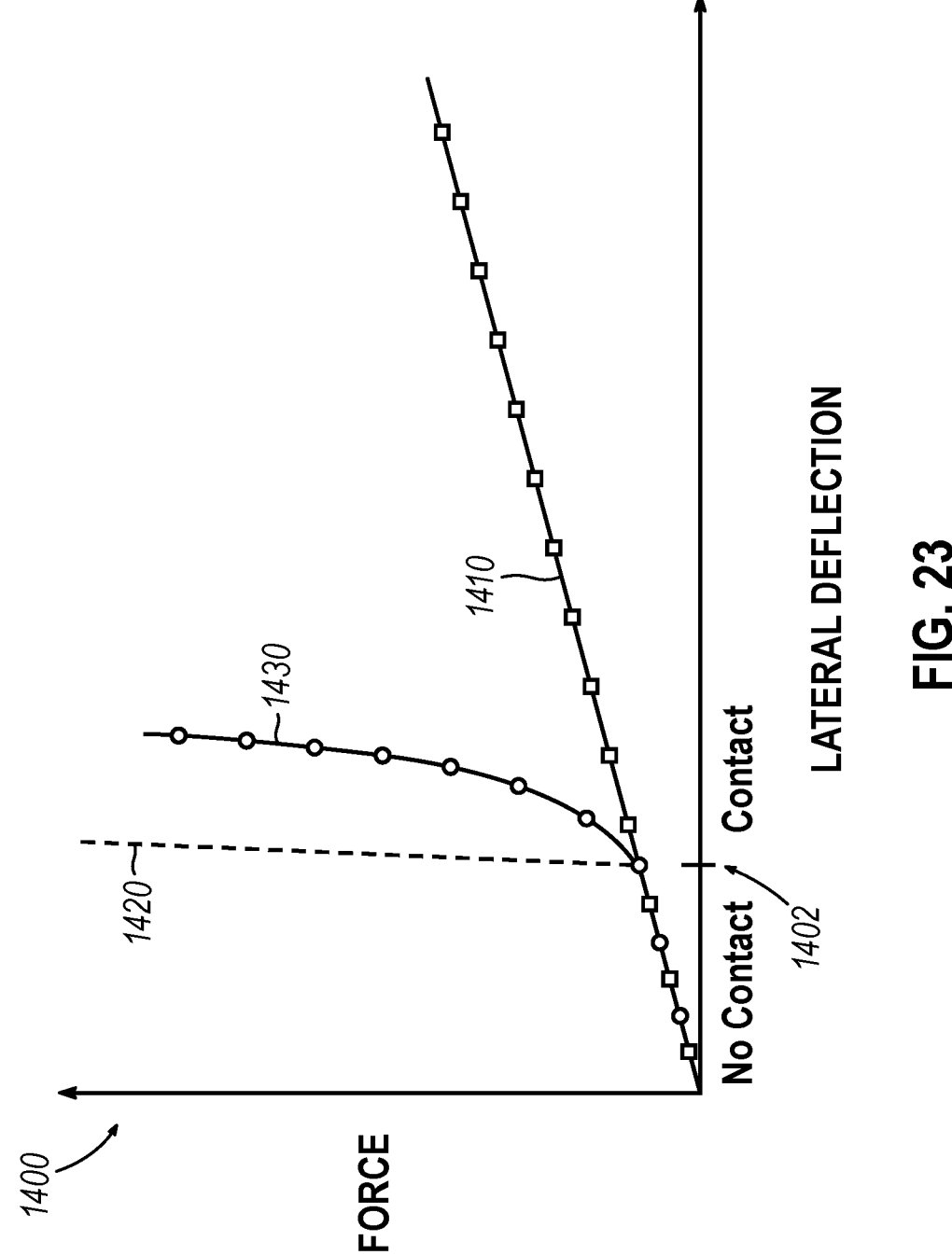
FIG. 23 depicts a graph showing examples of deflection profiles associated with the vibration isolators of FIGS. 20-22.

FIG. 23 shows a graph 1400 with plots 1402, 1404, 1406 representing examples of how lateral deflection of frame 210, 410, 810 may vary as a function of force on chassis 220, 420, 820, depending on which vibration isolator 1000, 1100, 1200, 1300 is used. In particular, plot 1410 shows a lateral deflection profile that may be encountered when vibration isolator 1000 is used. As shown, the degree of lateral deflection may continuously increase in direct proportion to the force on chassis 220, 420, 820.

Plot 1420 shows a lateral deflection profile that may be encountered when either of vibration isolators 1100, 1200 is used. As shown, the degree of lateral deflection may continuously increase in direct proportion to the force on chassis 220, 420, 820, until the lateral deflection reaches a point 1402 at which lower support members 1120, 1122, 1220, 1222 engage vertical member 1114, 1214. Once the lateral deflection reaches this point 1402, the lateral deflection is immediately arrested, regardless of the magnitude of the force on chassis 220, 420, 820.

Plot 1430 shows a lateral deflection profile that may be encountered when vibration isolator 1300 is used. As shown, the degree of lateral deflection may continuously increase in direct proportion to the force on chassis 220, 420, 820, until the lateral deflection reaches a point 1402 at which lower support members 1320, 1322 engage soft interface material 1350. Once the lateral deflection reaches this point 1402, the lateral deflection is gradually arrested (e.g., as soft interface material 1350 compresses or otherwise absorbs the impact of lower support members 1320, 1322), regardless of the magnitude of the force on chassis 220, 420, 820. While vibration isolator 1300 does not immediately fully arrest lateral deflection of frame 210, 410, 810, vibration isolator 1300 will eventually fully arrest lateral deflection of frame 210, 410, 810 (e.g., when soft interface material 1350 reaches a fully compressed state or is otherwise unable to further absorb the impact of lower support members 1320, 1322).

While a graph is not shown plotting how vertical deflection of frame 210, 410, 810 may vary as a function of force on chassis 220, 420, 820, depending on which vibration isolator 1000, 1100, 1200, 1300 is used, it should be understood that such a graph may demonstrate relative performance characteristics similar to those demonstrated by graph 1400.

In some variations of vibration isolators 1100, 1200, 1300 that include hard stops that arrest movement of frame 210, 410, 810 relative to chassis 220, 420, 820, such hard stops may provide self-adjusting properties. For instance, such a hard stop may include a low pass filter that provides a relatively slow, mechanical creep, that can compensate for shifts, settling, or drift on the vibration isolator without requiring readjustment. Such vibration isolators may nevertheless be stiff for fast motions to limit vibration. In some such versions, the vibration isolators may contain a non-Newtonian fluid, such as a non-Newtonian gel.

Some variations of vibration isolators 1100, 1200, 1300 may also include non-linear dampers, springs, clamps, or other structures. The geometry or materials the vibration isolator may be constructed from could have a non-linear force versus deflection relationship in the lateral direction. For example, the vibration isolator might have a low stiffness for small deflections (which may provide vibration isolation); but then the stiffness significantly increases beyond a certain deflection. In addition, or in the alternative, some such variations may provide a cascaded geometry where different geometrical elements engage at different deflections. Some such variations may provide material non-linearities, such as the increased stiffness when an elastomer reaches the end of its elastomeric regime and becomes much stiffer (e.g., a rubber band stretched to the limit). In addition, or in the alternative, some such variations may provide varying mechanical advantage (MA), such as a crank rocker mechanism with a varying MA such that as the deflection increases, a resistive force has a greater MA for resisting deflection. These may include rigid link and pin joint mechanisms or compliant flexible mechanisms.

III. Miscellaneous

It is to be understood that the subject matter described herein is not limited in its application to the details of construction and the arrangement of components set forth in the description herein or illustrated in the drawings hereof. The subject matter described herein is capable of other implementations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

When used in the claims, the term "set" should be understood as one or more things which are grouped together. Similarly, when used in the claims "based on" should be understood as indicating that one thing is determined at least in part by what it is specified as being "based on." Where one thing is required to be exclusively determined by another thing, then that thing will be referred to as being "exclusively based on" that which it is determined by.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Also, it is to be understood that phraseology and terminology used herein with reference to device or element orientation (such as, for example, terms like "above," "below," "front," "rear," "distal," "proximal," and the like) are only used to simplify description of one or more examples described herein, and do not alone indicate or imply that the device or element referred to must have a particular orientation. In addition, terms such as "outer" and "inner" are used herein for purposes of description and are not intended to indicate or imply relative importance or significance.

It is to be understood that the above description is intended to be illustrative, and not restrictive. For example, the above-described examples (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and instead illustrations. Many further examples will be apparent to those of skill in the art upon reviewing the above description. The scope of the disclosed subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) paragraph, unless and until such claim limitations expressly use the phrase "means for" followed by a statement of function void of further structure.

The following claims recite aspects of certain examples of the disclosed subject matter and are considered to be part of the above disclosure. These aspects may be combined with one another.

What is claimed is:

1. An apparatus, comprising:
a chassis;
a frame coupled with the chassis;
a sample support member supported by the frame, the sample support member being configured to support a biological sample containing member;
an imaging assembly;
an actuation assembly supported by the frame, the actuation assembly being operable to drive movement of the imaging assembly relative to the sample support member to thereby capture different images from different positions relative to the biological sample containing member; and
a vibration capture assembly, the vibration capture assembly being operable to selectively transition between a plurality of modes, the plurality of modes including:

a damping mode in which the vibration capture assembly is configured to resist movement of the frame relative to the chassis in response to operation of the actuation assembly, and
an isolation mode in which the vibration capture assembly is configured to prevent transmission of vibrational movement in the chassis to the frame.

2. The apparatus of claim 1, further comprising one or more isolating members interposed between the frame and the chassis, the one or more isolating members being configured to prevent transmission of vibrational movement in the chassis to the frame.

3. The apparatus of claim 2, at least a portion of the vibration capture assembly being positioned within the one or more isolating members.

4. The apparatus of claim 1, the biological sample containing member comprising a flow cell.

5. The apparatus of claim 1, the actuation assembly being operable to drive movement of the imaging assembly along a plane, at least a portion of the vibration capture assembly being positioned along the plane.

6. The apparatus of claim 1, the vibration capture assembly including at least one magnet and at least one electrically conductive member, the at least one electrically conductive member being spaced apart from the at least one magnet.

7. The apparatus of claim 6, the at least one magnet being configured to generate eddy currents in the at least one electrically conductive member, the at least one electrically conductive member being configured to generate a magnetic field in response to the eddy currents, the magnetic field generated by the at least one electrically conductive member being counteractive to a magnetic field of the at least one magnet such that the magnetic field generated by the at least one electrically conductive member and the magnetic field of the at least one magnet cooperate to resist movement of the frame relative to the chassis in response to operation of the actuation assembly when the vibration capture assembly is in the damping mode.

8. The apparatus of claim 7, the at least one electrically conductive member comprising a first plate and a second plate, the first plate including a first plurality of fingers defining a first plurality of slots, the second plate including a second plurality of fingers defining a second plurality of slots, the first plurality of fingers being configured to fit in the in the second plurality of slots, the second plurality of fingers being configured to fit in the first plurality of slots.

9. The apparatus of claim 7, the at least one electrically conductive member including:
a first conductive member,
a second conductive member,
a gap defined between the first and second conductive members, and
an expandable conductive assembly positioned in the gap, the expandable conductive assembly being operable to transition between an expanded state and a non-expanded state, the expandable conductive assembly being configured to provide electrical continuity between the first conductive member and the second conductive member when the expandable conductive assembly is in the expanded state, the expandable conductive assembly being configured to not provide electrical continuity between the first conductive member and the second conductive member when the expandable conductive assembly is in the non-expanded state.

10. The apparatus of claim 7, the at least one electrically conductive member comprising a conductive plate with a plurality of openings formed therethrough.

11. The apparatus of claim 6, the at least one magnet and at least one electrically conductive member being operable to cooperate to generate electromotive force to thereby resist movement of the frame relative to the chassis in response to operation of the actuation assembly when the vibration capture assembly is in the damping mode.

12. The apparatus of claim 6, the at least one magnet being secured to the frame, the at least one electrically conductive member being secured to the chassis.

13. The apparatus of claim 1, the vibration capture assembly comprising a mechanical braking feature including a first portion secured to the frame and a second portion secured to the chassis, the mechanical braking feature being operable to selectively provide a contacting rigid engagement between the first and second portions to thereby provided the damping mode.

14. The apparatus of claim 1, further comprising a control module, the control module being configured to drive operation of the vibration capture assembly.

15. The apparatus of claim 14, further comprising one or more sensors, the control module being configured to transition the vibration capture assembly between the damping mode and the isolation mode based on signals from the one or more sensors.

16. The apparatus of claim 14, the control module being configured to transition the vibration capture assembly from the isolation mode to the damping mode based at least in part on a transition of the actuation assembly from a non-activated state to an activated state.

17. The apparatus of claim 14, the control module being configured to transition the vibration capture assembly from the damping mode to the isolation mode based at least in part on a transition of the actuation assembly from an activated state to a non-activated state.

18. The apparatus of claim 14, the control module being configured to:

transition the vibration capture assembly from the isolation mode to the damping mode based at least in part on a transition of the actuation assembly from a non-activated state to an activated state, and transition the vibration capture assembly from the damping mode to the isolation mode while the actuation assembly is in the activated state.

19. A method of operating an apparatus that includes a chassis, a frame coupled with the chassis, a biological sample containing member supported by the frame, an imaging assembly, an actuation assembly supported by the frame, and a vibration capture assembly, the method comprising:

activating the actuation assembly to drive movement of the imaging assembly relative to the biological sample containing member to thereby capture images with the imaging assembly from different positions relative to the biological sample containing member;

deactivating the actuation assembly to cease movement of the imaging assembly relative to the biological sample containing member;

transitioning the vibration capture assembly to a damping mode to resist movement of the frame relative to the chassis based on activation of the actuation assembly; and transitioning the vibration capture assembly from the damping mode to an isolation mode to prevent transmission of vibrational movement in the chassis to the frame after deactivation of the activation assembly.

20. An apparatus, comprising:

a chassis;

a frame coupled with the chassis;

a sample support member supported by the frame, the sample support member being configured to support a biological sample containing member;

an imaging assembly;

an actuation assembly supported by the frame, the actuation assembly being operable to drive movement of the imaging assembly relative to the sample support member to thereby capture different images from different positions relative to the biological sample containing member; and a vibration capture assembly, the vibration capture assembly including:

a first support assembly coupled with the frame, a first support member coupled with the chassis, and a first vibration isolation body interposed between the first support assembly and the first support member along a first dimension, the first vibration isolation body being configured to absorb vibrations imparted by the chassis to the first vibration isolation body via the first support member, the first support assembly including a movement restriction feature configured to permit movement of the first support member relative to the first support assembly along a second dimension within a restricted range of movement.

\* \* \* \* \*